United States Patent [19]

Lynch et al.

[11] Patent Number: 5,319,965
[45] Date of Patent: Jun. 14, 1994

[54] MULTIPLE CHANNEL PRESSURE RECORDER

[75] Inventors: Michael J. Lynch; Roger M. Lewis, both of Duncan, Okla.; Jonathan A. Whitten, Houston, Tex.

[73] Assignee: Halliburton Company, Duncan, Okla.

[21] Appl. No.: 844,257

[22] Filed: Mar. 2, 1992

[51] Int. Cl.⁵ .................................................. E21B 47/00
[52] U.S. Cl. ........................................ 73/151; 166/250
[58] Field of Search ............................ 73/151–152, 73/155; 166/250

[56] References Cited

U.S. PATENT DOCUMENTS

| | | | |
|---|---|---|---|
| 3,299,711 | 1/1967 | Hatschek | 73/398 |
| 3,355,949 | 12/1967 | Elwood et al. | 73/345 |
| 4,107,697 | 8/1978 | McCracken | 346/33 R |
| 4,157,659 | 6/1979 | Murdock | 73/151 |
| 4,195,349 | 3/1980 | Balkanli | 364/571 |
| 4,468,968 | 9/1984 | Kee | 73/708 |
| 4,473,797 | 9/1984 | Shiota | 324/115 |
| 4,479,070 | 10/1984 | Frische et al. | 310/338 |
| 4,535,638 | 8/1985 | EerNisse et al. | 73/862.59 |
| 4,550,610 | 11/1985 | EerNisse | 73/702 |
| 4,553,223 | 11/1985 | Bouhelier et al. | 364/900 |
| 4,562,554 | 12/1985 | Stixrud et al. | 364/900 |
| 4,592,663 | 6/1986 | EerNisse et al. | 374/117 |
| 4,593,370 | 6/1986 | Balkanli | 364/571 |
| 4,638,664 | 1/1987 | Tamura | 73/384 |
| 4,741,208 | 5/1988 | Vandevier | 73/155 |
| 4,741,213 | 5/1988 | Hojoh | 73/702 |
| 4,790,192 | 12/1988 | Knecht et al. | 73/721 |
| 4,790,378 | 12/1988 | Montgomery et al. | 166/66 |
| 4,802,370 | 2/1989 | EerNisse et al. | 73/702 |
| 4,817,049 | 3/1989 | Bates et al. | 364/900 |
| 4,860,580 | 8/1989 | DuRocher | 73/155 |
| 4,866,607 | 9/1989 | Anderson et al. | 364/422 |
| 4,936,147 | 6/1990 | EerNisse et al. | 73/703 |
| 4,959,999 | 10/1990 | Tamura | 73/755 |
| 4,976,142 | 12/1990 | Perales | 73/155 |
| 4,995,265 | 2/1991 | Stocker | 73/702 |
| 5,012,151 | 4/1991 | EerNisse et al. | 310/346 |
| 5,033,306 | 7/1991 | Tamura | 73/755 |

OTHER PUBLICATIONS

SPIDR ® Applications brochure, believed published prior to Jan., 1991.
Lynes RES TM -300 System brochure, published prior to Jan., 1991.
Amerada EPG-512 Surface Recording Electronic Pressure/Temperature Gauge brochure published prior to Jan. 1991.

*Primary Examiner*—Robert J. Warden
*Assistant Examiner*—Krisanne M. Thornton
*Attorney, Agent, or Firm*—Stephen R. Christian; E. Harrison Gilbert, III

[57] ABSTRACT

A self-contained multiple channel pressure recorder comprises a single, compact, portable housing containing two quartz pressure transducers and electrical circuits for sensing two pressures communicated into the housing to the pressure transducers, for sensing ambient temperature, and for converting the sensed pressures into electrical signals representing absolute pressure magnitudes compensated both for temperature and calibration effects. The resulting data can be locally displayed through a display mounted on the housing, or the data can be remotely transmitted through an electrical coupling mounted on the housing.

20 Claims, 19 Drawing Sheets

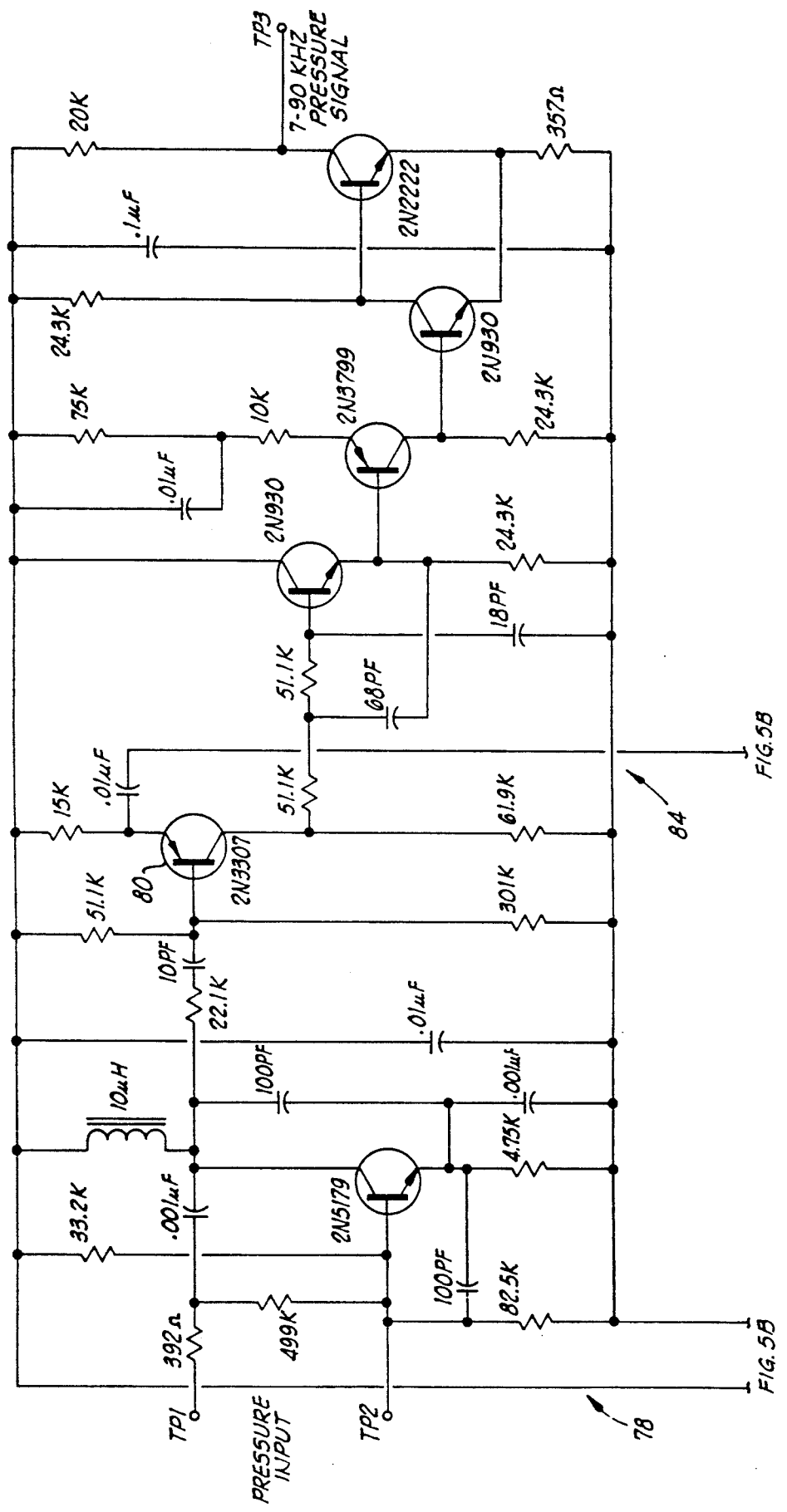

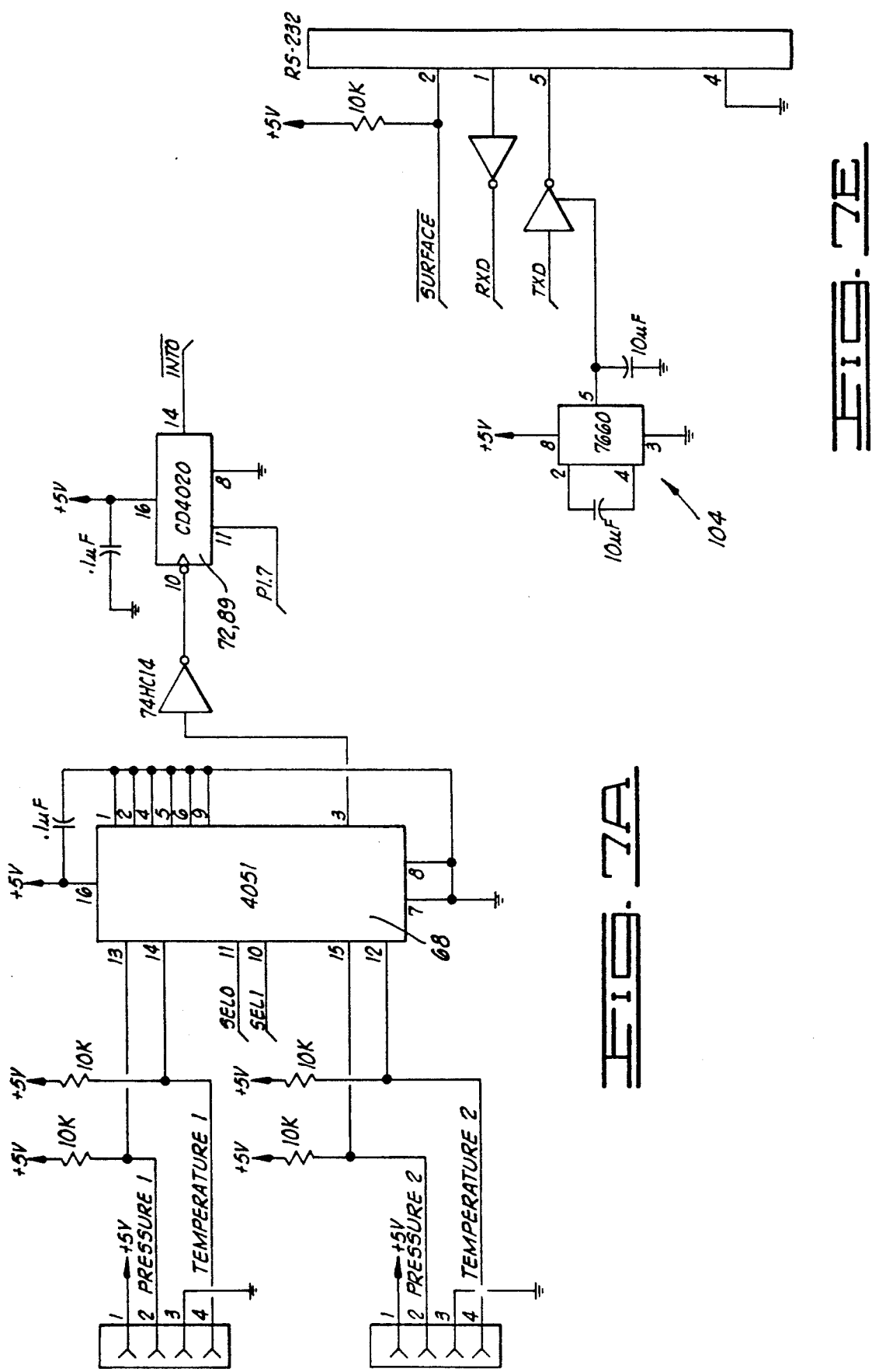

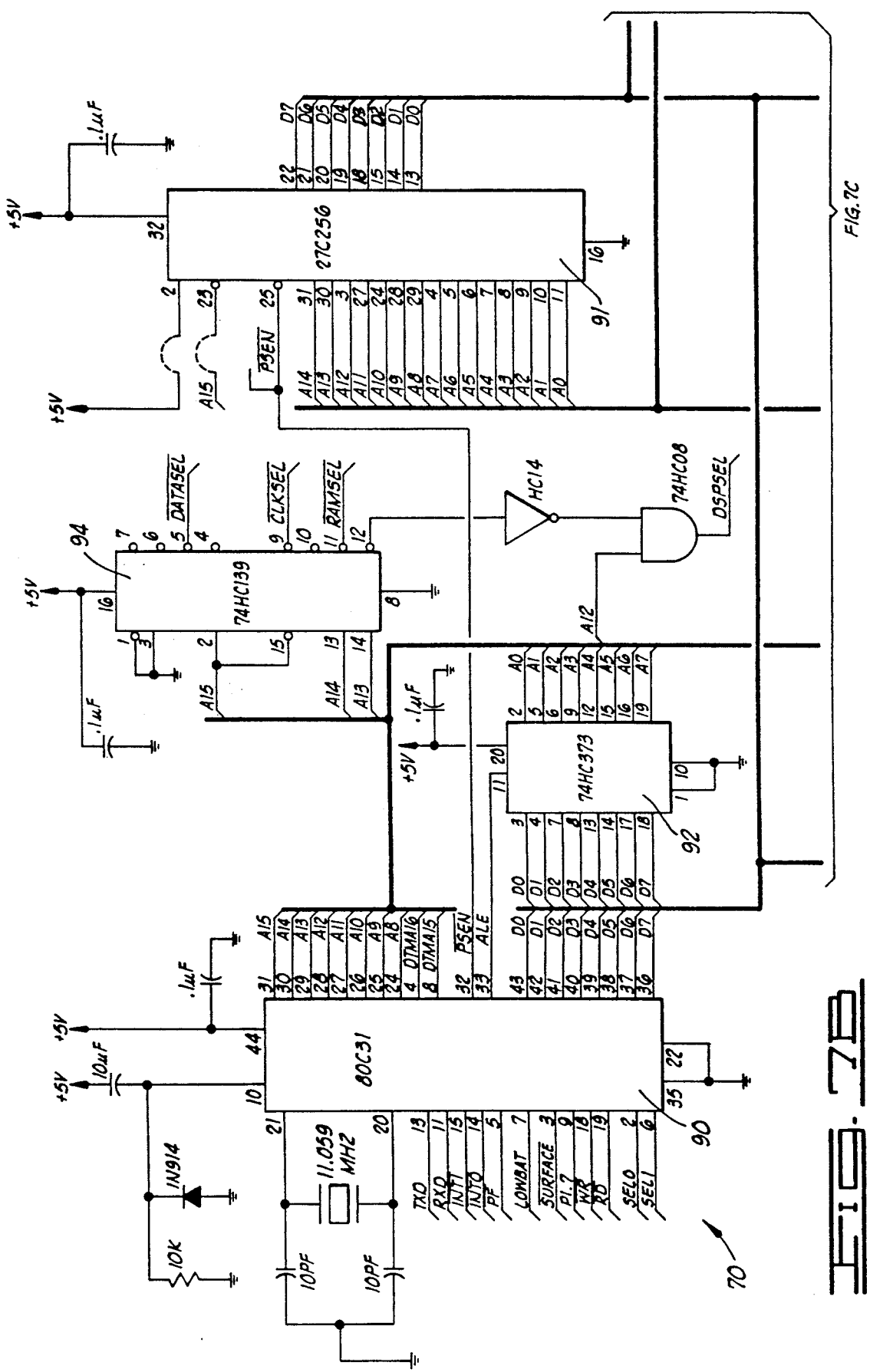

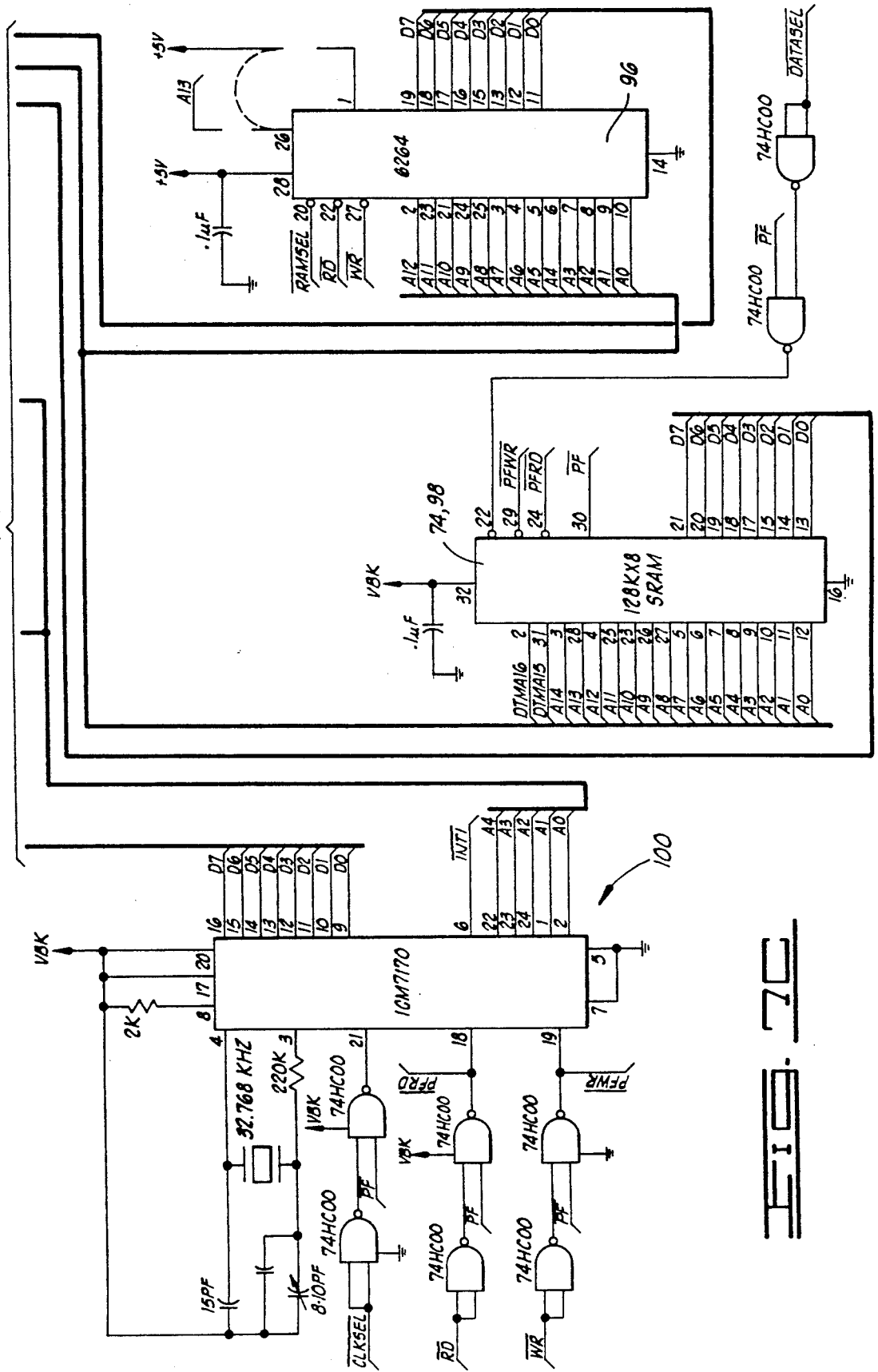

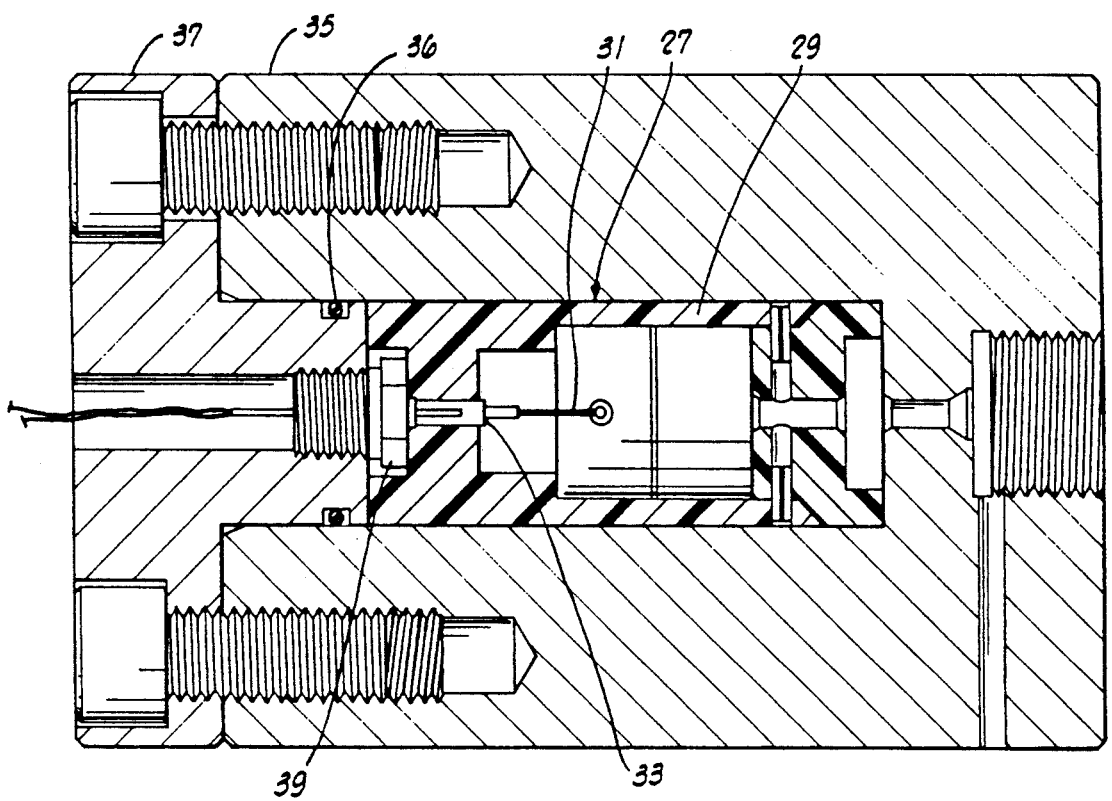

MULTIPLE CHANNEL PRESSURE RECORDER

BACKGROUND OF THE INVENTION

This invention relates to a multiple channel (particularly a two channel) microcomputer-based pressure recorder having internal pressure transducers that are intrinsically transportable with the recorder. The pressure recorder, specifically adapted for portable use at the surface of an oil or gas well, also has an internally stored data base which includes calibration factors that enable automatic correction of transducer-responsive signals into signals representing the correct magnitudes of sensed pressures.

Highly accurate quartz pressure transducers have been used in memory recorders lowered into oil or gas wells to sense pressures down in the wells and to provide electrical signals representative of the sensed pressures. Such signals have been stored downhole or transmitted to the surface for storage or display. These devices typically are not adapted for use at the surface of a well outside the well bore.

Although there are devices that can be used at the surface of such wells to record pressure, those that we are aware of typically have only one internal pressure sensor and/or do not provide outputs that are automatically corrected with calibration factors and locally displayed through integral real-time displays.

In view of the foregoing, there is the need for a pressure recorder specifically adapted for use at the surface of an oil or gas well that automatically provides corrected pressure values without requiring operator intervention. There is also the need for such a device to be able to simultaneously monitor at least two pressures with internal pressure transducers. For example, both tubing pressure and annulus pressure sometimes need to be monitored at the wellhead. These pressures cannot be monitored at the same time with a device that can be connected to only one pressure source at a time. There is the further need for a pressure recorder that has multiple highly accurate quartz pressure transducers as integral parts so that they are transportable with the recorder as a single self-contained unit. Such a pressure recorder should also be capable of locally displaying the corrected pressure values in real time and of transmitting the data in real time to a remote location.

SUMMARY OF THE INVENTION

The present invention overcomes the above-noted and other shortcomings of the prior art, and meets the needs mentioned above, by providing a novel and improved multiple channel pressure recorder. The pressure recorder can internally sense and record, and locally display and transmit to a remote location in real time, automatically corrected pressure values from at least two simultaneously monitored pressure sources connected to the invention at the surface of an oil or gas well. The pressure recorder of the present invention is a single, compact, portable, self-contained unit having internally contained quartz pressure transducers.

The present invention provides a multiple channel pressure recorder, comprising: a portable housing adapted to be used at the surface of an oil or gas well; a first quartz pressure transducer disposed in the housing; a second quartz pressure transducer disposed in the housing; a microcomputer disposed in the housing; first circuit means, disposed in the housing and connected to the first quartz pressure transducer and the microcomputer, for communicating to the microcomputer a signal responsive to a pressure sensed by the first quartz pressure transducer; second circuit means, disposed in the housing and connected to the second quartz pressure transducer and the microcomputer, for communicating to the microcomputer a signal responsive to a pressure sensed by the second quartz pressure transducer; and wherein the microcomputer includes a memory programmed with a data base including predetermined calibration factors for converting the signals responsive to the sensed pressures into corrected signals representing the magnitudes of the sensed pressures.

The present invention more particularly provides a multiple channel pressure recorder, comprising: a portable housing, which housing is sealed against contamination by the environment at the surface of an oil or gas well; a first quartz pressure transducer gauge assembly disposed in the housing; a second quartz pressure transducer gauge assembly disposed in the housing; a first pressure transducer circuit connected to the first quartz pressure transducer gauge assembly and disposed in the housing adjacent the gauge assemblies; a second pressure transducer circuit connected to the second quartz pressure transducer gauge assembly and disposed in the housing adjacent the gauge assemblies; a first temperature sensing circuit disposed in the housing adjacent the first pressure transducer circuit; a second temperature sensing circuit disposed in the housing adjacent the second pressure transducer circuit; and a microcomputer disposed in the housing and connected for receiving signals from the first and second pressure transducer circuits and the first and second temperature sensing circuits, which microcomputer includes means for automatically computing corrected pressure magnitude signals in response to signals from the first and second pressure transducer circuits, the first and second temperature sensing circuits and predetermined calibration factors entered in the microcomputer.

Therefore, from the foregoing, it is a general object of the present invention to provide a novel and improved multiple channel pressure recorder. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIGS. 5A and 5B are a schematic circuit diagram of one pressure transducer circuit of the preferred embodiment.

FIGS. 7A–7G are schematic circuit diagrams of the microcomputer circuit and auxiliary circuits of the preferred embodiment.

FIG. 8 is a sectional view of one of the transducer gauge assemblies.

FIGS. 9A-9I are flow charts of the program stored in memory of the microcomputer for controlling its operation.

DETAILED DESCRIPTION OF PREFERRED EMBODIMENT

Figure 1:
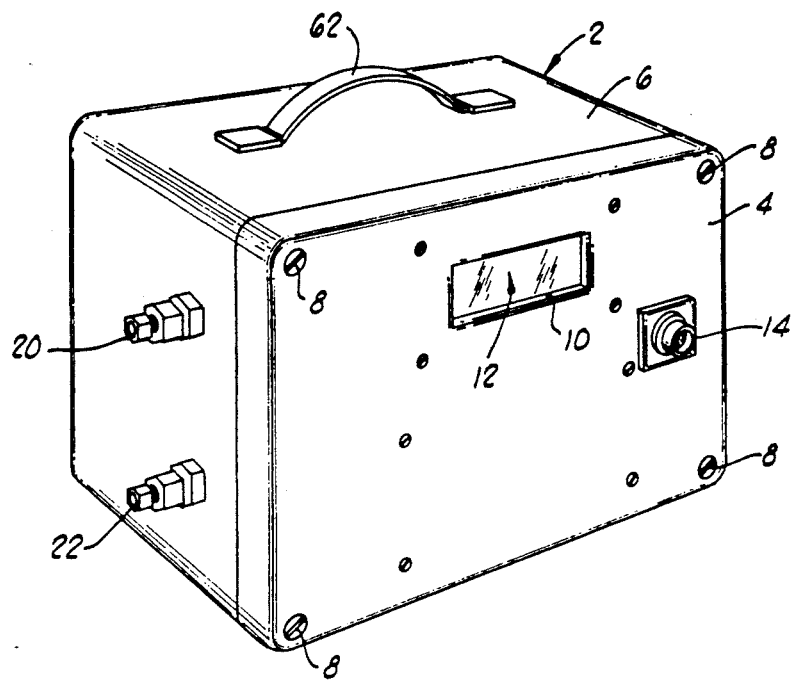
FIG. 1 is an exterior perspective view of the pressure recorder of the preferred embodiment of the present invention.

Referring to FIG. 1, the portable self-contained two channel pressure recorder of the preferred embodiment includes a single compact housing 2 that can be hand-carried by an individual. The housing 2 contains all the components of the invention.

The housing 2 has two bodies 4, 6 that are releasably connected together by four screws 8. The connection is made so that a seal is provided between the coupled bodies 4,6 to protect the internal components inside the hollow interior of the housing 2 from the surrounding environment outside the housing 2. The sealing and the material of which the housing 2 is made are such as to particularly adapt the housing 2 to be used at the surface of an oil or gas well. For example, the seal can include mating groove 7a and rib 7b shown in FIG. 2, and the material of construction can include any suitable substance (e.g., polyurethane, neoprene, silicon, RFI).

Figure 2:
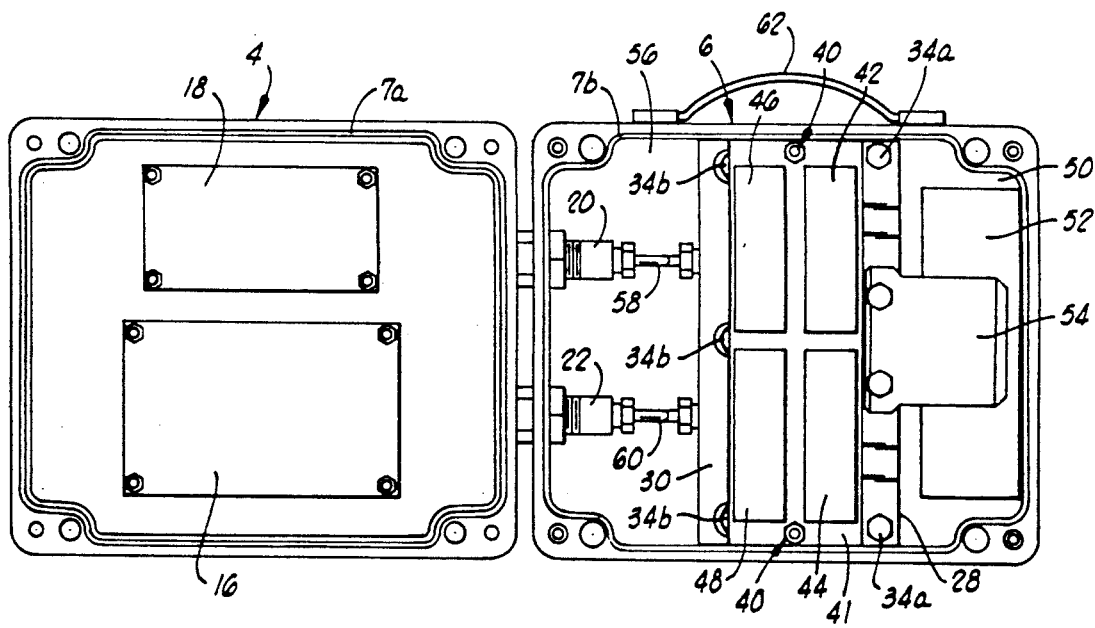
FIG. 2 is an interior view of the pressure recorder of FIG. 1.

The housing body 4 has an aperture 10 through which a liquid crystal display 12 is visible outside the housing 2. The housing body 4 has another aperture through which a single electrical communication coupling 14 is mounted. The coupling 14 has a plurality of electrical conductors, such as metallic pins or sockets, over which all external electrical communications with the pressure recorder are made by connecting a mating coupling as known in the art. Referring to FIG. 2, attached to the inside of the housing body 4 are two printed circuit boards 16, 18 containing the main processing circuits and the display circuit, respectively, which circuits will be more particularly described hereinbelow.

Referring to FIGS. 1 and 2, the housing body 6 has two apertures through which two pressure couplings 20, 22 are mounted. The pressure couplings 20, 22 include autoclave bulkhead fittings mounted outside the housing, for use with ¼" O.D. (outer diameter) high pressure tubing. The tubing connects these fittings to ¼" autoclave collars and glands at respective transducer gauge assemblies 24, 26 inside the housing body 6 (see FIG. 3). The outside bulkhead fittings can be connected to ¼" high pressure tubing, which can then be connected to autoclave valves, capillary tubing, various adapters, etc. The pressure couplings 20, 22 are filled with an electrically non-conductive liquid, such as sebacate, in communication with the same type of liquid inside the quartz pressure transducer gauge assemblies 24, 26.

Figure 3:
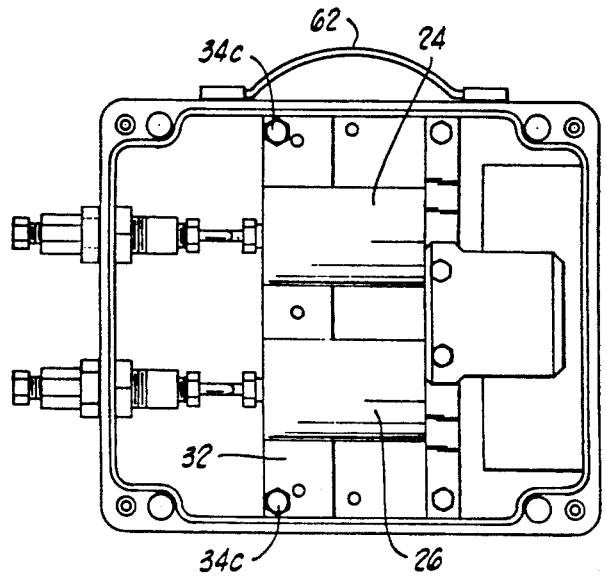
FIG. 3 is a portion of the interior view of FIG. 2, but with pressure transducer and temperature sensing circuit boards and a transducer gauge assembly clamp removed.

Referring to FIGS. 2 and 3, the gauge assemblies 24, 26 are held in place within the housing body 6 by a bulkhead 28 and upper and lower clamps 30, 32 secured to the housing body 6 by screws 34a, 34b, 34c, respectively. The bulkhead 28 extends perpendicularly from the back wall of the housing body 6 and has two parallel lateral holes defined in it for receiving respective ends of the gauge assemblies 24, 26 and for permitting wires to pass therethrough for connecting to electrical circuits subsequently described. The clamp 32 is adjacent the back wall of the housing body 6, and the clamp 30 is spaced parallel to the clamp 32. The clamps 30, 32 are defined with two notches each to receive respective circumferential portions of the gauge assemblies 24, 26.

Referring to FIG. 8, each gauge assembly 24, 26 has a quartz crystal pressure transducer 27 sensitive to pressure changes. The crystal of the transducer is partially enclosed in a Teflon housing 29, where wires 31 (one shown) from the crystal are connected to electrical sockets 33 (one shown) at one end of the housing 29. This Teflon housing 29 is placed in a high pressure chamber defined by a body 35 and a cap 37. When assembled, a high pressure electrical feedthrough 39 on the cap 37 of the pressure chamber is connected to the sockets 33 so that the crystal can be connected to an electrical oscillator circuit outside the pressure chamber. An O-ring 36 is mounted on the cap 37 to seal against the body 35. A Kapton washer is used with the high pressure feedthrough. The end of the pressure chamber body 35 opposite the end that receives the cap 37 threadedly receives a coupling for connecting tubing from the respective pressure coupling 20, 22 (see tubes 58, 60 in FIG. 2). Liquid is contained in the chamber or compartment defined within the pressure chamber body 35, and it is in pressure communication with liquid in the respective tube 58, 60 when the present invention is assembled.

Referring to FIG. 2, connected outwardly of the gauge assemblies 24, 26 by nut and bolt combinations 40 is a support plate 41. Mounted on the plate 41 are four printed circuit boards 42, 44, 46, 48. The printed circuit boards 42, 44 contain the circuitry for respective pressure transducer circuits, and the printed circuit boards 46, 48 contain respective temperature sensing circuits. These circuits will be further described hereinbelow.

Defined in the housing body 6 on the side of the bulkhead 28 opposite where the gauge assemblies 24, 26 are disposed is a cavity 50 in which a rechargeable battery 52 is retained by a removable bracket 54 bolted to the bulkhead 28. The battery 52 is the primary power supply for the pressure recorder of the present invention. Defined in the housing body 6 on the side of the bulkhead 28 where the gauge assemblies 24, 26 are disposed is a cavity 56.

To make it easy for one person to carry the pressure recorder, a handle 62 is attached to the top of the housing body 6.

Figure 4:
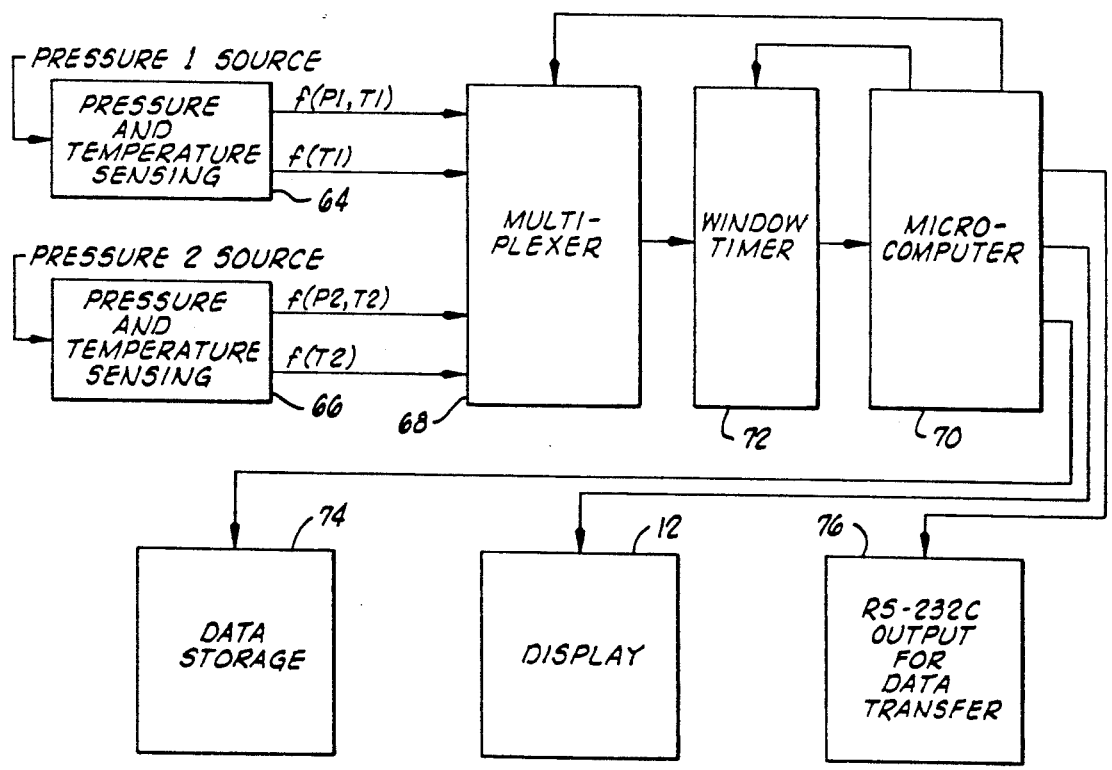
FIG. 4 is a block diagram of electrical circuits of the preferred embodiment pressure recorder.

The pressure recording achieved with the present invention occurs through the operation of the various electrical circuits generally referred to above. This recording occurs in response to pressure communicated to the pressure transducers in the gauge assemblies 24, 26 from external pressure sources connected to the pressure couplings 20, 22 in known manner and as generally represented in FIG. 4. The gauge assembly 24, the pressure transducer circuit on the printed circuit board 42 and the temperature sensing circuit on the printed circuit board 46 make up the combined pressure and temperature sensing circuits 64 depicted in FIG. 4. The gauge assembly 26, the pressure transducer circuit on the printed circuit board 44 and the temperature sensing circuit on the printed circuit board 48 are included in the combined pressure and temperature sensing circuits 66 of FIG. 4. Each of the circuits 64, 66 outputs two respective electrical signals. One of the signals (the one from the pressure transducer circuit) has a frequency proportional to pressure and temperature, and the other signal (the one from the temperature sensing circuit) has a frequency proportional to temperature.

The signals from the circuits 64, 66 are individually selected through a multiplexer 68 controlled by a microcomputer 70 as represented in FIG. 4. The selected signal is processed through a window timer 72 which also operates in response to control from the microcomputer 70. The window timer provides a single pulse (i.e. a window) that is proportional to the selected signal during which the microcomputer counts internal microcomputer pulses proportional to its clock frequency. The number of internal pulses that the microcomputer counts is proportional to the frequency of the selected signal.

The microcomputer 70 comprises a microprocessor and a memory programmed for operating the microprocessor. Flow charts of the program for the preferred embodiment are shown in FIGS. 9A-9I, which will be further described hereinbelow. In general, however, the program causes the microcomputer 70 to receive the pulses from the window timer 72 and to convert those responsive to the sensed pressure into an absolute pressure magnitude. The conversion occurs in response to the corresponding sensed temperature and to predetermined calibration factors entered in the memory.

The various data received and computed by the microcomputer 70 are stored in data storage memory 74 depicted in FIG. 4. The data can also be displayed through the display 12 identified in FIG. 1 and also represented in FIG. 4, and the data can also be transferred out of the recorder through the electrical coupling 14 which has conductors connected to an RS-232 interface 76 depicted in FIG. 4.

Figure 5B:
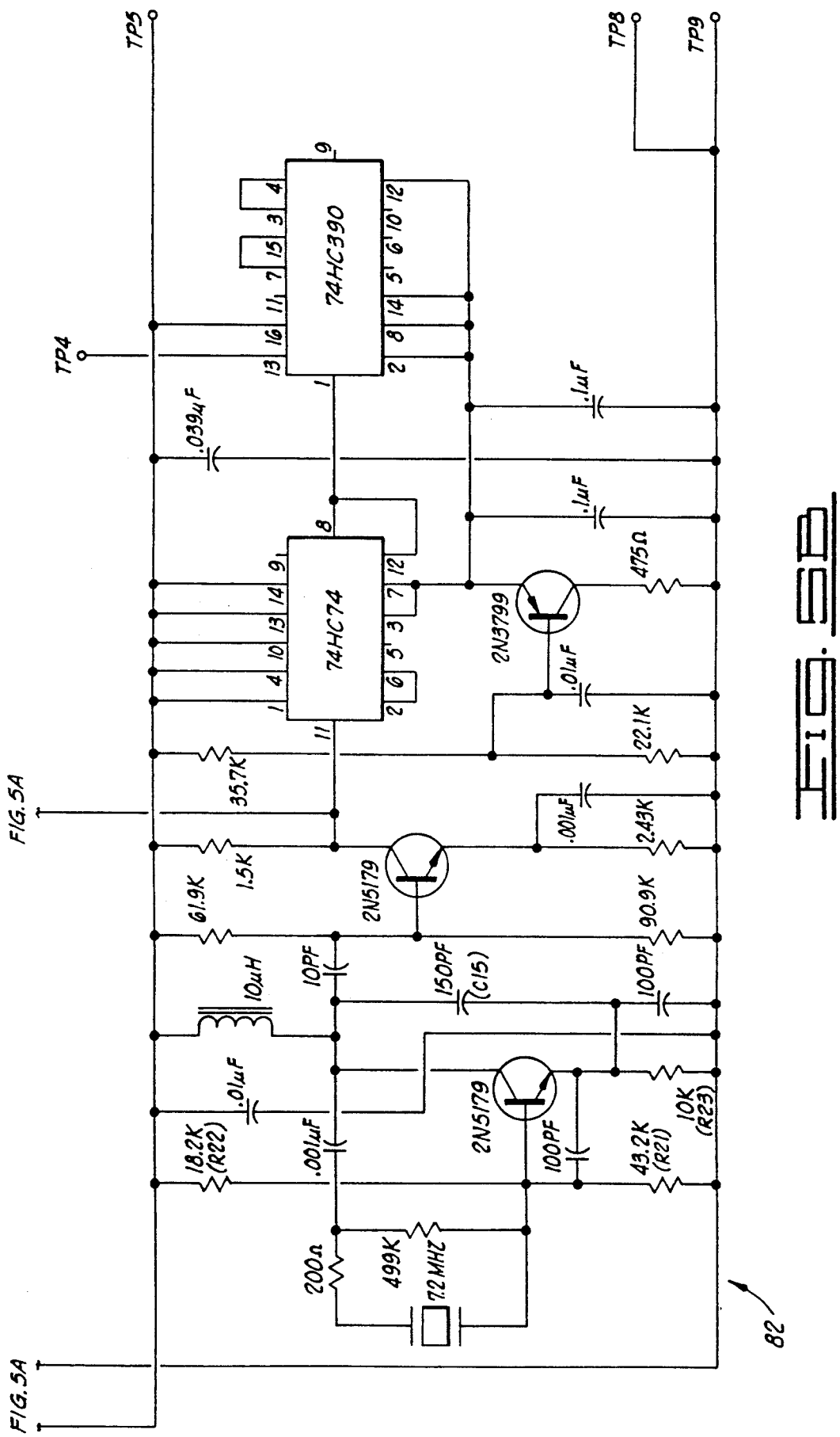
Figure 6:
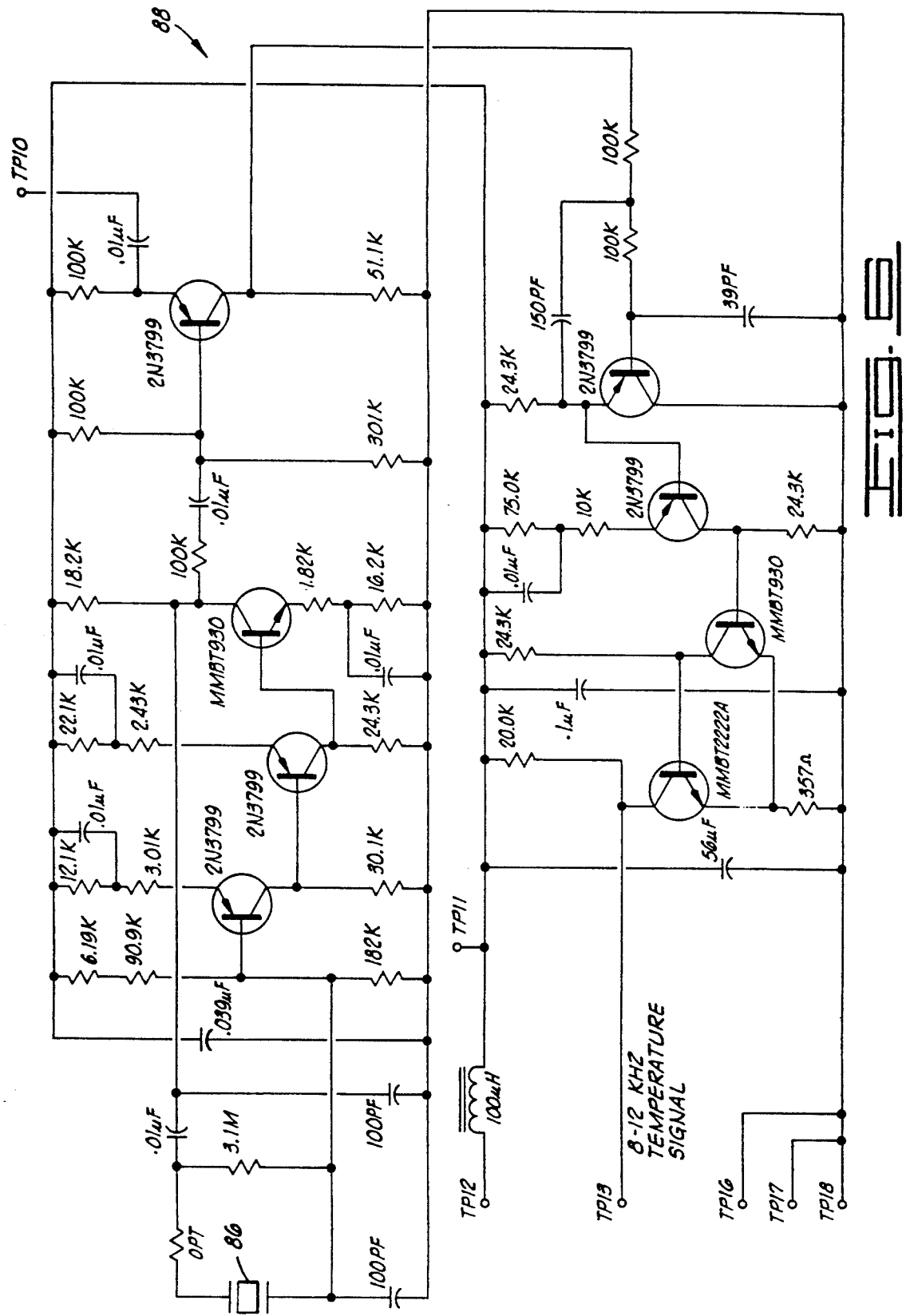
FIG. 6 is a schematic circuit diagram of one temperature sensing circuit of the preferred embodiment.

Particular implementations of the circuits referred to in FIG. 4 are more particularly shown in FIGS. 5-7. These particular implementations are self-explanatory to those skilled in the relevant arts so they will be described only briefly.

A particular implementation of the pressure transducer circuit contained on each of the printed circuit boards 42, 44 and included in each of the circuits 64, 66 of FIG. 4 is shown in FIGS. 5A and 5B. The pressure input called for in FIG. 5A is the pressure sensitive crystal of the respective gauge assembly 24, 26. As the crystal connected to these input terminals responds to pressure communicated through the respective pressure coupling 20, 22 and tubing 58, 60, the frequency of an oscillator 78 shown in FIG. 5A changes (the respective pressure transducer crystal is part of the oscillator 78). The output of the oscillator 78 drives a transistor 80 to gate a reference signal from a reference oscillator 82 (FIG. 5B). The gated signal passes through a signal conditioning and amplifying output circuit 84 (FIG. 5A), and the resulting 7-90 kHz output signal indicated in FIG. 5A is one of the pressure-and-temperature responsive signals provided to the multiplexer illustrated in FIG. 4. The reference oscillator 82 of the FIG. 5B implementation is set up for a particular SC-cut quartz pressure transducer used by Halliburton Services; for an AT-cut quartz pressure transducer used by Halliburton Services, the following component values are preferred: R21, 82.5 k; R22, 33.2 k; R23, 18.0 k; C15, 100 pf.

To insure adequate temperature compensation of the foregoing signal that is affected both by pressure and temperature, the temperature sensing circuits on the printed circuit boards 46, 48 are used (one for each channel of pressure sensing). Each of these circuits is the same, and a particular implementation for one of these is shown in FIG. 6. A temperature responsive crystal 86 is mounted on the respective circuit board in an oscillator circuit 88. In the illustrated particular implementation, the crystal 86 is a torsional mode tuning fork MX-IT 190.5 kHz ±1 kHz temperature sensitive crystal that is in a cylindrical can roughly ¼" in length and 1/16" in diameter. This temperature sensor is mounted inside the feedthrough cavity of the respective pressure cap 37. This allows the temperature of the pressure crystal to be more closely monitored. As the response of the crystal 86 changes with sensed ambient temperature, the frequency of the oscillator output signal varies. This signal is conditioned and amplified and provided as an 8-12 kHz signal to one of the inputs of the multiplexer 68.

Particular implementations of the multiplexer 68 and the window timer 72 are shown in FIG. 7A. The output from a counter 89 implementing the window timer 72 is provided to an input of the microcomputer 70 having a particular implementation shown in FIG. 7B.

The microcomputer 70 includes a microprocessor 90 that operates in response to a program stored in a program memory 91 shown in FIG. 7B. Control and data transfers occur over the designated address, data and control lines of the microprocessor 90 and a latch 92 and a decoder 94 shown in FIG. 7B.

Operating memory space is provided in a random access memory 96, and data storage memory 74 is provided in random access memory 98, both shown in FIG. 7C. Also shown in FIG. 7C is a real time clock circuit 100.

Figure 7D:
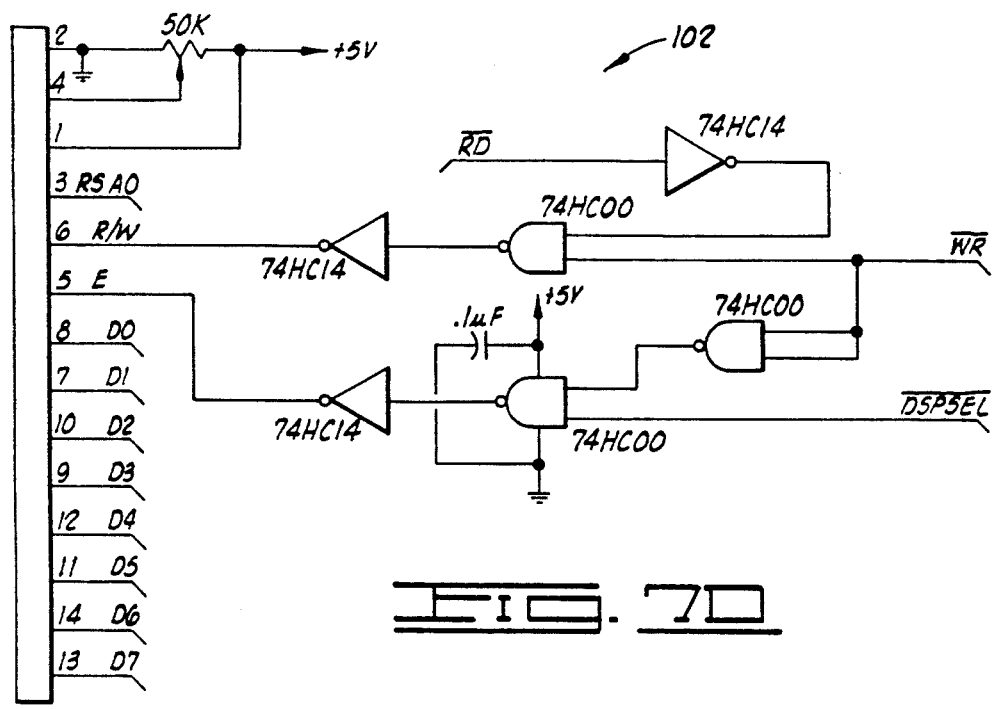
Figure 7G:
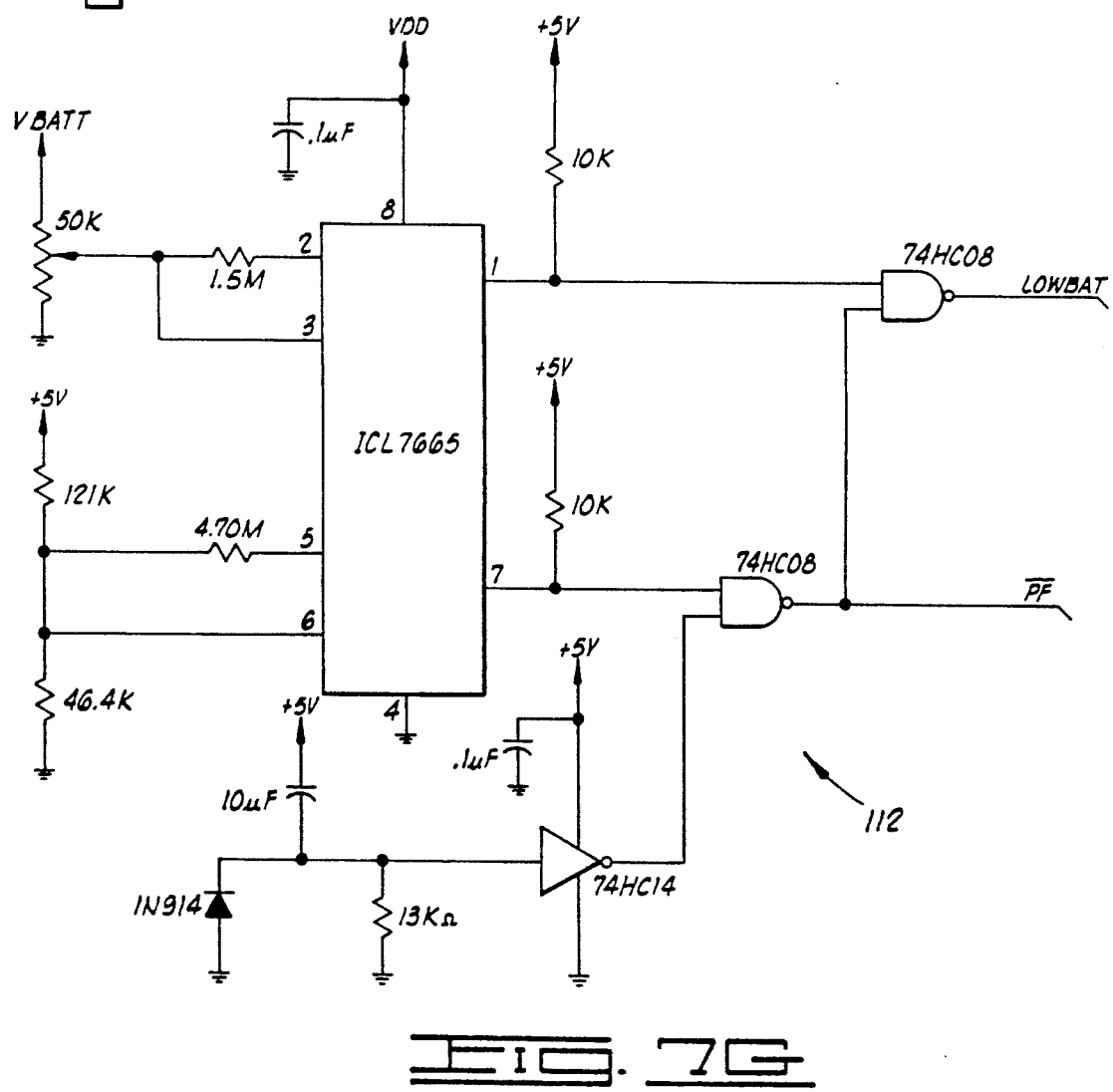

Data to be communicated through the display 12 is output through a display interface circuit 102 shown in FIG. 7D. Data to be communicated through the electrical connector 14 (FIG. 1) is output to the connector 14 through an interface circuit 104 (FIG. 7E) implementing the interface 76 of FIG. 4.

Figure 7F:
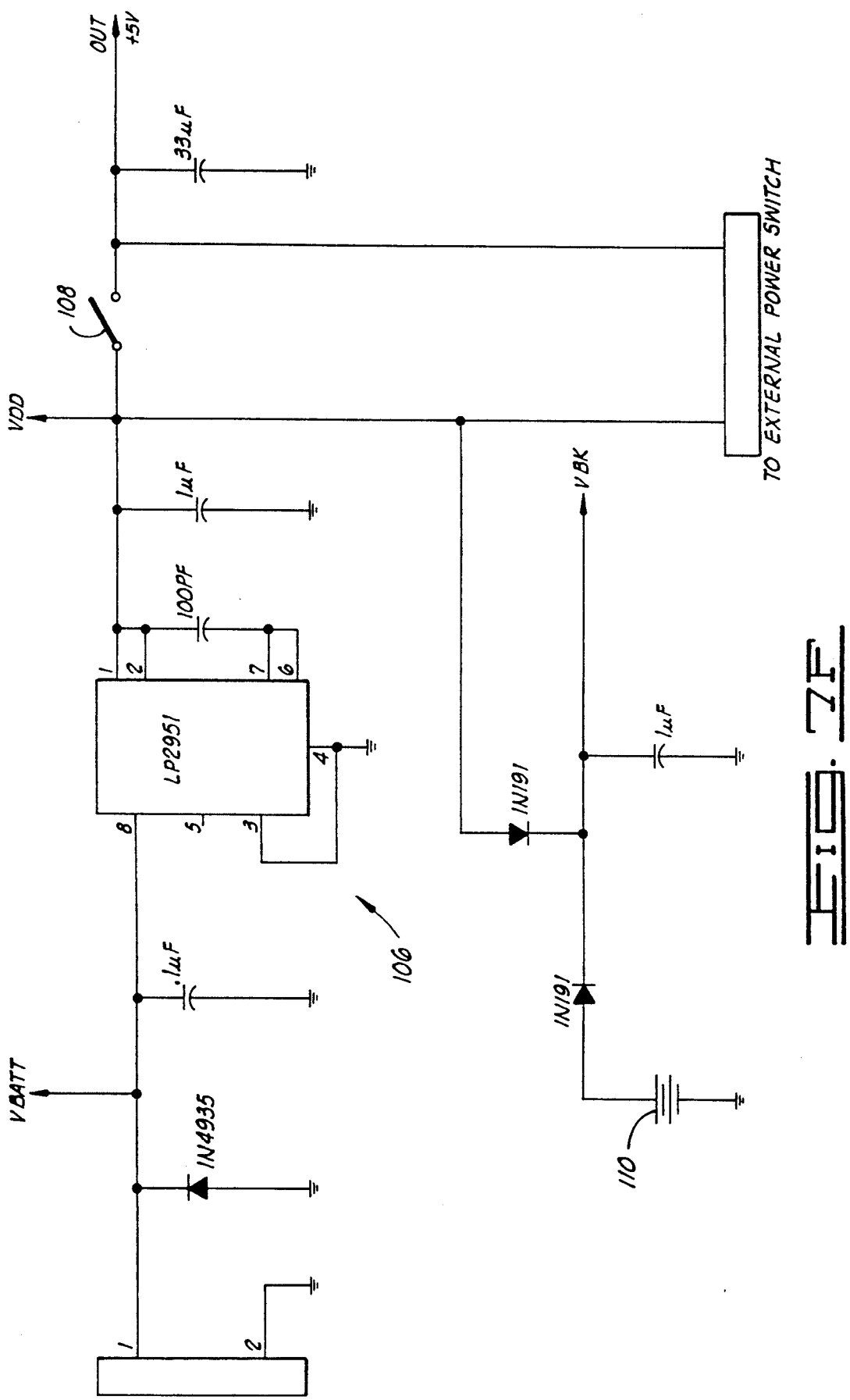

To convert the level of the primary power supply battery 52 to the proper level for the circuits of the particular implementation, a power level converter circuit 106 is provided as shown in FIG. 7F. The pressure recorder is energized by this power when either an internal switch 108 or an external switch (not shown) connected through the electrical coupling 14 is closed. Backup power is provided by a battery 110 shown in FIG. 7F. The battery level of the off-board rechargeable battery 52 is monitored through a battery monitoring circuit 112 shown in FIG. 7G.

The components described above with reference to FIG. 7 are mounted on the printed circuit board 16 connected inside the housing body 4.

Mounted on the printed circuit board 18 also attached inside the housing body 4 is the particular implementation of a display circuit. The display unit is a liquid crystal display (LCD). The display of the preferred embodiment is an already assembled LCD module with controller, memory, etc. This type of module can be purchased from several LCD manufacturers. A specific model is a Densitron LM2434A4C20SNY.

The flow charts representing the program for controlling the microcomputer 70 will next be described with reference to FIGS. 9A-9I. The main program flow chart is shown in FIG. 9A, with the remaining flow charts of FIG. 9 showing those aspects of FIG. 9A which are not otherwise readily apparent.

Figure 9A:
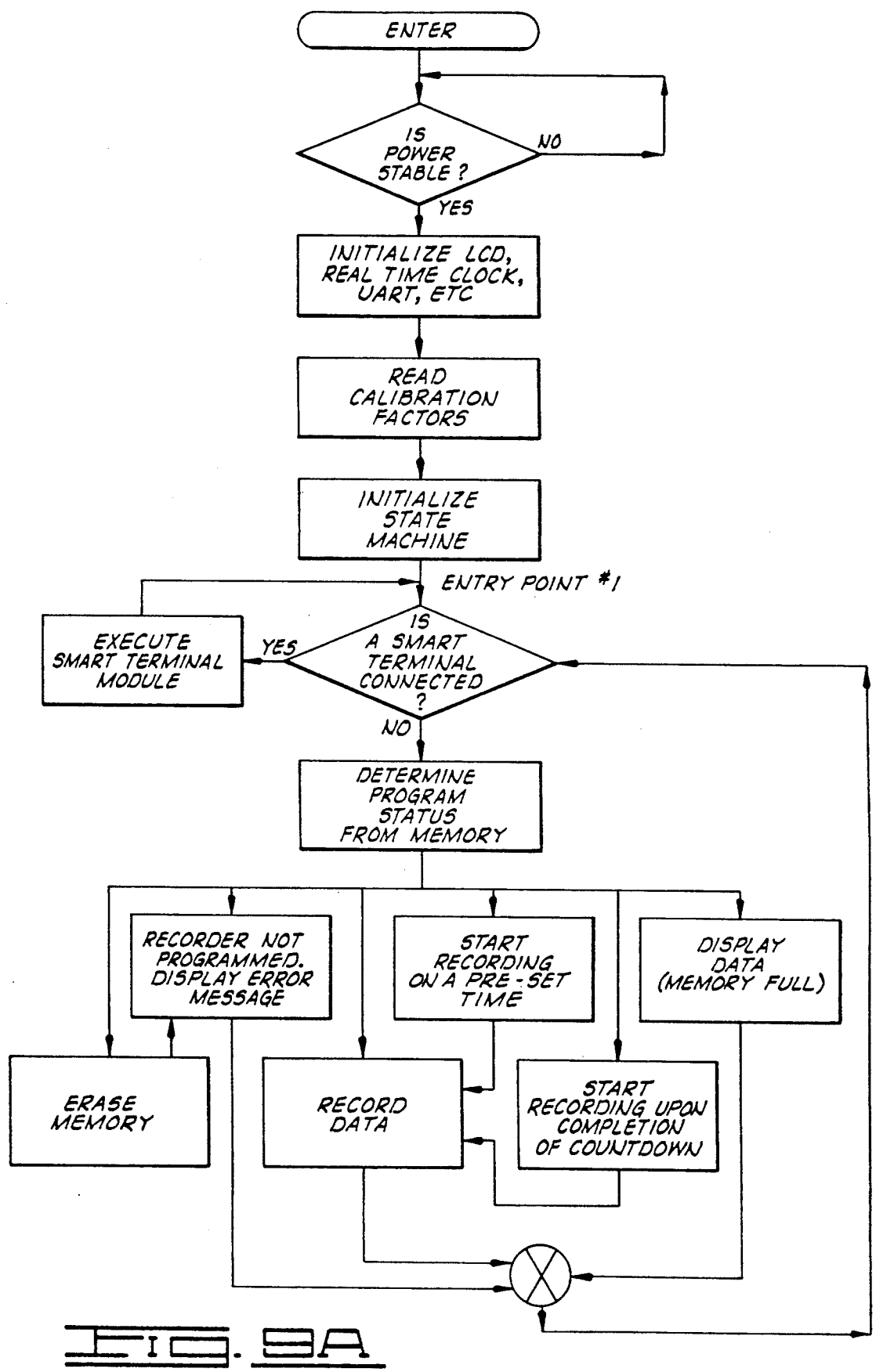

Referring to FIG. 9A, the program controls the microcomputer to insure that the power is stable, to initialize the various components of the circuitry shown in FIGS. 5-7, to read the calibration factors stored in the memory 91, and to initialize the state machine. Initializing the state machine means placing the "state" of the microcomputer in state A state (the microcomputer of the preferred embodiment has three main states) is where the microcomputer is at in its program execution. State 1 is a power up state, which first occurs as the microcomputer is turned on. State 2 is where a smart terminal (to be explained later) is connected to the microcomputer. This occurs when the right data is received from the microcomputer's serial port. State 3 is the data acquisition mode, where pressure and temperature are measured for two pressure sources.

Next, the microcomputer determines whether a smart terminal is connected. A smart terminal is any IBM PC or compatible computer that contains a hard drive with a program loaded onto it to communicate with the microcomputer and to issue commands, program, perform diagnostics, and download/upload data from the microcomputer. This is not part of the presently claimed invention. If one is connected, the microcomputer executes the smart terminal module shown in FIG. 9B. If one is not connected, it performs one of the routines shown in the boxes at the bottom of FIG. 9A.

Figure 9B:
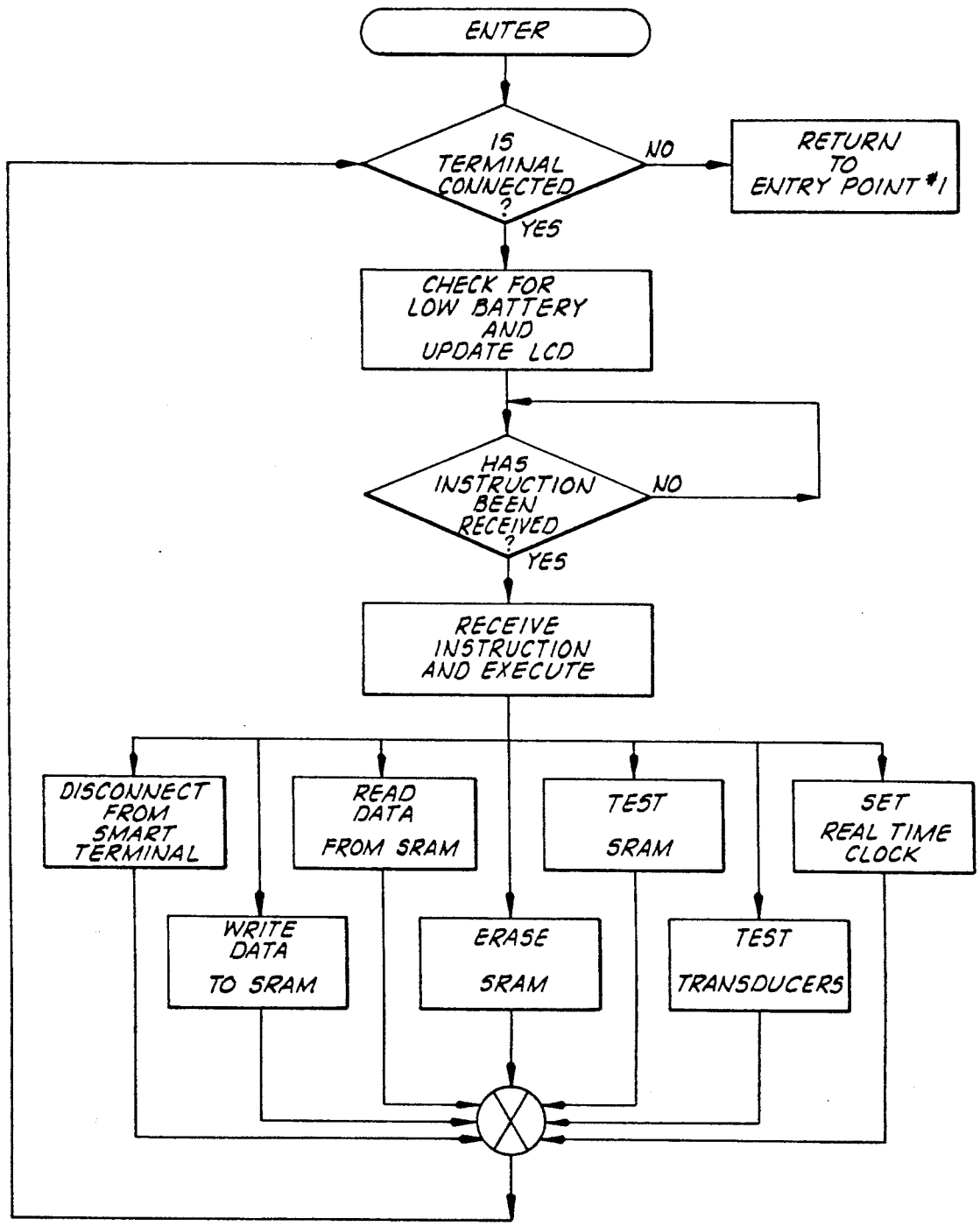

Referring to FIG. 9B, if a smart terminal is connected, the microcomputer checks for a low battery condition and updates the liquid crystal display. If an instruction has then been received, it executes it in accordance with the respective box representing one of the applicable instructions shown at the bottom of FIG. 9B.

If a smart terminal is not connected, the flow chart of FIG. 9A shows that the microcomputer then determines the program status from memory and performs one of the six indicated functions. That is, the microcomputer can erase memory and display an error or display an error message if the pressure recorder is not programmed. It can also display memory. The remaining functions shown in FIG. 9A include recording data, which can begin upon a preset time being reached or upon completion of a programmed countdown. The record data subprogram is shown in FIG. 9C; the start recording on a preset time subprogram is shown in FIG. 9D; and the start recording upon completion of countdown subprogram is shown in FIG. 9E.

Figure 9C:
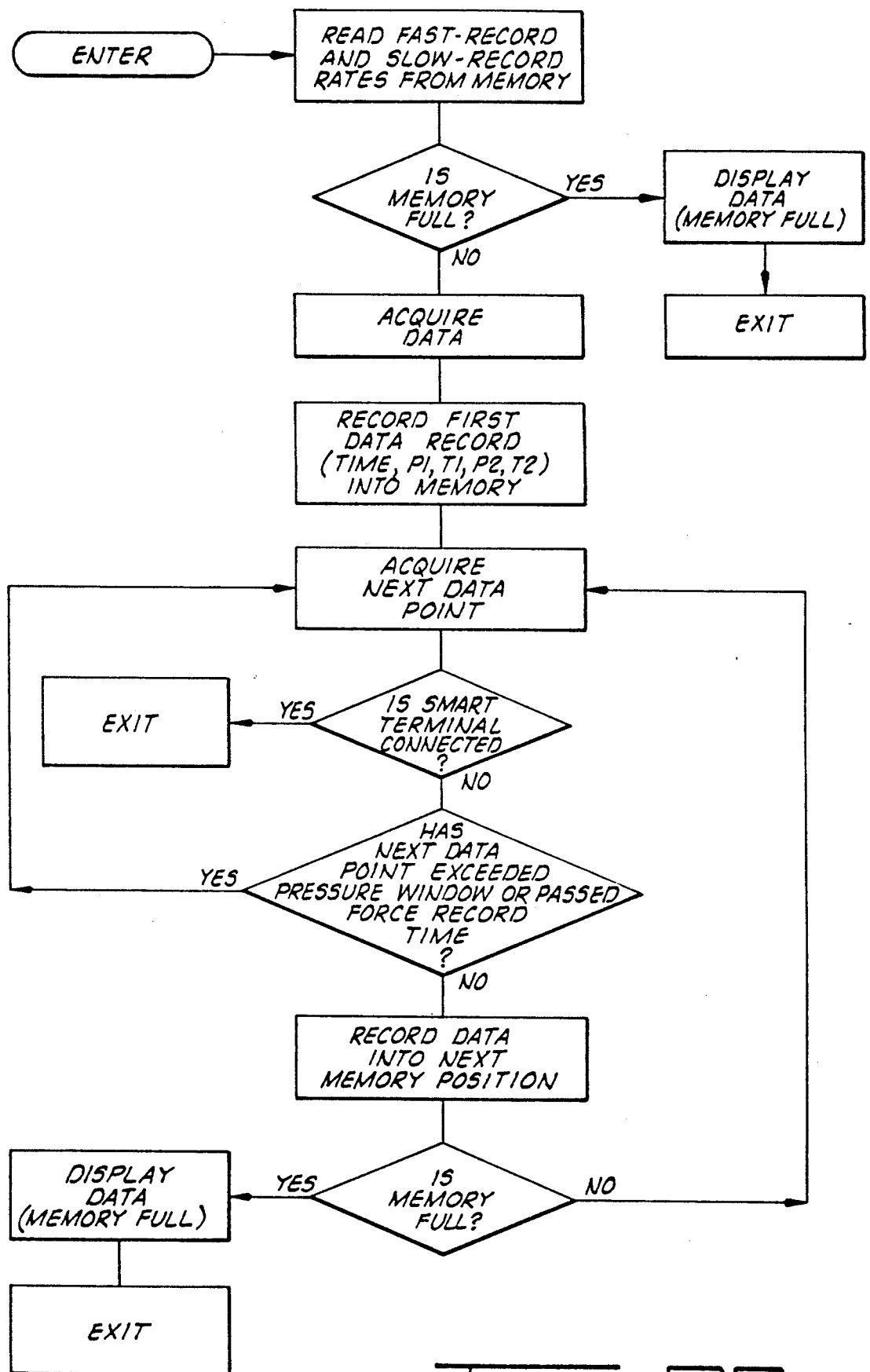
Figures 9D, 9E:
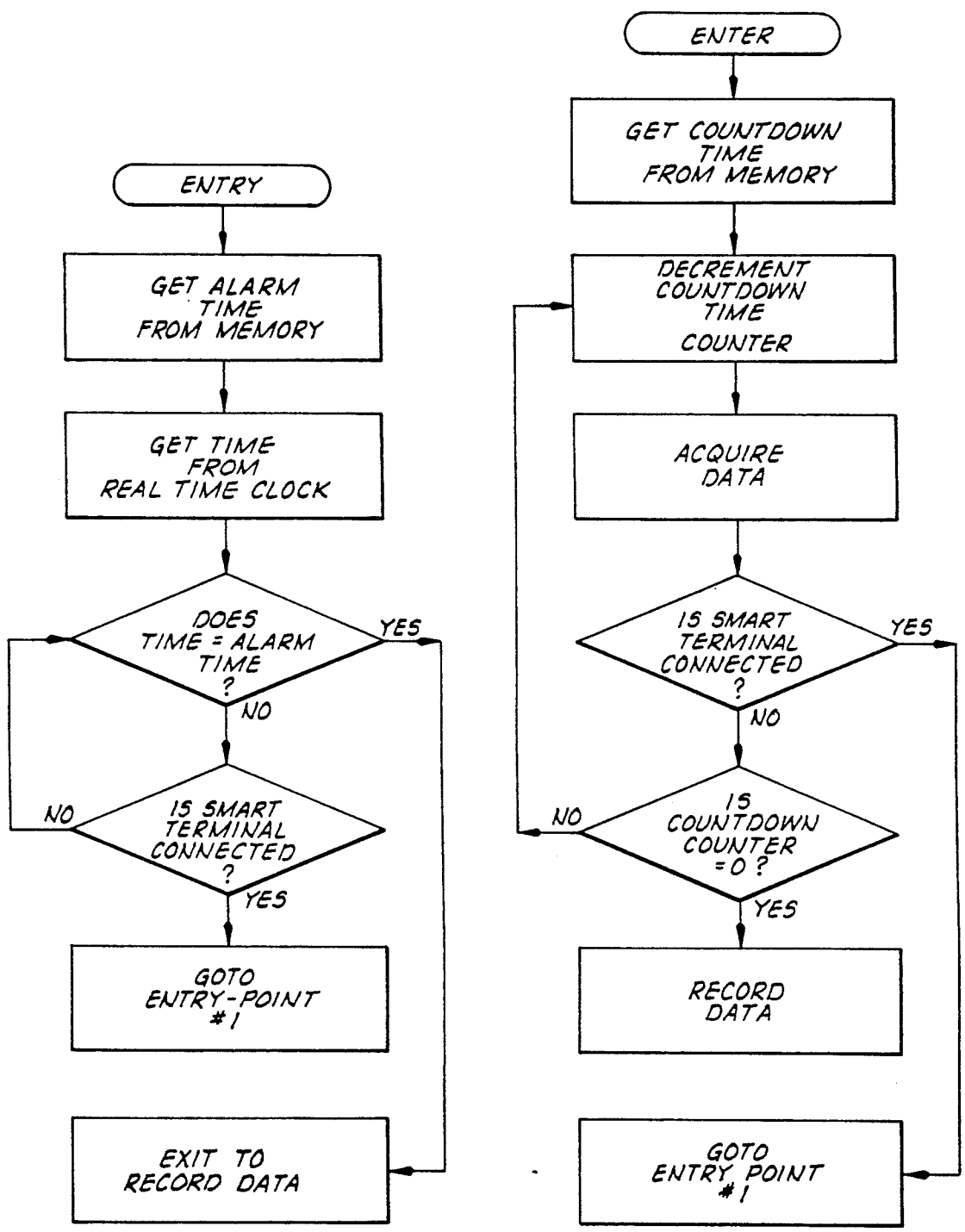

The steps set forth in FIG. 9C are self-explanatory except that the acquire data function is performed in accordance with the subprogram shown in FIGS. 9F-9G and except as to the decision "Has next data point exceeded pressure window or passed force record time?" This latter function refers to when data are recorded in the preferred embodiment, as explained as follows.

To prevent memory being used for recording a pressure that does not change very much over time, the preferred embodiment records when a sensed pressure changes some predetermined magnitude over a time interval (a pressure window), otherwise data points are taken at a slower rate. A slow record time and a fast record time are set via the smart terminal. The slow record time is the maximum amount of time that can occur between recorded, time stamped, data samples. The fast record time is the minimum time that can occur between recorded, time stamped, data samples. For example: fast record=10 seconds, and slow record=60 seconds. This means that for this example data points can be no closer together than 10 seconds or further apart than 60 seconds, but they can be apart any time between 10-60 seconds. If the slow record and fast record times are equal, a constant record time is achieved. However, if the slow and fast record times are different, variable recording occurs. If a pressure does not change very much over time, samples will be recorded every "SLOW RECORD TIME" seconds. However, once the "PRESSURE WINDOW" has been exceeded, data will be recorded instantly, providing that the last sample recorded was at least "FAST RECORD SECONDS" ago.

Figures 9F, 9G:
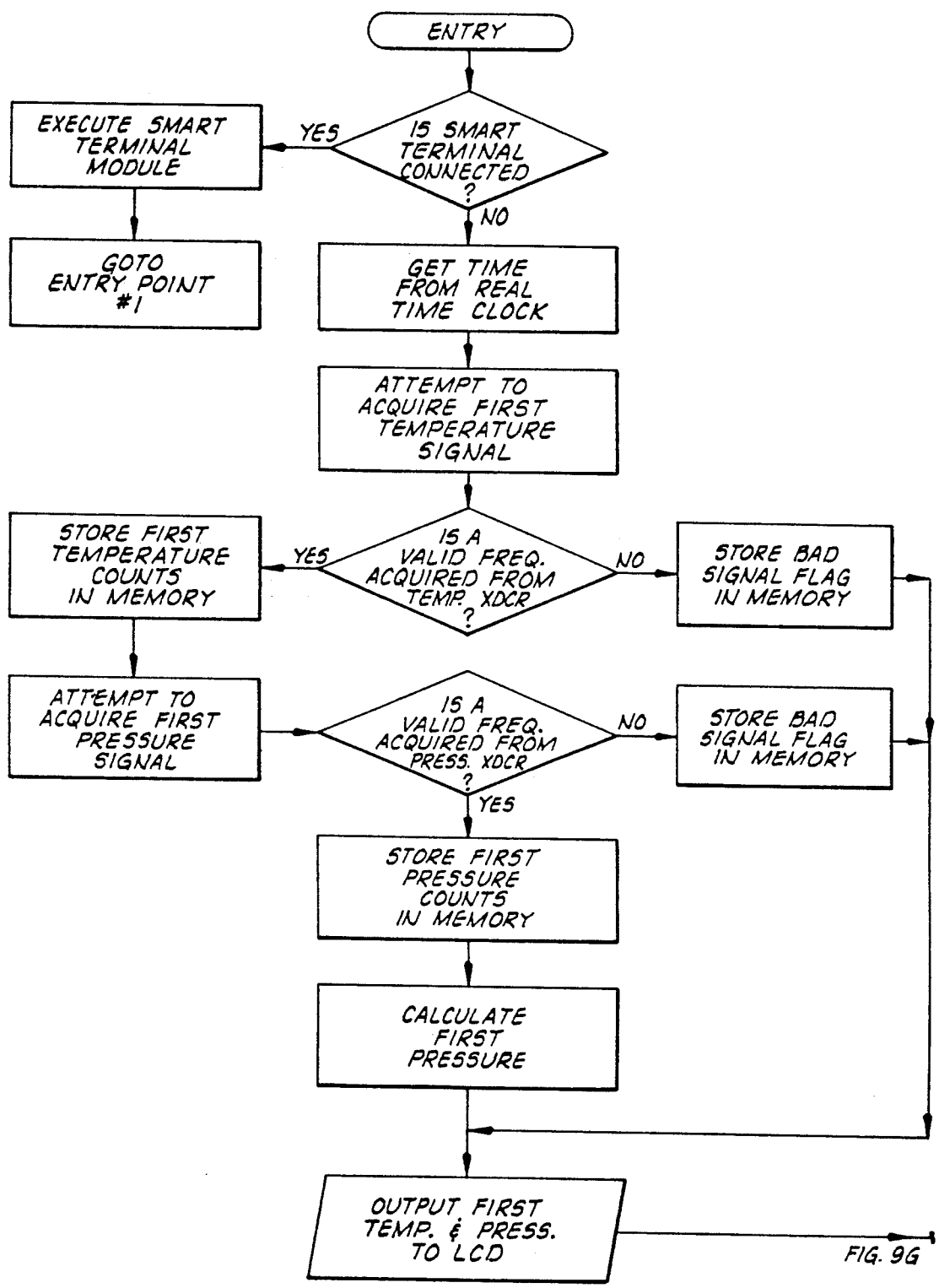
Figures 9F, 9G:
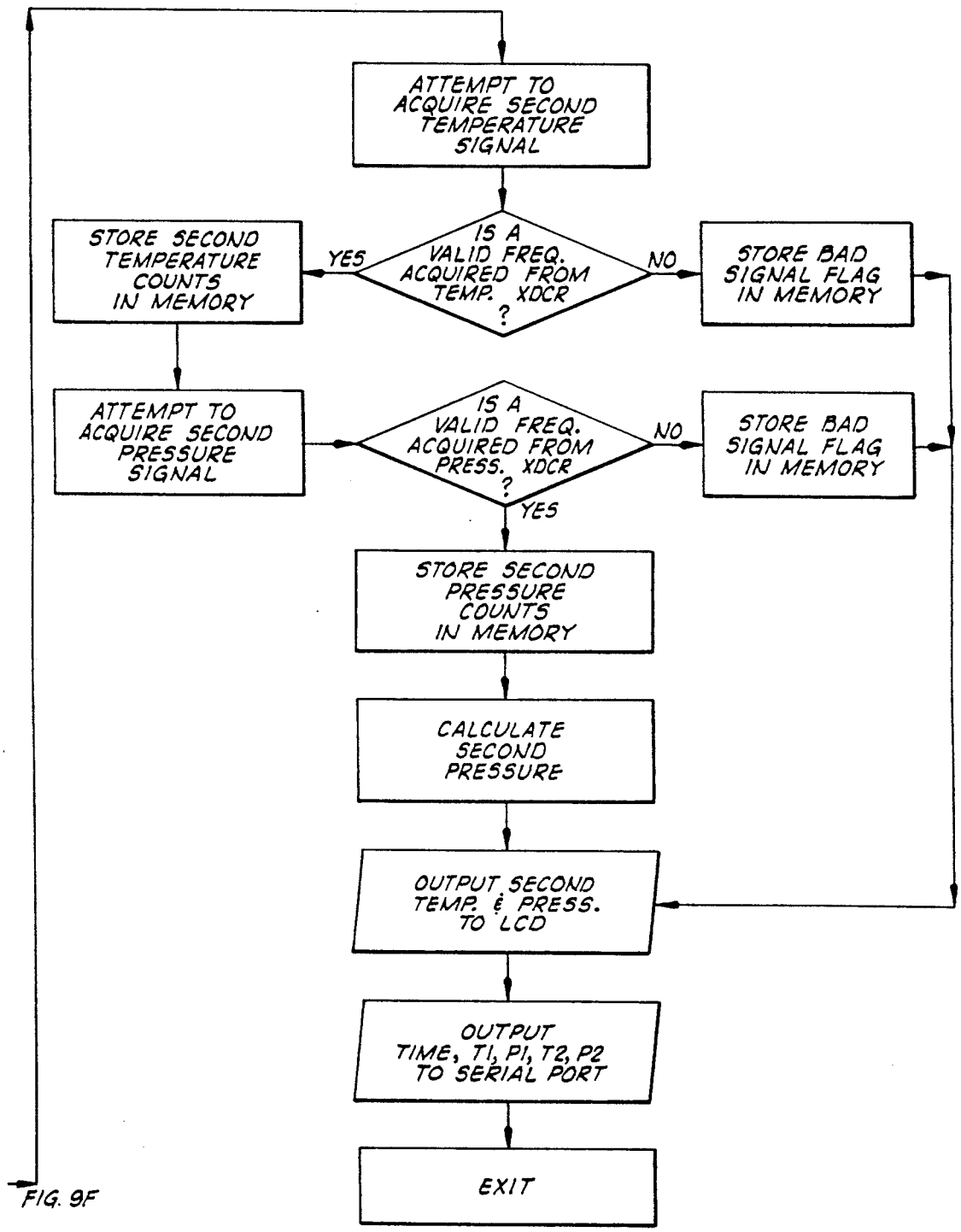

As to the flow chart of FIGS. 9F-9G describing the data acquisition routine, the steps are self-explanatory but the following further explanation about the preferred embodiment is given.

Every one second, the microcomputer attempts to acquire a frequency signal from the first temperature sensor. If it can, it determines the frequency by using the window counter, and then, using stored temperature coefficients, calculates the temperature. If a signal cannot be obtained, no pressure for the first transducer can be calculated, and so the microcomputer attempts to record from the second temperature and pressure sensors.

After obtaining a temperature, the microcomputer attempts to acquire a frequency signal from the respective pressure sensor. If it can, the microcomputer determines this frequency, and then, using a 4th order 2-dimensional least squares curve fit, along with the measured temperature frequency from above, the pressure is determined. If the microcomputer cannot measure the pressure frequency signal, it returns to check the other set of sensors.

Once an acquisition cycle is completed for one of the pressure sensing channels, the microcomputer then updates the display with the appropriate information. At the conclusion of a pair of cycles, the microcomputer dumps this data out the serial port. Therefore, both real-time display and transmission are provided.

Calibration for the foregoing is performed using a least squares curve fit. This is a way of taking over-determined data that can be non-linear and that represents some variable, such as temperature, and producing a set of coefficients that can be used in a polynomial equation to derive the unknown variable at points other than where the original data was taken. For example, the temperature of a temperature crystal can be said to be a function of the frequency of the temperature crystal, and using least squares, and several data points (at least n+1 points), an nth order equation can be used to describe the temperature given the temperature frequency. This method can be expanded to include a variable that is a function of two measured quantities. For example, pressure can be said to be a function of both temperature frequency and pressure frequency. In solving for the least squares coefficients, smaller numbers are desired to provide for easier mathematics. This can be provided for by using an offset. All this can be seen below in the following equations.

In the temperature frequency to temperature equation below, the tx[t_num] [0–4] are the coefficients calculated as discussed above. Their source is from data taken where the temperature crystal is subjected to five different temperatures, and its frequency is measured. The [0–4] represents the five coefficients. The [t_num] is the number of the transducer being used.

--- float freq_to_temperature (float tf, unsigned int t_num)
/*******************************************************

-continued

```
*************// /* This function calculates temp from temp freq
Horner form of the equation */
{
/* if (tf > fl[t__num]) */
    tf = tf - (float) fl [t__num]; /* use cal offset */
    return ((((tx[t__num] [4]*tf + tx[t__num] [3])*tf + tx[t__num]
        [2])*tf + [t__num] [1])*tf + tx[t__num] [0])
```

Below are the equations in determining pressure. The coefficients gx[t__num] [0–4], hx[t__num] [0–4], etc., are determined by using different pressures at different temperatures (for example, calibrating at temperatures −20, 5, 30, 55, and 80 degrees Celsius, and at each of these temperature, pressures of 0, 5000, 10000, 15000, 20000, 15000, 10000, 5000, and 0 PSIG are exerted onto the pressure crystal). Using these coefficients, along with temperature frequency and pressure frequency, the pressure can be calculated as follows:

```
float press__conv(float pfreq, float correction, unsigned t__num) {
float pressure, GX, HX, IX, JX, KX, TX;
/* if (pfreq > f0[t__num]) */
    pfreq = pfreq - (float) f0[t__num]; /* use press cal offset */
/* The line below should not be used if based on temperature */
    correction = correction - (float)fl[t__num];/*use temp cal
    offset*/
GX =    (((gx[t__num] [4]*correction + gx[t__num] [3])*correction +
        gx[t__num] [2])*correction + gx[t__num] [1])*correction +
        gx[t__num] [0];
HX =    (((hx[t__num] [4]*correction + hx[t__num] [3])*correction +
        hx[t__num] [2])*correction + hx[t__num] [1])*correction +
        hx[t__num] [0];
IX =    (((ix[t__num] [4]*correction + ix[t__num] [3])*correction +
        ix[t__num] [2])*correction + ix[t__num] [1])*correction +
        ix[t__num] [0];
JX =    (((jx[t__num] [4]*correction + jx[t__num] [3])*correction +
        jx[t__num] [2])*correction + jx[t__num] [1])*correction +
        jx[t__num] [0];
KX =    (((kx[t__num] [4]*correction + kx[t__num] [3])*correction +
        kx[t__num] [2])*correction + kx[t__num] [1])*correction +
        kx[t__num] [0];
pressure = (((KX*pfreq + JX)*pfreq + IX)*pfreq + HX)*pfreq + GX;
```

The subprograms depicted in FIGS. 9D and 9E pertaining to the two "start recording" functions called for in FIG. 9A are self-explanatory. In general, the program of FIG. 9D matches a programmed real time value to the real time retrieved from the real time clock 100 shown in FIG. 7C, and the program of FIG. 9E decrements an entered count until zero is reached. Upon the respective condition occurring, data is recorded in accordance with the program of FIG. 9C.

Figure 9H:
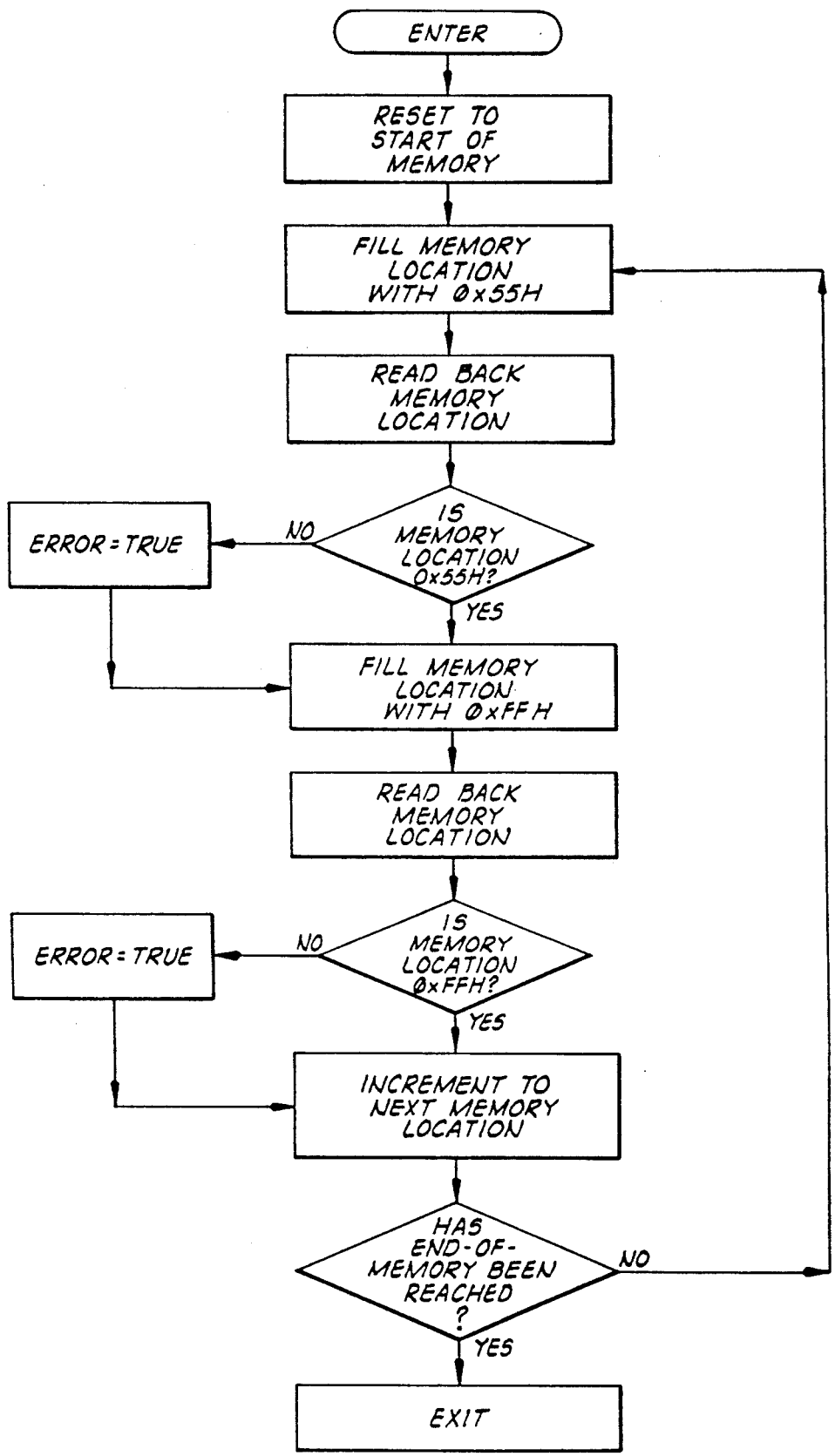
Figure 91:
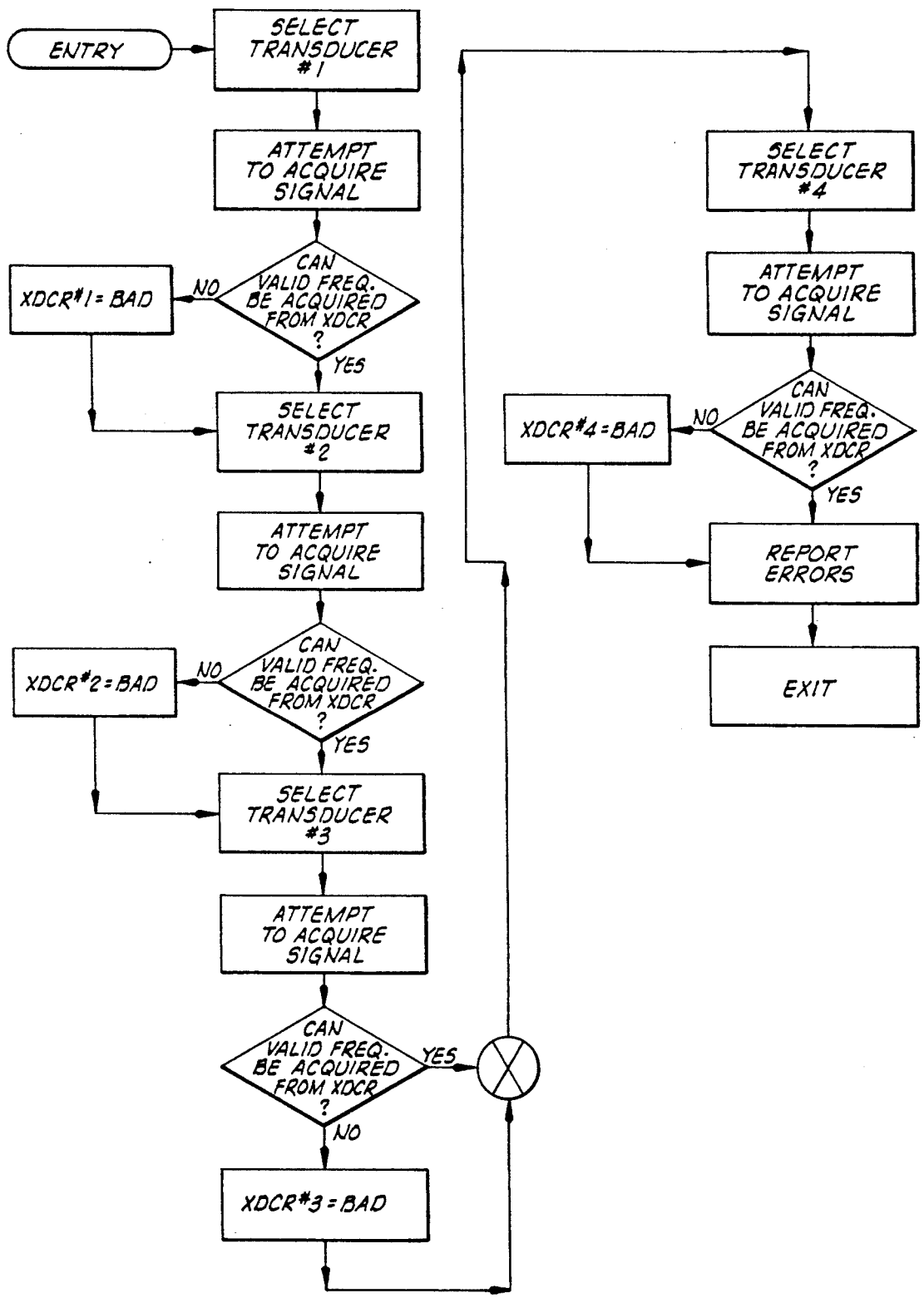

The program depicted in FIG. 9H shows how the data storage memory 74 (specifically random access memory 98 in FIG. 7C) is tested in response to the appropriate instruction shown in FIG. 9B. To test the data storage memory, a predetermined value (such as 0×55H and 0×FFH shown in FIG. 9H) is written to the selected memory location and it is then read back to determine whether a proper write and read have occurred. This is repeated until the end of the memory has been reached.

The program for implementing the transducer test instruction of FIG. 9B is shown in FIG. 9I. This testing occurs by selecting one of the transducers and attempting to acquire a signal from it. The frequency of an acquired signal is checked to determine if it is within the proper operating range for the transducer. This is repeated for each transducer, and if a bad one is detected, an appropriate error flag is entered in the software.

A listing of a particular program implementing the foregoing is submitted in the Appendix hereof. Source file MQPT_CMD.C is the main program with: file MQPT.C providing lower level functions; file MQPT_CVT.C providing data conversion functions; file MQPT.H providing definitions, constants and other modules common to the others; and file STARTUP-.A51 providing an assembler file.

Through the combination of the microcomputer hardware and programming contained in the program memory 91, there is provided means for automatically computing corrected pressure magnitude signals in response to the signals from the two pressure transducer circuits, the two temperature sensing circuits and the predetermined calibration factors entered in the program contained in the memory 91. There is also provided means for selectably recording in response to a preset real time alarm value or a preset countdown as implemented with the programs of FIGS. 9D and 9E, respectively. There is also provided memory means for storing data in response to the sensed pressures and temperatures and means for testing the memory means where the data is to be stored. A particular storage memory means is the random access memory 98 shown in FIG. 7C, and the means for testing such memory includes the program shown in FIG. 9H. Also provided is a means for testing the transducers as implemented using the program of FIG. 9I.

Accordingly, the pressure recorder of the present invention is an electronic instrument used to simultaneously display and record pressure data for at least two pressure sources from atmospheric pressure to the maximum pressure which particularly implemented pressure transducers can accommodate. The pressure recorder includes a display that shows real-time absolute pressure of the respectively connected pressure sources. System status and time of day data can also be obtained.

In the particular implementation described above, there is sufficient data storage memory to record 10,816 data records, each containing two pressures, a temperature and the time when the data were taken. These data records can be transferred out of the pressure recorder to a data analysis system connected to the single electrical coupling 14 shown in FIG. 1.

Applications of the pressure recorder of the present invention include, without limitation, hydraulic horsepower monitoring, pressure measurements over a length of pipe or pipes, simultaneous monitoring of tubing and annulus pressures to check for packer leakage, fluid transport efficiency studies, and monitoring for fracture closure in an oil or gas well.

Thus, the present invention is well adapted to carry out the objects and attain the ends and advantages mentioned above as well as those inherent therein. While a preferred embodiment of the invention has been described for the purpose of this disclosure, changes in the construction and arrangement of parts can be made by those skilled in the art, which changes are encompassed within the spirit of this invention as defined by the appended claims.

```
1  /*******************************************************************/
2  /*                                                                 */
3  /*    MQPT_CMD.C                                                   */
4  /*                                                                 */
5  /*  .                                                              */
6  /*                                                                 */
7  /*                                                                 */
8  /*    Compiler:   Franklin 8051 C-Compiler V2.51, SN# 50102134     */
9  /*    Assembler:  Franklin 8051 Assembler V4.4                     */
10 /*                                                                 */
11 /*    Other Source Files Needed:   STARTUP.A51                     */
12 /*                                 MQPT.H                          */
13 /*                                 MQPT_CVT.C                      */
14 /*                                 MQPT.C                          */
15 /*                                                                 */
16 /*******************************************************************/
17
18 #pragma pw(79)
19 #pragma large
20 #pragma debug
21 #pragma code
22
23 #include <c:\c51\stdio.h>
24 #include <C:\c51\stdlib.h>
25 #include <c:\c51\ctype.h>
26 #include <c:\c51\string.h>
27 #include <c:\c51\math.h>
28 #include <c:\c51\reg51.h>
29 #include <c:\c51\mqptv2_2\mqpt.h>
30 #include <C:\c51\absacc.h>
31
32 void Command_Proc();
33 void smart_term_interface();
34 unsigned char send_packet(unsigned char buff_size,unsigned char buffer[]);
35 unsigned char receive_packet(unsigned char *buff_size, unsigned char buffer[]);
36 void Smart_Record();
37 void Set_Time(unsigned char H,M,S,D,MTH,Y,DAY);
38 unsigned char Test_Ram();
39 unsigned char Test_XDCR();
40 void Wait_for_Alarm();
41 void Count_Down();
42
43 extern unsigned Acquire_Data();
44 extern void store_Record(unsigned char *data_point);
45 extern void read_cal_factors();
46 extern void LCD_line(int i,j);
47 void tell_LCD(int n);
48 extern void GoSleep();
```

```
49  extern void Idle();
50  extern void Erase_Ram();
51  extern SetClock();
52  extern void Turn_Sec_On();
53  extern void Turn_Sec_Off();
54  extern void Turn_Alarm_On();
55  extern void Turn_Alarm_Off();
56  extern void GetTime();
57  extern void Mask_Alarm();
58  extern void wait(int Count);
59  extern void Start_Counting();
60  extern void write_ram(unsigned long address, unsigned char d);
61  extern unsigned char read_ram(unsigned long address);
62  extern unsigned char getch();
63  extern dumpkp();
64
65  extern bit
66  KP,
67  XDCR_OPERATE,    /* Flag to start transducer to operate as
68                                                              surface gauge*/
69  LCD_BIT,         /* Flag to indicate where to send output        */
70  DONE_FLAG,       /* Flag to show conversion complete             */
71  CONNECT,
72  Transducer_error,
73  Acqu_Started,
74  Sample_Needed;
75
76  extern unsigned char
77  Hours,
78  Minutes,
79  Seconds,
80  Hundreths,
81  Next_Alarm_Hundreths,
82  Memory_Full,
83  *Present_Record;
84
85  extern union Long_Bytes
86  {
87    unsigned long l;
88    unsigned char byte[sizeof(unsigned long)];
89  };
90
91  extern union Long_Bytes Next_Addr;
92
93
94  extern union Time_Bytes
95  {
96    unsigned char byte[Max_Time_Bytes];
97  };
98
99  extern union Count_Bytes
100 {
101    unsigned int i;
102    unsigned char byte[sizeof(unsigned int)];
103 };
104
105
106 extern struct RecordDef
107 {
108   union Count_Bytes Temp0,Temp1;
109   union Count_Bytes Pr0, Pr1;
110   union Time_Bytes Time;
111 };
112
113 extern union Records
```

```
114 {
115   struct RecordDef Data;
116   unsigned char byte[Max_Record_Length];
117 };
118
119 extern union Records Record;
120
121 char VERSION[]    = "2.21";
122 char Blank_Line[] = "                    ";
123 /* char Prompt0[]  = " 2MQPT - THE FUTURE "; */
124 char Prompt0[]    = "HALLIBURTON'S 2MQPT ";
125 char Prompt9[]    = " IN DATA COLLECTION ";
126 char Prompt1[]    = "    GRID ATTACHED   ";
127 char Prompt2[]    = " 2MQPT HAS NOT BEEN ";
128 char Prompt3[]    = "      PROGRAMMED    ";
129 char Prompt4[]    = " PLEASE PROGRAM WITH";
130 char Prompt5[]    = "    2MQPT INTERFACE ";
131 char Prompt7[]    = "TOOL IS BEING ERASED";
132 char Prompt12[]   = "    RECEIVING DATA  ";
133 char Prompt13[]   = "   TRANSMITTING DATA ";
134 char Prompt14[]   = " ADJUST C11 AND C26 ";
135 char Prompt15[]   = "ADJUST R8 FOR LOWBAT";
136 char Prompt16[]   = "        LOWBAT      ";
137
138 bit dumb_flag;
139
140 unsigned char
141   Next_Sample_Time_Minutes,
142   Next_Sample_Time_Seconds,
143   Force_Record_Minutes,
144   Force_Record_Seconds;
145
146
147 extern unsigned char
148   State,
149   program_status;
150
151 extern unsigned long Time;
152
153 extern float
154   TEMPERATURE_0,
155   TEMPERATURE_1,
156   PRESSURE_0,
157   PRESSURE_1;
158
159
160 void Command_Proc()
161 {
162
163 int k=0;
164
165   do
166   {
167
168     switch(State)
169     {
170
171       case 0: State=1;
172               LCD_BIT=TRUE;
173               tell_LCD(LCD_CLEAR);
174               XDCR_OPERATE=FALSE;
175               Memory_Full=read_ram(MEMFULL);
176               read_cal_factors();
177               break;
178
```

```
179     case 1: while(CONNECT)
180             {
181               LCD_BIT=TRUE;
182               tell_LCD(LCD_CLEAR);
183               LCD_line(1,0);
184               printf("%s",Prompt0);
185               LCD_line(2,0);
186               printf("VER %s - %s",VERSION,__DATE__);
187               LCD_line(3,0);
188               printf("%s",Blank_Line);
189               if(LOWBAT)
190               {
191                 LCD_line(3,0);
192                 printf("   CHARGE BATTERY   ");
193               }
194               LCD_line(4,0);
195               printf("%s",Prompt1);
196               smart_term_interface();
197             }
198
199             State=2;
200             break;
201
202     case 2: program_status=read_ram(PROGRAM_STATUS);
203             Memory_Full=read_ram(MEMFULL);
204             for(k=0; k<4; k++)
205                Next_Addr.byte[k] = read_ram(NEXT_ADDR+k);
206             read_cal_factors();
207
208             switch(program_status)
209             {
210               case 0x0F:  /* Erase Tool */
211                           LCD_BIT=TRUE;
212                           tell_LCD(LCD_CLEAR);
213                           Erase_Ram();
214                           break;
215
216
217               case 0x1F:  /* Memory Full */
218                           do
219                           {
220                              if(Acquire_Data()==1)
221                                 break;
222                              Turn_Sec_On();
223                                 GoSleep();
224                           }while(Sample_Needed /*&& !KP*/ );
225                           break;
226
227               case 0x3F:  /* Recording */
228                           LCD_BIT=TRUE;
229                           tell_LCD(LCD_CLEAR);
230                           Smart_Record();
231                           break;
232
233               case 0x5F:  /* Start Recording on Power Up          */
234                           LCD_BIT=TRUE;
235                           tell_LCD(LCD_CLEAR);
236                           write_ram(PROGRAM_STATUS,0x3F);
237                           break;
238
239               case 0x7F:  /* Start Recording When Countdown Reached */
240                           LCD_BIT=TRUE;
241                           tell_LCD(LCD_CLEAR);
242                           Count_Down();
243                           break;
```

```
                case 0x9F:  /* Start Recording When Alarm Time Reached */
                            LCD_BIT=TRUE;
                            tell_LCD(LCD_CLEAR);
                            Wait_for_Alarm();
                            break;

case 0xBF:  /* Tool was partially Erased */
                            write_ram(PROGRAM_STATUS,0x0FF);
                            break;

default:    /* Tool has not been programmed */
                            LCD_BIT=TRUE;
                            LCD_line(1,0);
                            printf("%s",Prompt2);
                            LCD_line(2,0);
                            printf("%s",Prompt3);
                            LCD_line(3,0);
                            printf("%s",Prompt4);
                            LCD_line(4,0);
                            printf("%s",Prompt5);

}  /* End switch(program_status) */ if(CONNECT)
                {
                   dumpkp();
                   State=1;
                }

} /* End switch(State) */

}while(1);

} /* End Command_Proc() */ void Smart_Record()
{ float
   ps1,
   pb1,
   ps2,
   pb2,
   ps3,
   pb3,
   ps4,
   pb4,
   ts1,
   ts2,
   ts3,
   ts4,
   delta_psamp,
   proj_psamp;

unsigned char
   Record_1[Max_Record_Length],
   Record_2[Max_Record_Length],
   Record_3[Max_Record_Length],
   Record_4[Max_Record_Length];

bit
   point_stored;
```

```
309 idata unsigned char k;
310
311 unsigned long
312    t1,
313    t2,
314    t3,
315    t4,
316    Next_Sample_Time,
317    Next_Sample_Time_Rate,
318    Force_Record_Time,
319    Force_Record_Time_Rate;
320
321 union
322    Count_Bytes Press_Window;
323
324 /* Might need to initialize control data here */
325
326    for(k=0;k<sizeof(int);k++)
327       Press_Window.byte[k]=read_ram(PRESS_WINDOW+k);
328
329    Next_Sample_Time_Rate = (unsigned long)
330                           (((unsigned long)read_ram(FAST_RECORD_MINUTES)*60L)
331                           + (unsigned long)read_ram(FAST_RECORD_SECONDS));
332
333    Force_Record_Time_Rate = (unsigned long)
334                            (((unsigned long)read_ram(SLOW_RECORD_MINUTES)*60L)
335                            + (unsigned long)read_ram(SLOW_RECORD_SECONDS));
336
337
338    if(Acquire_Data()==1)
339       return;                         /* Dummy Read in order to sync up */
340    Turn_Sec_On();
341    while(!Sample_Needed)
342       GoSleep();
343
344    Time=0;
345    if(Acquire_Data()==1)
346       return;                         /* Obtain Data for 1ST Data Point */
347    ps1=PRESSURE_0;                    /* First Data Point */
348    pb1=PRESSURE_1;
349    ts1=TEMPERATURE_0;
350    /*Time=0;*/
351    t1=Time;
352    for(k=0;k<Max_Record_Length;k++)
353       Record_1[k]=Present_Record[k];
354    store_Record(Record_1);
355    point_stored=TRUE;
356    Next_Sample_Time = t1 + Next_Sample_Time_Rate;
357    Force_Record_Time = t1 + Force_Record_Time_Rate;
358
359    Turn_Sec_On();
360
361    while(Time < Next_Sample_Time)
362    {
363       while(!Sample_Needed)
364          GoSleep();
365       if(Acquire_Data()==1)
366          return;
367       Turn_Sec_On();
368    }
369
370    ps2=PRESSURE_0;
371    pb2=PRESSURE_1;
372    ts2=TEMPERATURE_0;
373    t2=Time;
```

```
374    for(k=0;k<Max_Record_Length;k++)
375      Record_2[k]=Present_Record[k];
376
377    while(/*!KP&&*/!Memory_Full)   /* MAIN LOOPING ENTRY POINT */
378    {
379      while(!Sample_Needed)
380        GoSleep();
381      if(Acquire_Data()==1)
382        return;
383      Turn_Sec_On();
384
385      ps3=PRESSURE_0;
386      pb3=PRESSURE_1;
387      ts3=TEMPERATURE_0;
388      t3=Time;
389      for(k=0;k<Max_Record_Length;k++)
390        Record_3[k]=Present_Record[k];
391
392      proj_psamp= ( (((ps2-ps1)/(float)(t2-t1))*(float)t3) +
393                    ps2 - (((ps2-ps1)/(float)(t2-t1))*(float)t2) );
394
395      if( !Memory_Full && ( (fabs(proj_psamp-ps3) > (float)Press_Window.i)
396            || Time > Force_Record_Time)  )
397      {
398        store_Record(Record_2);
399
400        ps1=ps2;
401        pb1=pb2;
402        ts1=ts2;
403        t1=t2;
404        for(k=0;k<Max_Record_Length;k++)
405          Record_1[k]=Record_2[k];
406        Next_Sample_Time = t1 + Next_Sample_Time_Rate;
407        Force_Record_Time = t1 + Force_Record_Time_Rate;
408
409
410        if( (t3-t1) >= Next_Sample_Time_Rate)
411        {
412          ps2=ps3;
413          pb2=pb3;
414          ts2=ts3;
415          t2=t3;
416          for(k=0;k<Max_Record_Length;k++)
417            Record_2[k]=Record_3[k];
418        }
419        else
420        {
421          while(Time < Next_Sample_Time)
422          {
423            while(!Sample_Needed)
424              GoSleep();
425            if(Acquire_Data()==1)
426              return;
427            Turn_Sec_On();
428          }
429          ps2=PRESSURE_0;
430          pb2=PRESSURE_1;
431          ts2=TEMPERATURE_0;
432          t2=Time;
433          for(k=0;k<Max_Record_Length;k++)
434            Record_2[k]=Present_Record[k];
435
436        }
437      }
438
```

```
439     else
440     {
441       while(!Sample_Needed)
442         GoSleep();
443       if(Acquire_Data()==1)
444         return;
445       Turn_Sec_On();
446
447       ps4=PRESSURE_0;
448       pb4=PRESSURE_1;
449       ts4=TEMPERATURE_0;
450       t4=Time;
451       for(k=0;k<Max_Record_Length;k++)
452         Record_4[k]=Present_Record[k];
453
454       proj_psamp= ( (((ps2-ps1)/(float)(t2-t1))*(float)t4) +
455                      ps2 - (((ps2-ps1)/(float)(t2-t1))*(float)t2) );
456
457       while( !Memory_Full && !( (fabs(proj_psamp-ps4) > (float)Press_Window.i)
458                 || (Time > Force_Record_Time) ) )
459       {
460         ps3=ps4;
461         pb3=pb4;
462         ts3=ts4;
463         t3=t4;
464         for(k=0;k<Max_Record_Length;k++)
465           Record_3[k]=Record_4[k];
466
467         while(!Sample_Needed)
468           GoSleep();
469         if(Acquire_Data()==1)
470           return;
471         Turn_Sec_On();
472
473         ps4=PRESSURE_0;
474         pb4=PRESSURE_1;
475         ts4=TEMPERATURE_0;
476         t4=Time;
477         for(k=0;k<Max_Record_Length;k++)
478           Record_4[k]=Present_Record[k];
479
480         proj_psamp= ( (((ps2-ps1)/(float)(t2-t1))*(float)t4) +
481                        ps2 - (((ps2-ps1)/(float)(t2-t1))*(float)t2) );
482
483       }
484
485       store_Record(Record_3);
486
487       ps1=ps3;
488       pb1=pb3;
489       ts1=ts3;
490       t1=t3;
491       for(k=0;k<Max_Record_Length;k++)
492         Record_1[k]=Record_3[k];
493       Next_Sample_Time = t1 + Next_Sample_Time_Rate;
494       Force_Record_Time = t1 + Force_Record_Time_Rate;
495
496       if( (t4-t1) >= Next_Sample_Time_Rate)
497       {
498         ps2=ps4;
499         pb2=pb4;
500         ts2=ts4;
501         t2=t4;
502         for(k=0;k<Max_Record_Length;k++)
```

```
503            Record_2[k]=Record_4[k];
504          }
505          else
506          {
507            while(Time < Next_Sample_Time)
508            {
509              while(!Sample_Needed)
510                GoSleep();
511              if(Acquire_Data()==1)
512                return;
513              Turn_Sec_On();
514            }
515            ps2=PRESSURE_0;
516            pb2=PRESSURE_1;
517            ts2=TEMPERATURE_0;
518            t2=Time;
519            for(k=0;k<Max_Record_Length;k++)
520              Record_2[k]=Present_Record[k];
521
522          }
523        }
524      }
525    if(Memory_Full)
526    {
527      program_status=0x1F;
528      write_ram(PROGRAM_STATUS,program_status);
529    }
530 }
531
532
533 void Wait_for_Alarm()
534 {
535   unsigned char dt,h,m;
536
537   dt=read_ram(START_TIME_DATE);
538   h=read_ram(START_TIME_HOURS);
539   m=read_ram(START_TIME_MINUTES);
540
541
542   LCD_BIT=TRUE;
543   tell_LCD(LCD_CLEAR);
544   LCD_line(1,0);
545   printf(" 2MQPT WAITING FOR  ");
546   LCD_line(2,0);
547   printf("   TURN ON TIME OF   ");
548   LCD_line(3,0);
549   printf("                    ");
550   LCD_line(4,0);
551   printf(" DATE=%2u TIME=%2u:%02u ",(unsigned)dt,(unsigned)h,(unsigned)m);
552
553   Turn_Alarm_Off();
554   Turn_Sec_Off();
555   Mask_Alarm();
556
557   XBYTE[ALARM_DATE]=dt;
558   XBYTE[ALARM_HOURS]=h;
559   XBYTE[ALARM_MINUTES]=m;
560
561   Acqu_Started=FALSE;
562   Sample_Needed=FALSE;
563   Turn_Alarm_Off();
564   EX1=1;
565   EX0=0;
566   ET0=0;
567   EA=1;
568
```

```
569    Turn_Alarm_On();
570    while(!Sample_Needed)
571       Idle();
572    Turn_Alarm_Off();
573
574    if(Memory_Full)
575       write_ram(PROGRAM_STATUS,0x1F);
576    else
577       write_ram(PROGRAM_STATUS,0x3f);
578
579 }
580
581 void Count_Down()
582 {
583    unsigned long time;
584
585    time = ((unsigned long)read_ram(START_TIME_DATE))*86400L +
586           ((unsigned long)read_ram(START_TIME_HOURS))*3600L +
587           ((unsigned long)read_ram(START_TIME_MINUTES))*60L;
588
589    do
590    {
591      if(Acquire_Data()==1)
592         return;
593      Turn_Sec_On();
594      LCD_BIT=TRUE;
595      LCD_line(4,0);
596      printf("%61uS TO REC",time);
597      GoSleep();
598      time--;
599    }while(Sample_Needed && (time!=0));
600
601    if(Memory_Full)
602       write_ram(PROGRAM_STATUS,0x1F);
603    else
604       write_ram(PROGRAM_STATUS,0x3f);
605
606 }
607
608 unsigned char send_packet(unsigned char buff_size,unsigned char buffer[])
609 /******************************************************************/
610 /*                                                                */
611 /* This function the data contained in 'buffer' of size 'buff_size' out the */
612 /*   RS232 port. A 'WAKE_UP' character is sent  and a response is needed to */
613 /*   proceede with a three time retry loop. The packet size is then sent and */
614 /*   verified before proceeding. A start character is sent and then The     */
615 /*   packet is then sent adding the character value to the 'checksum' var.  */
616 /*   and then it is sent.                                                   */
617
618 {
619
620
621 unsigned int status,      /* status word of communications port access */
622             loop_time,    /* a loop counter  */
623             verify,       /* boolean variable */
624             i,            /* loop counter */
625             send_count = 0;  /* number of times packet sent */
626
627 unsigned char
628       pkt_size,        /* actual size of packet to send */
629       ret_size,        /* size checked and returned */
630       checksum,        /* checksum on packet sent */
631       ret_check,       /* checksum returned from gauge */
632       dummy,           /* a dummy variable */
633       c;
634
```

```
635    LCD_BIT=FALSE;
636
637    /* Wake up HOST */
638    do
639    {
640      do
641      {
642
643        putchar(WAKE_UP);
644        if ((c = getch()) == WAKE_UP)
645          break;
646      } while ((++loop_time < 5) && CONNECT); /* surface bit */
647
648      /* is HOST responding?? */
649      if (c != WAKE_UP)
650      {
651        return (0x00); /* FAIL */
652      }
653
654      /* send packet size, packet, and checksum with verification from HOST */
655      pkt_size = buff_size;   /* send packet size */
656      putchar(pkt_size);
657
658      pkt_size = getch();   /* get and verify packet size */
659
660      if (pkt_size == buff_size)
661      {
662        putchar(START);              /* START signals HOST 'here comes the packet */
663        checksum = 0;
664
665        /* packet send loop */
666        for (i=0;i<buff_size;i++)
667        {
668          putchar(buffer[i]);
669          checksum += buffer[i];
670        }
671
672        /* send 1Byte checksum */
673        putchar(checksum);
674
675        /*read and verify checksum */
676        c = getch();
677        if (c == '*')          /* SLEEP signals HOST, transfer complete */
678        {
679          return (buffer[0]);
680        }
681        else  /* c == '~' */
682          ;    /* packet bad, resend */
683      } /* if */
684      else  /* pkt_size != buff_size */
685      {
686        putchar(RESEND);
687      }
688    } while ((++send_count < 5) && CONNECT);
689    return (0x00);
690 /*******************************************************************/
691 } /* end function send_packet() */
692 /*******************************************************************/
693
694 unsigned char receive_packet(unsigned char *buff_size, unsigned char buffer[])
695 /*******************************************************************/
696 /* This function corresponds to the 'send_packet()' function above          */
697 /*******************************************************************/
698 {
699
```

```
700 int     i,
701         host_check,
702         resend = 0;                 /* counter on resent packets */
703
704 unsigned char
705         checksum,
706         pkt_size,
707         c;
708
709
710
711 LCD_BIT=FALSE;
712
713   do
714   {
715     do
716     {
717       c = getch();
718       if (!CONNECT)
719         return (0x08);
720     } while (c != '#');
721
722     putchar(WAKE_UP);
723     pkt_size = 0;
724     pkt_size = getch();
725     putchar(pkt_size);
726
727     if ((c = getch()) == START)
728     {
729       *buff_size = pkt_size;
730       checksum = 0;
731       for (i=0;i<pkt_size;i++)
732       {
733         buffer[i] = getch();
734         checksum += buffer[i];
735       }
736       if ((host_check = getch()) == checksum)
737       {
738         putchar('*'); /* packet good and terminate */
739         return (buffer[0]);
740       }
741       else
742       {
743         putchar('-');
744         putchar(checksum);
745       }
746     } /* end if */
747   } while (++resend < 3);
748   return (0x00);
749 /********************************************************************/
750 } /* end function receive_packet() */
751 /********************************************************************/
752
753
754 void smart_term_interface()
755 /********************************************************************/
756 /* This function process the commands when guage is connected to a GRID   */
757 /*   computer using an interface program.                                 */
758 /* When in this mode we wait for a command packet from the serial port. That */
759 /*   command is channeled into the switch statment below and acts accordingly.*/
760 /********************************************************************/
761 {
762 long int count;                 /* a variable to keep track of block moves */
763
```

```
764 unsigned char
765     Ram_Errors,
766     XDCR_Errors,
767     selection,                              /* command from serial port */
768     size,                     /* size of the packet used in receive or transmit */
769     i,                                      /* loop counter and index */
770     buffer[128];              /* packet containing data from serial port */
771
772 union Long_Bytes
773     start_addr,                             /* the start address of data requested */
774     store_size;                             /* the amount of data requested */
775
776
777     while (CONNECT)
778     {
779       EX0=0;
780       ET0=0;
781       Turn_Alarm_Off();
782       Turn_Sec_Off();
783
784       LCD_BIT=TRUE;
785       LCD_line(3,0);
786       printf("%s",Blank_Line);
787       if(LOWBAT)
788       {
789         LCD_line(3,0);
790         printf("  CHARGE BATTERY  ");
791       }
792       LCD_line(4,0);
793       printf("%s",Prompt1);
794       LCD_BIT=FALSE;
795
796       while(!KP && CONNECT)
797         GoSleep();
798
799       if(!CONNECT)
800       {
801         State=2;
802         return;
803       }
804
805       selection = receive_packet(&size,buffer);
806
807       if (!CONNECT)
808         selection = 0x08;
809
810       switch (selection)
811       {
812         case 0x08:                            /* GRID has been disconnected */
813         State = 2;
814         return;
815
816         case 0x01:                            /* write data to SRAM */
817         LCD_BIT=TRUE;
818         LCD_line(4,0);
819         printf("%s",Prompt12);
820
821         receive_packet(&size,buffer);         /* receive start address and size */
822         for (i=0;i<4;i++)
823         {
824           start_addr.byte[i] = buffer[i];
825           store_size.byte[i] = buffer[i+4];
826         }
827         count = 0;
```

```
828      do
829      {
830        receive_packet(&size,buffer);
831        for (i=0; i < size;i++)
832          write_ram((start_addr.l + count++),buffer[i]);
833        send_packet(0,buffer);              /* send command I'm ready for more */
834      } while (count < store_size.l);
835      break;
836
837
838      case 0x02:                                         /* read data from SRAM */
839      LCD_BIT=TRUE;
840      LCD_line(4,0);
841      printf("%s",Prompt13);
842      receive_packet(&size,buffer);
843      for (i=0; i<4; i++)
844      {
845        start_addr.byte[i] = buffer[i];
846        store_size.byte[i] = buffer[i+4];
847      }
848      count = 0;
849      do
850      {
851        if (count + 128 > store_size.l)
852          size = store_size.l - count;
853        else
854        size = 128;
855        for (i=0;i<size;i++)
856          buffer[i] = read_ram(start_addr.l + count++);
857        send_packet(size,buffer);
858        receive_packet(&size,buffer);   /* sleep until grid is ready for more */
859      } while (count < store_size.l);
860      break;
861
862      case 0x03:                                              /* erase SRAM */
863      dumpkp();
864      Erase_Ram();
865      break;
866
867      case 0x04:                                              /* test SRAM */
868      dumpkp();
869      Ram_Errors=Test_Ram();
870      send_packet(1,&Ram_Errors);
871      break;
872
873      case 0x05:                                           /* test Transducers */
874      dumpkp();
875      XDCR_Errors=Test_XDCR();
876      send_packet(1,&XDCR_Errors);
877      break;
878
879      case 0x06:
880      dumpkp();
881      receive_packet(&size,buffer);       /* receive H,M,S,D,MTH,Y, and Day */
882      Set_Time(buffer[0],buffer[1],buffer[2],buffer[3],buffer[4],
883              buffer[5],buffer[6]);
884      break;
885
886      case 0x0FE:                          /* Exit Program Mode */
887      dumpkp();
888      State=2;
889      CONNECT=FALSE;
890      tell_LCD(LCD_CLEAR);
891      return;
892      break;
893
```

```
894 /*****************************************************************/
895 /*                                                               */
896 /*                    Calibration Functions                      */
897 /*                                                               */
898 /*****************************************************************/
899       case 0x10:                                /* Adjust Real Time Clock */
900       dumpkp();
901       EX0=0;
902       ET0=0;
903       LCD_BIT=TRUE;
904       LCD_line(4,0);
905       printf("%s",Prompt14);
906       Turn_Alarm_Off();
907       while(!KP)
908       {
909         Acqu_Started=FALSE;
910         Sample_Needed=FALSE;
911         while(!Sample_Needed)
912           GoSleep();
913       }
914       Turn_Sec_Off();
915       break;
916
917       case 0x11:                                /* Adjust Low Battery */
918       dumpkp();
919       LCD_BIT=TRUE;
920       LCD_line(4,0);
921       printf("%s",Prompt15);
922       while(!KP)
923       {
924         if(LOWBAT)
925         {
926           LCD_line(3,0);
927           printf("%s",Prompt16);
928         }
929         else
930         {
931           LCD_line(3,0);
932           printf("%s",Blank_Line);
933         }
934       }
935       break;
936
937       default   :break;
938     } /* switch */
939   } /* end while loop */
940 /*****************************************************************/
941 }  /* end function grid_commands() */
942 /*****************************************************************/
943
944 void Set_Time(unsigned char H,M,S,D,MTH,Y,DAY)
945 {
946
947     XBYTE[HUNDRETHS]  =0;              /* Hundreths            */
948     XBYTE[HOURS]      =H;              /* Hours                */
949     XBYTE[MINUTES]    =M;              /* Minutes              */
950     XBYTE[SECONDS]    =S;              /* Seconds              */
951     XBYTE[MONTH]      =MTH;            /* Month                */
952     XBYTE[DATE]       =D;              /* Date                 */
953     XBYTE[YEAR]       =Y;              /* Year                 */
954     XBYTE[DAY_OF_WEEK] = DAY;          /* Day of Week          */
955 }
956
957 unsigned char Test_Ram()
958 {
```

```
959   unsigned char Errors=0, check, Present_Bank;
960   unsigned int k=0, address, Done=FALSE;
961
962   LCD_BIT=TRUE;
963   tell_LCD(LCD_HOME_4);
964   printf("MEMORY BEING CHECKED");
965
966   Present_Bank=0;
967   address=RAM_BASE;
968   while(!Done)
969   {
970     switch(Present_Bank)
971     {
972       case 0:  Bank0; break;
973       case 1:  Bank1; break;
974       case 2:  Bank2; break;
975       default: Bank3;
976     }
977
978
979     XBYTE[address]=0x055;
980     check=XBYTE[address];
981     if(check!=0x055)
982       Errors=1;
983
984     XBYTE[address]=0x0AA;
985     check=XBYTE[address];
986     if(check!=0x0AA)
987       Errors=1;
988
989     address++;
990     if (address==0)
991     {
992       address=RAM_BASE;
993       Present_Bank++;
994       if (Present_Bank>3)
995       {
996         Done=TRUE;
997         Memory_Full=FALSE;
998         Next_Addr.l = Start_of_Memory;
999         for(k=0;k<4;k++)
1000            write_ram(NEXT_ADDR+k,Next_Addr.byte[k]);
1001        write_ram(MEMFULL,Memory_Full);
1002        write_ram(PROGRAM_STATUS,0x0FF);
1003
1004      }
1005    }
1006  }
1007  return(Errors);
1008 }
1009
1010 unsigned char Test_XDCR()
1011 {
1012   unsigned char Errors=0;
1013
1014   LCD_BIT=TRUE;
1015   tell_LCD(LCD_HOME_4);
1016   printf("XDCRs BEING CHECKED ");
1017   SEL1=0;                       /* Choose Temp 0 Port on 4051 Mux */
1018   SEL0=1;
1019
1020   Start_Counting();
1021   Next_Alarm_Hundreths=(XBYTE[HUNDRETHS]+Time_Out_Time)%100;
1022   while(!DONE_FLAG & (XBYTE[HUNDRETHS]!=Next_Alarm_Hundreths));
```

```
1023      if(Next_Alarm_Hundreths==XBYTE[HUNDRETHS])
1024         Transducer_error=TRUE;
1025
1026      Start_Counting();
1027      Next_Alarm_Hundreths=(XBYTE[HUNDRETHS]+Time_Out_Time)%100;
1028      while(!DONE_FLAG & (XBYTE[HUNDRETHS]!=Next_Alarm_Hundreths));
1029      if(Next_Alarm_Hundreths==XBYTE[HUNDRETHS])
1030         Transducer_error=TRUE;
1031
1032      if(Transducer_error)
1033         Errors+=1;
1034
1035      SEL1 = 1;                            /* Select Secondary Temperature */
1036      SEL0 = 1;                            /*    Transducer                */
1037
1038      Start_Counting();
1039      Next_Alarm_Hundreths=(XBYTE[HUNDRETHS]+Time_Out_Time)%100;
1040      while(!DONE_FLAG & (XBYTE[HUNDRETHS]!=Next_Alarm_Hundreths));
1041      if(Next_Alarm_Hundreths==XBYTE[HUNDRETHS])
1042         Transducer_error=TRUE;
1043
1044      if(Transducer_error)
1045         Errors+=2;
1046
1047      SEL1=0;                              /* Set Mux to Press 0 */
1048      SEL0=0;
1049      Start_Counting();                    /* Start Data Acquisition */
1050      Next_Alarm_Hundreths=(XBYTE[HUNDRETHS]+Time_Out_Time)%100;
1051      while(!DONE_FLAG & (XBYTE[HUNDRETHS]!=Next_Alarm_Hundreths));
1052      if(Next_Alarm_Hundreths==XBYTE[HUNDRETHS])
1053         Transducer_error=TRUE;
1054
1055      if (Transducer_error)
1056         Errors+=4;
1057
1058      SEL1=1;
1059      SEL0=0;                  /* Set Mux to Press 1 */
1060      Start_Counting();        /* Start Acquisition */
1061      Next_Alarm_Hundreths=(XBYTE[HUNDRETHS]+Time_Out_Time)%100;
1062      while(!DONE_FLAG & (XBYTE[HUNDRETHS]!=Next_Alarm_Hundreths));
1063      if(Next_Alarm_Hundreths==XBYTE[HUNDRETHS])
1064         Transducer_error=TRUE;
1065
1066      if(Transducer_error)
1067         Errors+=8;
1068
1069      Acqu_Started = FALSE;
1070      Sample_Needed=FALSE;
1071
1072      return(Errors);
1073
1074   }
1075
1076
CRC-32 DATA   0xB483138E
```

```
1  /***********************************************************************/
2  /*                                                                     */
3  /*   MQPT.C                                                            */
4  /*                                                                     */
5  /*                                                                     */
6  /*                                                                     */
7  /*                                                                     */
8  /*   Compiler: Franklin 8051 C-Compiler V2.51, SN# 50102134            */
9  /*   Assembler: Franklin 8051 Assembler V4.4                           */
10 /*                                                                     */
11 /*   Other Source Files Needed:  STARTUP.A51                           */
12 /*                               MQPT.H                                */
13 /*                               MQPT_CVT.C                            */
14 /*                               MQPT_CMD.C                            */
15 /*                                                                     */
16 /***********************************************************************/
17
18 #pragma pw(79)    /* Page Width 79 */
19 #pragma large     /* Large Memory Model */
20 #pragma debug     /* Include debug information in object file */
21 #pragma code      /* Include assembler equivalents embedded in listing */
22
23 #include <c:\c51\stdio.h>             /* Standard I/O Header */
24 #include <C:\c51\stdlib.h>            /* Standard Library Header */
25 #include <c:\c51\ctype.h>             /* Character Functions Header */
26 #include <c:\c51\string.h>            /* String Functions Header */
27 #include <c:\c51\math.h>              /* Math Functions Header */
28 #include <c:\c51\reg51.h>             /* 8051 Registers Header */
29 #include <C:\c51\absacc.h>            /* Absolute Addr. Access Header */
30 #include <c:\c51\mqptv2_2\mqpt.h>     /* Program Header */
31
32 /***********************************************************************/
33 /*                                                                     */
34 /*                    Function Proto-types                             */
35 /*                                                                     */
36 /***********************************************************************/
37
38 void SetClock();        /* Initialize Real Time Clock Routine */
39 void Int1Hndl();        /* External Interrupt 1 Handler Routine (from RTC) */
40 void LCD_setup();       /* Initialize LCD display */
41 void LCD_line(int number,int position); /* Place cursor @ specific location
42                                            on LCD */
43 void GetTime();         /* Get Time from Real Time Clock */
44 void Turn_Sec_On();     /* Turn 1 second interrupt generation from RTC on */
45 void Turn_Sec_Off();    /* Turn 1 second interrupt generation from RTC off */
46 void Turn_Alarm_On();   /* Turn alarm interrupt generation from RTC on */
47 void Turn_Alarm_Off();  /* Turn alarm interrupt generation from RTC off */
48 void Mask_Alarm();      /* Mask all time registers in RTC for alarm */
49 void wait(int Count);   /* A time delay module */
50 void tell_LCD(int n);   /* Give command to LCD */
51 /* Write data to paged data memory */
52 void write_ram(unsigned long address, unsigned char d);
53 /* Read data to paged data memory */
54 unsigned char read_ram(unsigned long address);
55 void store_Record(unsigned char *data_point);  /* Store Data Record */
56 void Erase_Ram();       /* Erase data records */
57 void Start_Counting();  /* Start frequency acquisition */
58 void Int0Hndl();        /* External Interrupt 0 Handler (from 4020 Counter) */
59 void init_uart();       /* Initialize internal UART */
60 void RS_232();          /* Internal serial interrupt from RS-232 Handler */
61 dumpkp();               /* Dump contents of the serial port input buffer */
62 void Timer_Flag_0();    /* Internal Timer 0 Interrupt Handler */
63 void Timer_Flag_1();    /* Internal Timer 1 Interrupt Handler */
64 void GoSleep();         /* Prepare 8031 for idle mode */
```

```
65 void Idle();            /* Place 8031 in idle mode */
66 unsigned Acquire_Data();/* Acquire temperature and pressure information */
67
68
69 /* These modules are found in MQPT_CVT.C */
70 extern void read_cal_factors();
71 extern float ctof(unsigned count);
72 extern float freq_to_temperature (float tf, unsigned t_num);
73 extern float press_conv(float pfreq, float temperature, unsigned t_num);
74
75
76 /* This module is found in MQPT_CMD.C */
77 extern void Command_Proc();
78
79 /* Union of long integer and bytes */
80 union Long_Bytes
81 {
82   unsigned long l;
83   unsigned char byte[sizeof(unsigned long)];
84 };
85
86 /* Union of data type Long Bytes and Next_Addr */
87 union Long_Bytes Next_Addr;
88
89 /* Union of data type Time_Bytes and bytes */
90 union Time_Bytes
91 {
92   unsigned char byte[Max_Time_Bytes];
93 } ;
94
95
96 /* Union of data type Count_Bytes and characters */
97 union Count_Bytes
98 {
99    unsigned int i;
100    unsigned char byte[sizeof(unsigned int)];
101 } ;
102
103 /* Structure consisting of the unions below which defines the
104       data record recorded in the data memory */
105 struct RecordDef
106 {
107   union Count_Bytes Temp0, Temp1;
108   union Count_Bytes Pr0, Pr1;
109   union Time_Bytes Time;
110 } ;
111
112 /* Union definition for the data record and byte addressing capability */
113 union Records
114 {
115   struct RecordDef Data;
116   unsigned char byte[Max_Record_Length];
117 };
118
119 union Records Record;
120    -
121
122 char INBUF[MaxBuf + 1]; /* Character interrupt input buffer */
123 int pinbufh=0;          /* Pointer to last character read    */
124 int pinbuft=0;          /* Pointer to next character to get */
125 int buff_size;
126
127 bit                     /* INTERNAL BIT DEFINITIONS                  */
128 OK_TO_SEND,             /* Flag to show SBUF out is empty            */
```

```
129 DONE_FLAG,            /* Flag to show conversion complete           */
130 CONNECT=0,            /* Flag to show connected to terminal or not  */
131 XDCR_OPERATE,         /* Flag to start transducer to operate as
132                                                       surface gauge*/
133 VARIABLE_RECORD,      /* Flag to Show if variable or fixed record   */
134 LCD_BIT,              /* Flag to indicate where to send output      */
135 KP,                   /* Flag to show keyboard pressed */
136 Sample_Needed=0,      /* Flag to show when a data sample is needed */
137 Blink,                /* Flag used to blink "heartbeat" indicator "<>"  */
138 Acqu_Started=0,       /* Flag used to show data acquisition started  */
139 Transducer_error=0;   /* Flag used to show if XDCR is bad           */
140
141
142 unsigned char         /* BYTE DEFINITONS     */
143   Year,               /* Present Year        */
144   Month,              /*    "    Month       */
145   Date,               /*    "    Date        */
146   Hours,              /*    "    Hour        */
147   Minutes,            /*    "    Minute      */
148   Seconds,            /*    "    Second      */
149   Hundreths,          /*    "    Hundreth    */
150   Next_Alarm_Hundreths, /* Used to calculate the alarm time for the hundreths
151                          register in RTC   */
152   clock_command,      /* Used to calculate the clock command register for
153                          the RTC           */
154   clock_mask,         /* Used to calculate the clock mask register for
155                          the RTC           */
156   clock_status,       /* Used to get the interrupt status of the RTC */
157
158   Memory_Full,        /* Flag for Memory Full */
159   Present_Bank,       /* Present Memory Bank Indicator */
160   State=0,            /* Programming state indidcator */
161   program_status;     /* Program status indicator */
162
163 unsigned char         /* Pointer to present data record */
164   *Present_Record;
165
166 unsigned int Temp_Transd_Num;  /* Number of temp. transd. being used  */
167
168 unsigned long Time;   /* Absolute time from start of recording */
169
170 /* calibration factors */
171   float gx[2][5], hx[2][5], ix[2][5], jx[2][5], kx[2][5], tx[2][5];
172
173 /* calibration frequency offsets */
174   int
175     f0[2],      /* pressure frequency offset for both XDCRs */
176     f1[2];      /* temperature  "         "    "    "    */
177
178
179   float
180     TEMPERATURE_0,    /* Acquired temperature from XDCR 0 */
181     TEMPERATURE_1,    /*    "        "         "   "   1 */
182     PRESSURE_0,       /*    "      pressure    "   "   0 */
183     PRESSURE_1,       /*    "         "        "   "   1 */
184     Temp_Freq_0,      /*    "      temp. freq. "   "   0 */
185     Temp_Freq_1;      /*    "         "        "   "   1 */
186
187 /**********************************************************************/
188 /*                                                                    */
189 /*                        MAIN PROGRAM                                */
190 /*                                                                    */
191 /*                                                                    */
192 /**********************************************************************/
193
```

```
194 main()
195
196 {
197
198    EA=0;                        /* Disable interrupt reception */
199
200    while(PFail);                /* Wait till Clock and Ram are accessible */
201
202    LCD_setup();                 /* Initialize LCD Display */
203
204    init_uart();                 /* Initialize 8031 UART */
205                                 /*   (9600 BPS, No parity, 1 Stop Bit */
206                                 /*      8 Data bits)                  */
207
208    read_cal_factors();          /* Read Calibration Factors from Memory */
209
210    SetClock();                  /* Initialize Clock and set time
211                                    to 12:00 a.m. 1/1/90 if not already
212                                    set.
213                                 */
214
215    Command_Proc();              /*  Access the Command processor */
216
217
218
219 while(1);                       /* Do an infinite loop */
220 }
221 /*******************************************************************/
222 /*                                                                 */
223 /*                       END main()                                */
224 /*                                                                 */
225 /*******************************************************************/
226
227 unsigned Acquire_Data()
228 {
229
230 /*  Display Messages */
231
232    char Blank_Line[] = "                ";
233    char Prompt0[]    = "LOST    ";
234    char Prompt1[]    = "SIGNAL LOST ";
235    char Prompt2[]    = "SIGNAL LOST ";
236    char Prompt8[]    = "MEMORY FULL    ";
237    char Prompt10[]   = "MEMRY USED ";
238    char Prompt11[]   = "BATT";
239    char Prompt12[]   = "LOW";
240    unsigned int percent;        /* To Calculate Amount of Memory Used */
241
242
243
244    if(CONNECT)   /* If connected to laptop, break out of Acquire_Data */
245       return(1);
246
247    Time++;                      /* Increment Time Used in Smart Record */
248
249    /* Turn All Clock Interrupts Off */
250    Bank0;              /* Switch to Bank 0 of memory */
251    Turn_Alarm_Off();
252
253    /* Get the present time and place time in data record */
254    GetTime();
255    Record.Data.Time.byte[0] = Year;
256    Record.Data.Time.byte[1] = Month;
257    Record.Data.Time.byte[2] = Date;
```

```
258      Record.Data.Time.byte[3] = Hours;
259      Record.Data.Time.byte[4] = Minutes;
260      Record.Data.Time.byte[5] = Seconds;
261
262      Temp_Transd_Num = 0;            /* Are using the first temperature XDCR */
263      while(!(!SEL1 &  SEL0))
264      {
265        SEL1=0;                       /*  Choose Temp 0 Port on 4051 Mux */
266        SEL0=1;
267      }
268      Start_Counting();               /* Start acquiring temperature 0 signal */
269
270      while(!DONE_FLAG & !Transducer_error) /* Wait for error or valid count */
271         Idle();
272      Turn_Alarm_Off();                     /* Turn Alarm off after completion */
273                                            /* of while loop */
274
275      if(Transducer_error)   /* If Temperature 0 signal offline */
276      {
277
278        LCD_BIT=TRUE;                                 /* Output to LCD */
279        LCD_line(3,0);                                /* Third line */
280        printf("T%u=%s",Temp_Transd_Num,Prompt0);     /* TEMP.0  NOT AVAILABLE */
281        tell_LCD(LCD_HOME_1);         /* First line */
282        printf("P%u=%s",Temp_Transd_Num,Prompt2);     /* PR. 0 NOT AVAILABLE */
283
284        /* Set all count fields to 0xFF to indicate signal offline */
285        Record.Data.Temp0.byte[0] = 0xFF;
286        Record.Data.Temp0.byte[1] = 0xFF;
287        Record.Data.Pr0.byte[0] = 0xFF;
288        Record.Data.Pr0.byte[1] = 0xFF;
289
290        TEMPERATURE_0 = -99;
291        PRESSURE_0 = -99;
292      }
293      else
294      {
295
296        /* Get temperature counts from 8031 timer */
297        Record.Data.Temp0.byte[0] = TH0;
298        Record.Data.Temp0.byte[1] = TL0;
299
300        while(!(!SEL1 & !SEL0))
301        {
302          SEL1=0;                              /* Set Mux to Press 0 */
303          SEL0=0;
304        }
305
306        Start_Counting();                      /*  Start Data Acquisition */
307
308        /* Call Temperature conversion process here */
309        Temp_Freq_0=ctof(Record.Data.Temp0.i);
310        TEMPERATURE_0=freq_to_temperature(Temp_Freq_0,Temp_Transd_Num);
311
312        /* Also update display and RS-232 */
313        LCD_BIT=TRUE;
314        tell_LCD(LCD_HOME_3);
315        printf("            ");
316        tell_LCD(LCD_HOME_3);
317        printf("T%u=%-.1fF",Temp_Transd_Num,TEMPERATURE_0);
318
319        while(!DONE_FLAG & !Transducer_error)
320           Idle();
321        Turn_Alarm_Off();
322
```

```
323    if (Transducer_error)         /* If pressure 0 signal offline */
324    {
325      LCD_BIT=TRUE;               /* output to LCD, line 1 */
326      tell_LCD(LCD_HOME_1);
327
328      /* Set count to be indicate invalid count */
329      Record.Data.Pr0.byte[0] = 0xFF;
330      Record.Data.Pr0.byte[1] = 0xFF;
331
332      /* Set Pressure 0 = -99 for serial output */
333      PRESSURE_0=-99;
334
335    }
336    else        /* Pressure 0 signal was online */
337    {
338      /* Get pressure 0 counts from timer */
339
340      Record.Data.Pr0.byte[0] = TH0;
341      Record.Data.Pr0.byte[1] = TL0;
342
343      /* Call Pressure 0 conversion here */
344      PRESSURE_0=press_conv(ctof(Record.Data.Pr0.i),Temp_Freq_0,0);
345
346      /* Display Pressure 0 */
347      LCD_BIT=TRUE;
348      tell_LCD(LCD_HOME_1);
349      printf("                ");
350      tell_LCD(LCD_HOME_1);
351      printf("P0=%-.1f PSIA",PRESSURE_0);
352    }
353  }
354
355
356  while(!(SEL1 & SEL0))
357  {
358    SEL1 = 1;                      /* Select Second Temperature */
359    SEL0 = 1;                      /*   Transducer              */
360  }
361  Temp_Transd_Num = 1;      /* Using temperature XDCR 1 now */
362
363  Start_Counting();              /* Start acquiring temperature 1 signal */
364  while(!DONE_FLAG & !Transducer_error) /* Wait for error or valid count */
365    Idle();
366  Turn_Alarm_Off();
367
368  if(Transducer_error)   /* If Temperature  1 offline */
369  {
370    LCD_BIT=TRUE;                                  /* Output to LCD */
371    LCD_line(3,10);                                /* Third line */
372    printf("T%u=%s",Temp_Transd_Num,Prompt0);      /* TEMP.0 NOT AVAILABLE */
373    tell_LCD(LCD_HOME_2);                          /* Second line */
374    printf("P1=%s",Prompt2);                       /* PR. B NOT AVAILABLE */
375
376    /* Set all count fields to 0xFF to indicate signal offline */
377    Record.Data.Temp1.byte[0] = 0xFF;
378    Record.Data.Temp1.byte[1] = 0xFF;
379    Record.Data.Pr1.byte[0] = 0xFF;
380    Record.Data.Pr1.byte[1] = 0xFF;
381
382    /* Set all data = -99 for serial output */
383    TEMPERATURE_1=-99;
384    PRESSURE_1=-99;
385
386  }
```

```
387    else   /* A temperature signal was online */
388    {
389
390       /* Get temperature counts from 8031 timer */
391       Record.Data.Temp1.byte[0] = TH0;
392       Record.Data.Temp1.byte[1] = TL0;
393
394       while(!(SEL1 & !SEL0))
395       {
396         SEL1=1;            /* Set MUX to Pressure 1 */
397         SEL0=0;
398       }
399       Start_Counting();             /* Start Acquisition */
400
401       /* Call Temperature conversion process here */
402       Temp_Freq_1=ctof(Record.Data.Temp1.i);
403       TEMPERATURE_1=freq_to_temperature(Temp_Freq_1,Temp_Transd_Num);
404
405       /* Also update display and RS-232 */
406       LCD_BIT=TRUE;
407       LCD_line(3,10);
408       printf("          ");
409       LCD_line(3,10);
410       printf("T%u=%-.1fF",Temp_Transd_Num,TEMPERATURE_1);
411
412       while(!DONE_FLAG & !Transducer_error)
413          Idle();
414       Turn_Alarm_Off();
415
416       if(Transducer_error) /* If Pressure 1 signal offline */
417       {
418         LCD_BIT=TRUE;         /* Output to LCD, line 2 */
419         tell_LCD(LCD_HOME_2);
420         printf("P1=%s",Prompt2);   /* PR. B NOT AVAILABLE */
421
422         /* Set pressure 1 counts to an invalid count */
423         Record.Data.Pr1.byte[0] = 0xFF;
424         Record.Data.Pr1.byte[1] = 0xFF;
425
426         /* Set Pressure 1 = -99 for serial output */
427         PRESSURE_1=-99;
428       }
429       else      /* Pressure 1 signal was online */
430       {
431
432         /* Get pressure 1 counts from timer */
433         Record.Data.Pr1.byte[0] = TH0;
434         Record.Data.Pr1.byte[1] = TL0;
435
436         /* Call Pressure 1 Conversion here */
437         PRESSURE_1=press_conv(ctof(Record.Data.Pr1.i),Temp_Freq_1,1);
438
439         /* Output pressure 1 to display */
440         LCD_BIT=TRUE;
441         tell_LCD(LCD_HOME_2);
442         printf("              ");
443         tell_LCD(LCD_HOME_2);
444         printf("P1=%-.1f PSIA",PRESSURE_1);
445       }
446
447    }
448
449    Acqu_Started = FALSE;     /* No Acquisition started now */
450    Sample_Needed=FALSE;      /* No sample needed now */
451
```

```
452    Present_Record=Record.byte; /* Point to the present record */
453
454    /* Output to the serial port pressure,temperature and time */
455    LCD_BIT=FALSE;
456    printf("%8lu %8.2f %8.2f %8.2f %8.2f %2u/%02u/%02u %2u:%02u:%02u \r\n",
457              Time,PRESSURE_0,PRESSURE_1,TEMPERATURE_0,TEMPERATURE_1,
458              (int)Month,(int)Date,(int)Year,(int)Hours,
459               (int)Minutes,(int)Seconds);
460
461    /* Update the low battery indicator */
462    LCD_BIT=TRUE;
463
464    if(LOWBAT)
465    {
466       LCD_line(1,16);
467       printf("%s",Prompt12);
468       LCD_line(2,16);
469       printf("%s",Prompt11);
470    }
471    else
472    {
473       LCD_line(1,16);
474       printf("    ");
475       LCD_line(2,16);
476       printf("    ");
477    }
478
479    /* Update the time on the display */
480    LCD_BIT=TRUE;
481    LCD_line(4,15);
482    printf("%2u %02u",(int)Hours,(int)Minutes);
483
484    /* Update the 'heartbeat' indicator */
485    LCD_line(4,17);
486    if(Blink)
487       printf(":");
488    else
489       printf(" ");
490    Blink=!Blink;
491
492    /* Get program status */
493    program_status=read_ram(PROGRAM_STATUS);
494    switch(program_status)
495    {
496      case 0x1F:  LCD_BIT=TRUE;                         /* Memory Full */
497                  LCD_line(4,0);
498                  printf("%s",Prompt8);
499                  break;
500
501      case 0x3F:  LCD_BIT=TRUE;                         /* Recording */
502                  LCD_line(4,0);
503                  /* Calculate How much memory has been used */
504                  percent=( (float)(Next_Addr.l-Start_of_Memory)
505                           / (float)(End_of_Memory - Start_of_Memory) )*100.0;
506                  printf("%2u%% %s",percent,Prompt10);
507                  break;
508
509    }
510
511    EX0=0;     /* Turn off external interrupt 0 reception */
512    P1_7=1;    /* Reset the 4020 counter */
513    ES=1;      /* Enable serial port interrupts */
514    return(0);
515 }
```

```
void Start_Counting()
{
/***********************************
Initialize counters for data
acquistion.  Disable all interupts
except ET0 & EX0.
***********************************/
  unsigned int i;

DONE_FLAG=FALSE;              /* Flag to indicate that count has    */
                                /*   been received cleared            */
  Transducer_error=FALSE;       /* Flag to indicate that transducer   */
                                /*   signal is okay                   */

IE=0x00;                      /* All interrupts disabled            */
  P1_7=1;                       /* Reset the 4020 Counter             */

TH0=0x00;                     /* Set Timer 0 High Byte to 0         */
  TL0=0x00;                     /* Set Timer 0 Low  Byte to 0         */

TMOD=0x29;                    /* Setting TMOD=29h means:            */
                                /*   Timer 1: 8 bit Auto Reload Timer,*/
                                /*            Counter enabled when    */
                                /*               TR1=1                */
                                /*   Timer 0: 16 bit Timer, Count when*/
                                /*               when INT0 high       */

IT0=1;                        /* Set INT0 to be edge triggered.     */
  EX0=1;                        /* Enable INT0 reception              */
  EX1=1;                        /* Enable INT1 reception              */
  ET0=1;                        /* Enable Timer 0 Overflow interrupt  */
                                /*   reception                        */
  ES=1;                         /* Enable serial port interrupt       */
                                /*   reception                        */

Acqu_Started = TRUE;          /* Set Flag that reading has been     */
                                /*   started                          */

Transducer_error=FALSE;

EA=1;                         /* Enable all enabled interrupts to be*/
                                /*   received                         */

TR0=1;                        /* Timer 0 started (when INT0 high)   */

P1_7=0;                       /* Allow 4020 to start counting       */

Turn_Alarm_Off();
  Mask_Alarm();
  Next_Alarm_Hundreths=(XBYTE[HUNDRETHS]+Time_Out_Time)%100;
  XBYTE[ALARM_HUNDRETHS]=Next_Alarm_Hundreths;
  Turn_Alarm_On();

}  /* End Start_Counting() */

/*******************************************/
/*                                         */
/*            Interrupt Routines           */
/*                                         */
/*******************************************/
```

```
/***********************************************/
/*                                             */
/*        External Interrupt 0 Routine         */
/*                                             */
/* External Interrupt 0 is connected to 4020   */
/***********************************************/ void Int0Hndl() interrupt 0 using 1
{
  EA=0;          /* Disable all interrupt reception */ if(P1_7)       /* If 4020 is in reset mode, */
  {
    TL0=0;       /* clear timer 0 low byte */
    TH0=0;       /*   "     "    "  high " */
  }
  else
  {
    TR0=0;                   /* Turn internal timer off */
    P1_7=1;                  /* Reset 4020 */
    DONE_FLAG=TRUE;          /* Set flag that acquisition is done */
    Transducer_error=FALSE;  /* No transducer error was encountered */
    Acqu_Started=FALSE;      /* Acquisition is done */
    Turn_Alarm_Off();        /* Turn time-out alarm off */
    ET0=0;                   /* Disable Timer 0 Interrupt Reception */
    EX0=0;                   /* Disable 4020 Interrupt Reception */
    EX1=0;                   /* Disable RTC Interrupt Reception */
  }

EA=1;                      /* Enable all enabled interrupt reception */
}

/***********************************************************/
/*                                                         */
/*               Interrupt 1 Routine                       */
/*                                                         */
/*  This procedure is the external interrupt 1             */
/*  handler for the 8031.                                  */
/*                                                         */
/*  In this application, INT1 will be activated by the     */
/*  ICM7170 Real Time Clock.                               */
/*                                                         */
/***********************************************************/ void Int1Hndl() interrupt 2 using 1
{
  EA=0;                   /* disable interrupt reception */ if(Acqu_Started)        /* If data acquisition has been started */
  {
    TR0=0;                     /* Turn off timer 0 */
    EX0=0;                     /* Disable ext. int 0 reception */
    Transducer_error=TRUE;     /* transducer error has been encountered */
    DONE_FLAG=FALSE;           /* acquisition has NOT been completed successfully */
    Acqu_Started=FALSE;        /* acquisition done */
    Turn_Alarm_Off();          /* Turn time-out alarm off */
  }
  else                    /* Time for another sample */
  {
    Sample_Needed=TRUE;   /* set flag for sample needed */
    Turn_Sec_Off();       /* turn 1 second interrupt generator off */
  }
```

```
646   EX1=0;                        /* turn off ext. int 1 reception */
647   clock_status=XBYTE[CLOCK_INT_STATUS]; /* clear int. froom 7170 */
648   while(!INT1);                 /* wait till int. 1 is cleared */
649   EA=1;                         /* enable all enabled interrupt reception */
650 }
651
652
653 /*****************************************************/
654 /*                                                   */
655 /*            Timer 0 Overflow Routine               */
656 /*                                                   */
657 /*****************************************************/
658 void Timer_Flag_0() interrupt 1 using 2  /* check transducer signal */
659 {
660   EA=0;                         /* Disable all interrupt reception */
661   TR0=0;                        /* Turn off timer 0 */
662   EX0=0;                        /* Disable ext. int 0 reception */
663   Transducer_error=TRUE;        /* XDCR error encountered */
664   Acqu_Started=FALSE;           /* Acquisition completed */
665   Turn_Alarm_Off();             /* Turn time-out alarm off */
666   EX1=0;                        /* disable ext int. 1 reception */
667   EA=1;                         /* enable all enabled interrupt reception */
668 }
669
670 /*****************************************************/
671 /*                                                   */
672 /*            Timer 1 Overflow Routine               */
673 /*                                                   */
674 /*****************************************************/
675 void Timer_Flag_1() interrupt 3 using 2
676 {
677   ET1=0;                        /* Disable timer 1 interrupt reception */
678 }
679
680
681 /*****************************************************
682  This program receives a character from the UART,
683  (strips off bit 8 of the character),I NO LONGER STRIP OFF MSB
684  and puts the
685  character into buffer INBUF.
686     The program is interupt driven, so a check is
687  made if a Transmit Buffer Empty interupt occurred.
688
689 History: 6/88, MJL - Created.
690 *****************************************************/
691 void RS_232() interrupt 4 using 3
692 {
693   char temp;    /* temporary character storage */
694
695   if(RI)                    /* If character received */
696   {
697     RI=0;                   /* clear character received bit */
698     temp=SBUF;              /* place received character into temp */
699     if(temp==WAKE_UP)       /* if character received is a WAKE-UP, */
700     {
701       CONNECT = TRUE;       /* laptop with proper software is loaded */
702       State = 1;            /* grid attached state activated */
703     }
704     if(CONNECT)             /* if grid attached, */
705     {
706       KP=TRUE;                          /* key is pressed */
707       INBUF[pinbufh] = temp;            /* place character into input buffer */
708       pinbufh = ++pinbufh & MaxBuf;     /* increment head pointer */
```

```
709      if (pinbufh == pinbuft)            /* if buffer full, */
710         pinbuft = ++pinbuft & MaxBuf;
711      }
712   }
713
714   if(TI)                                /* if character transmitted */
715      {
716        TI=0;                            /* clear transmit flag */
717        OK_TO_SEND=TRUE;                 /* now okay to send flag */
718      }
719 }
720
721
722 /* write_ram writes data d to virtual address address */
723 void write_ram(unsigned long address, unsigned char d)
724 {
725   EA=0;                                 /* Disable Interrupt Reception */
726
727   if ((address>=0)&&(address<=0x07FFF))  /* Use Bank 0 */
728   {
729     Bank0;
730     XBYTE[(unsigned int)address+0x8000]=d;   /* Correct for real address */
731     EA=1;
732     return;
733   }
734   if ((address>=0x8000)&&(address<=0x0FFFF))  /* Use Bank 1 */
735   {
736     Bank1;
737     XBYTE[(unsigned int)address]=d;      /* Correct for real address */
738     EA=1;
739     return;
740   }
741   if ((address>=0x10000)&&(address<=0x17FFF)) /* Use Bank 2 */
742   {
743     Bank2;
744     XBYTE[(unsigned int)address-0x8000]=d;   /* Correct for real address */
745     EA=1;
746     return;
747   }
748   if ((address>=0x18000)&&(address<=0x1FFFF)) /* Use Bank 3 */
749   {
750     Bank3;
751     XBYTE[(unsigned int)(address-0x10000)]=d;  /* Correct for real address */
752     EA=1;
753     return;
754   }
755
756 }
757
758 /* read_ram reads data d from */
759 unsigned char read_ram(unsigned long address)
760 {
761   unsigned char d;
762
763   EA=0;
764
765   if ((address>=0)&&(address<=0x07FFF))       /* Use Bank 0 */
766   {
767     Bank0;
768     d=XBYTE[(unsigned int)address+0x8000];    /* Correct for real address */
769     EA=1;
770     return(d);
771   }
772   if ((address>=0x8000)&&(address<=0x0FFFF))  /* Use Bank 1 */
773   {
```

```
774       Bank1;
775       d=XBYTE[(unsigned int)address];          /* Correct for real address */
776       EA=1;
777       return(d);
778     }
779     if ((address>=0x10000)&&(address<=0x17FFF))  /* Use Bank 2 */
780     {
781       Bank2;
782       d=XBYTE[(unsigned int)address-0x8000];   /* Correct for real address */
783       EA=1;
784       return(d);
785     }
786     if ((address>=0x18000)&&(address<=0x1FFFF))  /* Use Bank 3 */
787     {
788       Bank3;
789       d=XBYTE[(unsigned int)(address-0x10000)]; /* Correct for real address */
790       EA=1;
791       return(d);
792     }
793
794 }
795
796
797 /* store record whose head pointer is passed into this function */
798 void store_Record(unsigned char *data_point)
799 {
800    int k=0;
801
802    Memory_Full=read_ram(MEMFULL); /* get memory full from data ram */
803
804    /* Read next available address from data RAM */
805    for(k=0; k<4; k++)
806      Next_Addr.byte[k] = read_ram(NEXT_ADDR+k);
807
808
809 /* write data record to data RAM */
810    k=0;
811    while(k<=Max_Record_Index && !Memory_Full)
812    {
813      write_ram(Next_Addr.l, data_point[k]);
814      Next_Addr.l++;
815      k++;
816
817      if (Next_Addr.l==End_of_Memory+1)
818      {
819        Memory_Full=TRUE;
820        write_ram(MEMFULL,Memory_Full);
821        write_ram(PROGRAM_STATUS,0x1F);
822      }
823    }
824
825    /* Update next available address in data RAM */
826    for(k=0;k<4;k++)
827      write_ram(NEXT_ADDR+k,Next_Addr.byte[k]);
828
829 }
830
831 void Erase_Ram()
832 {
833
834    int
835      k=0,         /* general counter */
836      address,     /* address used */
837      Done=FALSE;  /* done flag */
838
```

```
839    /* output status message */
840    LCD_BIT=TRUE;
841    tell_LCD(LCD_HOME_4);
842    printf(" 2MQPT BEING ERASED ");
843
844    write_ram(PROGRAM_STATUS,0xBF);
845
846    /* start erasing past protected memory */
847    Present_Bank=0;
848    address=Start_of_Memory+RAM_BASE;
849    while(!Done)
850    {
851      switch(Present_Bank)
852      {
853        case 0:  Bank0; break;
854        case 1:  Bank1; break;
855        case 2:  Bank2; break;
856        default: Bank3;
857      }
858
859
860      XBYTE[address]=0x0FF;
861
862      address++;
863      if (address==0)
864      {
865        address=RAM_BASE;
866        Present_Bank++;
867        if (Present_Bank>3)
868        {
869          Done=TRUE;
870          Memory_Full=FALSE;
871          Next_Addr.l = Start_of_Memory;
872          for(k=0;k<4;k++)
873            write_ram(NEXT_ADDR+k,Next_Addr.byte[k]);
874          write_ram(MEMFULL,Memory_Full);
875          write_ram(PROGRAM_STATUS,0x0FF);
876
877        }
878      }
879    }
880
881    LCD_BIT=TRUE;
882    tell_LCD(LCD_HOME_4);
883    printf(" 2MQPT MEMORY ERASED");
884    wait(25000);
885
886 }
887
888
889 putchar(char a)
890 /**********************************************************************/
891 /* This function will put data from the printf statement to the port   */
892 /*   selected by the LCD_BIT                                           */
893
894 {
895   if (LCD_BIT)   /* If output bit is to be placed to to LCD */
896   {
897     ES=0;                        /* Disable serial port int. reception */
898     XBYTE[LCD_DISPLAY]=a;        /* send character to LCD */
899     ES=1;                        /* Enable serial port int. reception */
900   }
901   else                           /* Send character to serial port */
902   {
```

```
903       while (!OK_TO_SEND);          /* wait until okay to send */
904       SBUF=a;                       /* send character to serial port */
905       OK_TO_SEND=FALSE;             /* not okay to send another character */
906    }
907
908 /************************************************************************/
909 } /* end function putchar() */
910 /************************************************************************/
911
912 unsigned char getch()
913 /************************************************************************/
914 /* This function will get data from the serial port buffer              */
915 /************************************************************************/
916 {
917 unsigned char C;
918
919    /* wait for a character to be placed into buffer */
920
921    while (!KP)                       /* Buffer is empty if this bit cleared */
922      if (!CONNECT)                   /* are we disconnected from the surface */
923        return (0);
924    ES=0;                             /* Disallow interrupts so pointers are  */
925    C = INBUF[pinbuft];               /*   not fouled up while getting the    */
926    pinbuft = ++pinbuft & MaxBuf;     /* character from the buffer. Bump      */
927    if (pinbuft == pinbufh)           /* If no more characers in buffer then  */
928      KP=0;                           /* clear keypress bit                   */
929    ES=1;                             /* to show this character gone and allow */
930    return(C);                        /*   interrupts before returning        */
931 }
932
933
934 /****************************************************
935      This programs initializes the on chip UART
936      for 9600 baud, 8 bits, no parity, one stop bit.
937      The SEND and RECEIVE interupts are activated.
938      History:        Created        6/88, MJL
939 Added Header 12/88, MJL
940 ****************************************************/
941 void init_uart()
942 {
943
944    PCON=0x80;                        /* SMOD=1 (Double Baud rate) */
945    SCON=0x52;                        /* 8 bit UART, variable baud rate */
946
947    TI=0;                             /* clear TI and RI */
948    RI=0;
949
950    EX1=0;                            /* Disable ext. int. 1 reception */
951    ET1=0;                            /* Disable timer 1 overflow reception */
952    EX0=0;                            /* Disable ext. int. 0 reception */
953    ET0=0;                            /* Disable timer 0 overflow reception */
954
955    TMOD=0x29;                        /* tmr1=baud rate*/
956    TH1=0x0fa;                        /* 4800x2=9600 baud*/
957    TL1=0x00;
958    TCON=0x45;                        /* Timer 1 turned on, both external */
959                                      /*   interrupts edge triggered */
960    IP=0x10;                          /* Serial port has highest priority */
961    TR1=1;                            /* Turn on timer 1 */
962    ES=1;                             /* enable serial port interrupt reception */
963    EA=1;                             /* enable all enabled interrupt reception */
964
965    OK_TO_SEND=TRUE;                  /* okay to send */
966
```

```
967  }
968
969  /* Dump the contents of the input buffer */
970  dumpkp()
971  {
972     while (KP)
973        getch();
974  }
975
976
977  /*******************************************************************/
978  /* SetClock - Sets clock to time 00:00:00.00, 1/1/91               */
979  /*            if time has not been set already.                    */
980  /*******************************************************************/
981  void SetClock()
982  {
983
984     EA=0;
985     IT1=0;
986     Bank0;
987
988     if(XBYTE[ALARM_DAY_OF_WEEK] != 0x85)    /* If clock has not been set */
989     {
990
991        /* Normal mode, interrupts disabled, clock stopped, 24 hour mode,
992           and 32.768KHz clock used.                                   */
993
994        clock_command=0xC4;
995        XBYTE[CLOCK_COMMAND]=clock_command;
996        XBYTE[SAVED_CLOCK_COMMAND+0x8000]=clock_command;
997
998        /*  Set time and alarm bytes  */
999
1000       XBYTE[HUNDRETHS]=0;            /*  Hundreths = 0             */
1001       XBYTE[HOURS]=0;                /*  Hours = 0                 */
1002       XBYTE[MINUTES]=0;              /*  Minutes = 0               */
1003       XBYTE[SECONDS]=0;              /*  Seconds = 0               */
1004       XBYTE[MONTH]=1;                /*  Month = 1 (January)       */
1005       XBYTE[DATE]=1;                 /*  Date = 1                  */
1006       XBYTE[YEAR]=90;                /*  Year = 90 (1990)          */
1007       XBYTE[DAY_OF_WEEK]=1;          /*  Day of week = 1 (Monday)  */
1008       XBYTE[ALARM_HUNDRETHS]=0x80;   /*  Alarm Hundreths = 0       */
1009       XBYTE[ALARM_HOURS]=0x40;       /*  Alarm Hours = 0           */
1010       XBYTE[ALARM_MINUTES]=0x80;     /*  Alarm Minutes = 0         */
1011       XBYTE[ALARM_SECONDS]=0x80;     /*  Alarm Seconds = 0         */
1012       XBYTE[ALARM_MONTH]=0x81;       /*  Alarm Month = 1 (January) */
1013       XBYTE[ALARM_DATE]=0x81;        /*  Alarm Date = 1            */
1014       XBYTE[ALARM_YEAR]=0x0CA;       /*  Alarm Year = 90 (1990)    */
1015
1016
1017       /* Normal mode, interrupts disabled, clock started, 24 hour mode,
1018          and 32.768KHz clock used. */
1019
1020       clock_command=0xCC;
1021       XBYTE[CLOCK_COMMAND]=clock_command;       /* set clock command */
1022       XBYTE[SAVED_CLOCK_COMMAND+0x8000]=clock_command;
1023                                                 /* Save Clock command in */
1024                                                 /* memory */
1025
1026       clock_mask=0;
1027       XBYTE[CLOCK_INT_MASK]=clock_mask;         /* set clock interrupt mask */
1028       XBYTE[SAVED_CLOCK_INT_MASK+0x8000]=clock_mask; /* Save Clock Interrupt
1029                                                        Mask in memory */
1030
```

```
1031
1032
1033        /* Set the alarm day of week ram byte to 85H, therefore enabling the
1034           mask bit for that byte.  This will be a flag that the clock
1035           has or has not been set.                                      */
1036
1037      XBYTE[ALARM_DAY_OF_WEEK]=0x85;    /* Alarm Day of Week =    */
1038
1039
1040   }
1041
1042   else
1043   {
1044
1045      clock_command=0xCC;
1046      XBYTE[CLOCK_COMMAND]=clock_command;         /* set clock command */
1047      XBYTE[SAVED_CLOCK_COMMAND+0x8000]=clock_command;
1048                                                  /* Save Clock command in */
1049                                                  /*  memory */
1050
1051      clock_mask=0;
1052      XBYTE[CLOCK_INT_MASK]=clock_mask;           /* set clock interrupt mask */
1053      XBYTE[SAVED_CLOCK_INT_MASK+0x8000]=clock_mask;
1054                                                  /* Save Clock Interrupt  */
1055                                                  /*    Mask in memory */
1056
1057   }
1058
1059   EA=1;
1060
1061 }
1062
1063 /************************************************************/
1064 /*                                                          */
1065 /*  GetTime.C                                               */
1066 /*                                                          */
1067 /*  This function obtains the time from the ICM7170         */
1068 /*  and stores the month, date, hour, etc. into             */
1069 /*  global variables to be used however.                    */
1070 /*                                                          */
1071 /************************************************************/
1072
1073 void GetTime()
1074
1075 {
1076
1077      Hundreths = XBYTE[HUNDRETHS];       /* Latch time bytes */
1078
1079      Seconds   = XBYTE[SECONDS];
1080      Minutes   = XBYTE[MINUTES];
1081      Hours     = XBYTE[HOURS];
1082      Date      = XBYTE[DATE];
1083      Month     = XBYTE[MONTH];
1084      Year      = XBYTE[YEAR];
1085
1086 }
1087
1088
1089 /******************************************************/
1090 /* LCD_line(int number,int position)       */
1091 /******************************************************/
1092 void LCD_line(int number,int position)
1093 {
1094   wait(10);
1095
```

```
1096    switch(number)
1097    {
1098      case 1:    tell_LCD(LCD_HOME_1+position);
1099                 break;
1100      case 2:    tell_LCD(LCD_HOME_2+position);
1101                 break;
1102      case 3:    tell_LCD(LCD_HOME_3+position);
1103                 break;
1104      case 4:    tell_LCD(LCD_HOME_4+position);
1105                 break;
1106
1107    }
1108  }  /* end function LCD_line() */
1109
1110
1111  void LCD_setup()
1112  {
1113    tell_LCD(LCD_SETUP);
1114    tell_LCD(LCD_ON);
1115    tell_LCD(LCD_HOME_1);
1116    tell_LCD(LCD_CLEAR);
1117
1118  }  /* end function setup_LCD() */
1119
1120
1121  void tell_LCD(int n)
1122  {
1123    XBYTE[LCD_COMMAND]=n;
1124    wait(20);
1125  }
1126
1127  void wait(int Count)
1128  {
1129    while (Count > 0) Count--;
1130  }
1131
1132  /************************************************************/
1133  /*                                                          */
1134  /* GoSleep                                                  */
1135  /*                                                          */
1136  /* This function places the 8031 into idle mode so as       */
1137  /* to conserve power.  The only way the 8031 can be         */
1138  /* brought out of idle mode without a hardware reset        */
1139  /* is the reception of an enabled interrupt.                */
1140  /*                                                          */
1141  /* Once an interrupt is received, the interrupt routine     */
1142  /* for that interrupt will be executed, and after a         */
1143  /* return from interrupt, program execution will con-       */
1144  /* tinue with the instruction following the call            */
1145  /* GoSleep();.                                              */
1146  /*                                                          */
1147  /************************************************************/
1148
1149  void GoSleep()
1150  {
1151    if(Acqu_Started)
1152      Turn_Alarm_On();
1153    else
1154      Turn_Sec_On();
1155    Idle();
1156
1157  }
1158
```

```
1159 void Idle()
1160 {
1161   char temp;
1162   temp=PCON;
1163   temp=temp|0x01;
1164   PCON=temp;
1165 }
1166
1167
1168 void Turn_Sec_On()
1169 {
1170   EX1=0;
1171   Bank0;
1172   XBYTE[CLOCK_INT_MASK]=0;
1173   clock_status=XBYTE[CLOCK_INT_STATUS];
1174   clock_command=0xDC;
1175   XBYTE[SAVED_CLOCK_COMMAND+0x8000]=clock_command;
1176   XBYTE[CLOCK_COMMAND]=clock_command;
1177   clock_mask=0x08;
1178   XBYTE[SAVED_CLOCK_INT_MASK+0x8000]=clock_mask;
1179   XBYTE[CLOCK_INT_MASK]=clock_mask;
1180   EX1=1;
1181 }
1182
1183 void Turn_Sec_Off()
1184 {
1185   EX1=0;
1186   Bank0;
1187   XBYTE[CLOCK_INT_MASK]=0;
1188   clock_status=XBYTE[CLOCK_INT_STATUS];
1189   clock_command=0xCC;
1190   XBYTE[SAVED_CLOCK_COMMAND+0x8000]=clock_command;
1191   XBYTE[CLOCK_COMMAND]=clock_command;
1192   clock_mask=0;
1193   XBYTE[SAVED_CLOCK_INT_MASK+0x8000]=clock_mask;
1194   XBYTE[CLOCK_INT_MASK]=clock_mask;
1195 }
1196
1197
1198 void Turn_Alarm_On()
1199 {
1200   EX1=0;
1201   Bank0;
1202   XBYTE[CLOCK_INT_MASK]=0;
1203   clock_status=XBYTE[CLOCK_INT_STATUS];
1204   clock_command=0xDC;
1205   XBYTE[SAVED_CLOCK_COMMAND+0x8000]=clock_command;
1206   XBYTE[CLOCK_COMMAND]=clock_command;
1207   clock_mask=0x01;
1208   XBYTE[SAVED_CLOCK_INT_MASK+0x8000]=clock_mask;
1209   XBYTE[CLOCK_INT_MASK]=clock_mask;
1210   EX1=1;
1211 }
1212
1213 void Turn_Alarm_Off()
1214 {
1215   EX1=0;
1216   Bank0;
1217   XBYTE[CLOCK_INT_MASK]=0;
1218   clock_status=XBYTE[CLOCK_INT_STATUS];
1219   clock_command=0xCC;
1220   XBYTE[SAVED_CLOCK_COMMAND+0x8000]=clock_command;
1221   XBYTE[CLOCK_COMMAND]=clock_command;
1222   clock_mask=0;
```

```
1223    XBYTE[SAVED_CLOCK_INT_MASK+0x8000]=clock_mask;
1224    XBYTE[CLOCK_INT_MASK]=clock_mask;
1225 }
1226
1227 void Mask_Alarm()
1228 {
1229    XBYTE[ALARM_HUNDRETHS]=0x80;    /* Alarm Hundreths = 0          */
1230    XBYTE[ALARM_HOURS]=0x40;        /* Alarm Hours = 0              */
1231    XBYTE[ALARM_MINUTES]=0x80;      /* Alarm Minutes = 0            */
1232    XBYTE[ALARM_SECONDS]=0x80;      /* Alarm Seconds = 0            */
1233    XBYTE[ALARM_MONTH]=0x81;        /* Alarm Month = 1 (January)    */
1234    XBYTE[ALARM_DATE]=0x81;         /* Alarm Date = 1               */
1235    XBYTE[ALARM_YEAR]=0x0CA;        /* Alarm Year = 90 (1990)       */
1236 }
1237
1238

1 /*****************************************************************************/
 2 /* MQPT-CVT.C - This module is used by the main module MQPT.C                */
 3 /* It contains functions dealing with data conversion.                       */
 4 /*                                                                           */
 5 /*                                                                           */
 6 /*                                                                           */
 7 /*                                                                           */
 8 /*. Compiler:  Franklin 8051 C-Compiler V2.51, SN# 50102134                  */
 9 /* Assembler: Franklin 8051 Assembler V4.4                                   */
10 /*                                                                           */
11 /*    Other Source Files Needed:   STARTUP.A51                               */
12 /*                                 MQPT.H                                    */
13 /*                                 MQPT.C                                    */
14 /*                                 MQPT_CMD.C                                */
15 /*                                                                           */
16 /*****************************************************************************/
17
18 #pragma pw(79)
19 #pragma large
20 #pragma debug
21
22 #include <c:\c51\stdio.h>
23 #include <C:\c51\stdlib.h>
24 #include <c:\c51\ctype.h>
25 #include <c:\c51\string.h>
26 #include <c:\c51\math.h>
27 #include <c:\c51\reg51.h>
28 #include <c:\c51\mqptv2_2\mqpt.h>
29 #include <C:\c51\absacc.h>
30
31 /*****************************************************************************/
32 /* FUNCTION PROTO-TYPES                                                      */
33
34 void read_cal_factors();
35 float ctof(unsigned count);
36 float freq_to_temperature(float tf, unsigned t_num);
37 float press_conv(float pfreq, float tfreq, unsigned t_num);
38
39 extern void write_ram(unsigned long address, unsigned char d);
40 extern unsigned char read_ram(unsigned long address);
41
42
43 /*****************************************************************************/
44 /* GLOBAL VARIABLES                                                          */
45 /*                                                                           */
46
```

```
47  union vardata
48  {
49    float        number;
50    long int     value;
51    unsigned char byte[4];
52  };
53
54  /* calibration factors */
55  extern float gx[2][5], hx[2][5], ix[2][5], jx[2][5], kx[2][5], tx[2][5];
56
57  /* calibration frequency offsets */
58  extern int f0[2],f1[2];
59
60  extern bit LCD_BIT;
61
62  float start_time_number;
63
64  void read_cal_factors()
65  /***********************************************************************/
66  {
67    unsigned int cal_data_base,
68         j,i,k;
69
70    union vardata scratch;
71
72    cal_data_base = CAL_DATA_BASE;
73
74    Bank0;
75
76
77    scratch.value = 0;
78    for (i=0;i<2;i++)
79      scratch.byte[i+2] = read_ram(CAL_OFFSET_P0+i);
80    f0[0] = (int)scratch.value;
81
82    scratch.value = 0;
83    for (i=0;i<2;i++)
84      scratch.byte[i+2] = read_ram(CAL_OFFSET_T0+i);
85    f1[0] = (int)scratch.value;
86
87    scratch.value = 0;
88    for (i=0;i<2;i++)
89      scratch.byte[i+2] = read_ram(CAL_OFFSET_P1+i);
90    f0[1] = (int)scratch.value;
91
92    scratch.value = 0;
93    for (i=0;i<2;i++)
94      scratch.byte[i+2] = read_ram(CAL_OFFSET_T1+i);
95    f1[1] = (int)scratch.value;
96
97
98    for (k=0; k<2; k++)
99    {
100     /* get G[][] calibration coef. */
101
102     for (i=0;i<5;i++)
103     {
104       for (j=0;j<4;j++)
105         scratch.byte[j] = read_ram(cal_data_base++);
106       gx[k][i] = scratch.number;
107     }
108
109
110     /* get H[][] calibration coef. */
```

```
111
112       for (i=0;i<5;i++)
113       {
114         for (j=0;j<4;j++)
115           scratch.byte[j] = read_ram(cal_data_base++);
116         hx[k][i] = scratch.number;
117       }
118
119   /* get I[][] calibration coef. */
120
121       for (i=0;i<5;i++)
122       {
123         for (j=0;j<4;j++)
124           scratch.byte[j] = read_ram(cal_data_base++);
125         ix[k][i] = scratch.number;
126       }
127
128
129   /* get J[][] calibration coef. */
130
131       for (i=0;i<5;i++)
132       {
133         for (j=0;j<4;j++)
134           scratch.byte[j] = read_ram(cal_data_base++);
135         jx[k][i] = scratch.number;
136       }
137
138
139   /* get K[][] calibration coef. */
140
141       for (i=0;i<5;i++)
142       {
143         for (j=0;j<4;j++)
144           scratch.byte[j] = read_ram(cal_data_base++);
145         kx[k][i] = scratch.number;
146       }
147
148   /* get T[][] calibration coef. */
149
150       for (i=0;i<5;i++)
151       {
152         for (j=0;j<4;j++)
153           scratch.byte[j] = read_ram(cal_data_base++);
154         tx[k][i] = scratch.number;
155       }
156   }
157  /*******************************************************************/
158  } /* end function read_cal_factors() */
159  /*******************************************************************/
160
161
162  float ctof (unsigned int count)
163  /*******************************************************************/
164  /* converts counts to frequency */
165  {
166    if (count == 0) return ((float)(0));
167    return ((float)F1/ count);       /* F1 = (512 * (11059200 / 12)) */
168  }
169
170
171  float freq_to_temperature (float tf, unsigned int t_num)
172  /*******************************************************************/
173  /* This function calculates temp from temp freq Horner form of the equation */
174
175  {
```

```
176 /*  if (tf > f1[t_num]) */
177     tf = tf - (float)f1[t_num]; /* use cal offset */
178
179   return((((tx[t_num][4]*tf + tx[t_num][3])*tf + tx[t_num][2])*tf +
180      tx[t_num][1])*tf + tx[t_num][0]);
181
182 /****************************************************************/
183 } /* end function freq_to_temperature() */
184 /****************************************************************/
185
186 float press_conv(float pfreq, float correction, unsigned t_num)
187 {
188
189 float pressure,GX,HX,IX,JX,KX,TX;
190
191 /*  if (pfreq > f0[t_num]) */
192   pfreq = pfreq - (float)f0[t_num];   /* use press cal offset */
193
194 /*  The line below should not be used if based on temperature */
195   correction = correction - (float)f1[t_num]; /* use temp cal offset */
196
197    GX = (((gx[t_num][4]*correction + gx[t_num][3])*correction +
198          gx[t_num][2])*correction + gx[t_num][1])*correction + gx[t_num][0];
199    HX = (((hx[t_num][4]*correction + hx[t_num][3])*correction +
200          hx[t_num][2])*correction + hx[t_num][1])*correction + hx[t_num][0];
201    IX = (((ix[t_num][4]*correction + ix[t_num][3])*correction +
202          ix[t_num][2])*correction + ix[t_num][1])*correction + ix[t_num][0];
203    JX = (((jx[t_num][4]*correction + jx[t_num][3])*correction +
204          jx[t_num][2])*correction + jx[t_num][1])*correction + jx[t_num][0];
205    KX = (((kx[t_num][4]*correction + kx[t_num][3])*correction +
206          kx[t_num][2])*correction + kx[t_num][1])*correction + kx[t_num][0];
207
208
209   pressure = (((KX*pfreq + JX)*pfreq + IX)*pfreq + HX)*pfreq + GX;
210
211   return (pressure);
212 }
213
214

1 /****************************************************************/
  2 /*                                                              */
  3 /*   MQPT.H                                                     */
  4 /*                                                              */
  5 /*                                                              */
  6 /*                                                              */
  7 /*                                                              */
  8 /*  Compiler:  Franklin 8051 C-Compiler V2.51, SN# 50102134     */
  9 /*  Assembler: Franklin 8051 Assembler V4.4                     */
 10 /*                                                              */
 11 /*  Other Source Files Needed:  STARTUP.A51                     */
 12 /*                              MQPT.C                          */
 13 /*                              MQPT_CVT.C                      */
 14 /*                              MQPT_CMD.C                      */
 15 /*                                                              */
 16 /****************************************************************/
 17
 18 /****************************************************************/
 19 /*                                                              */
 20 /*                     LCD Definitions                          */
 21 /*                                                              */
 22 /****************************************************************/
 23 #define LCD_COMMAND 0x1000 /* Address of LCD command register   */
 24 #define LCD_SETUP   0x38   /* 0011 1000->setup,8bit mode,2lines,5X7 dot char*/
```

```
25 #define LCD_CLEAR    0x01    /* Command to clear LCD                      */
26 #define LCD_ON       0x0C    /* 1110->display,display on, cursor off      */
27 #define LCD_HOME_1   0x80    /* Home position on line 1                   */
28 #define LCD_HOME_2   0xC0    /* Home position on line 2                   */
29 #define LCD_HOME_3   0x94    /* Home position on line 3                   */
30 #define LCD_HOME_4   0xD4    /* Home position on line 4                   */
31 #define LCD_DISPLAY  0x1001  /* Address of LCD data input                 */
32                             /*   register                                 */
33
34 /*************************************************************************/
35 /*                                                                        */
36 /*              ICM7170 Real Time Clock Definitions                       */
37 /*                                                                        */
38 /*************************************************************************/
39 #define CLOCKBASE 0x6000                    /* Address of Real Time Clock         */
40 #define CLOCK_INT_MASK CLOCKBASE+0x10       /* Addr. of Int. Mask(write only)     */
41 #define CLOCK_INT_STATUS CLOCK_INT_MASK     /*   and Int. Status(read only)       */
42                                             /*   for ICM7170.                     */
43 #define CLOCK_COMMAND CLOCKBASE+0x11        /* Address of command register for    */
44                                             /*   for ICM7170 (write only)         */
45 #define HUNDRETHS CLOCKBASE                 /* Address of Hundreths Register      */
46 #define SECONDS CLOCKBASE+3                 /*    "      "  Seconds      "        */
47 #define MINUTES CLOCKBASE+2                 /*    "      "  Minutes      "        */
48 #define HOURS CLOCKBASE+1                   /*    "      "  Hours        "        */
49 #define DATE CLOCKBASE+5                    /*    "      "  Date         "        */
50 #define MONTH CLOCKBASE+4                   /*    "      "  Month        "        */
51 #define YEAR CLOCKBASE+6                    /*    "      "  Year         "        */
52 #define DAY_OF_WEEK CLOCKBASE+7             /*    "      "  Day          "        */
53 #define ALARM_HUNDRETHS CLOCKBASE+8         /* Address of Hundreths Alarm Reg.    */
54 #define ALARM_SECONDS CLOCKBASE+0x0B        /*    "      "  Seconds    "   "      */
55 #define ALARM_MINUTES CLOCKBASE+0x0A        /*    "      "  Minutes    "   "      */
56 #define ALARM_HOURS CLOCKBASE+9             /*    "      "  Hours      "   "      */
57 #define ALARM_DATE CLOCKBASE+0x0D           /*    "      "  Date       "   "      */
58 #define ALARM_MONTH CLOCKBASE+0x0C          /*    "      "  Month      "   "      */
59 #define ALARM_YEAR CLOCKBASE+0x0E           /*    "      "  Year       "   "      */
60 #define ALARM_DAY_OF_WEEK CLOCKBASE+0x0F    /*    "      "  Day        "   "      */
61 #define EnSecInt 0x08                       /* Int_mask to enable seconds ints.   */
62 #define EnHundInt 0x02                      /* Int_mask to enable hundreths ints. */
63 #define EnAlarmInt 0x01                     /* Int_mask to enable alarm ints.     */
64
65 /*************************************************************************/
66 /*                                                                        */
67 /*              General I/O Line Definitions                              */
68 /*                                                                        */
69 /*************************************************************************/
70 #define PFail (!P1_3)     /* Power Fail Detector PFail=0, power stable    */
71 #define SEL1 P1_4         /* MSB of Multiplexer                           */
72 #define SEL0 P1_0         /* LSB of Multiplexer                           */
73 #define LOWBAT P1_5       /* Low Battery Indicator LOWBAT=0, Battery Good */
74 #define GRID_ATTCH (!P1_1) /* If GRID_ATTCH=1, GRID computer is attached  */
75 #define DTMA16 P1_2       /* Used to drive A16 of 128Kx8 memory           */
76 #define DTMA15 P1_6       /* Used to drive A15 of 128Kx8 memory           */
77
78 /*************************************************************************/
79 /*                                                                        */
80 /*              Data Memory Bank Definitions                              */
81 /*                                                                        */
82 /*************************************************************************/
83 #define Bank0 DTMA16=0; DTMA15=0
84 #define Bank1 DTMA16=0; DTMA15=1
85 #define Bank2 DTMA16=1; DTMA15=0
86 #define Bank3 DTMA16=1; DTMA15=1
87
```

```
 88 /***************************************************************************/
 89 /*                                                                         */
 90 /*                      Data Storage Definitions                           */
 91 /*                                                                         */
 92 /***************************************************************************/
 93
 94 /* A word about data types:                                                 */
 95 /*                                                                         */
 96 /*      CHAR                              = 1 BYTE                         */
 97 /*      INTEGER                           = 2 BYTES                        */
 98 /*      LONG INTEGER                      = 4 BYTES                        */
 99 /*      SINGLE PRECISION FLOATING POINT   = 4 BYTES                        */
100 /*      DOUBLE PRECISION FLOATING POINT   = 8 BYTES                        */
101 /*                                                                         */
102 /*         On all data types, care must be taken that the order of bytes in */
103 /*      memory on the 2MQPT are the same as the host processor.  The       */
104 /*      representation of data types in the FRANKLIN compiler can be found */
105 /*      in the manual.                                                     */
106 /*                                     RML 1-16-91                         */
107
108
109 #define RAM_BASE 0x8000         /* Real Address of 128Kx8 Memory           */
110 #define STORAGEBASE 0           /* Address of Storage Ram                  */
111 #define NEXT_ADDR STORAGEBASE   /* Location of Next available address      */
112                                /*   byte for data (LONG INT)              */
113 #define MEMFULL STORAGEBASE+4   /* Flag to indicate when data              */
114                                /*   memory is full (UNSIGNED CHAR)        */
115
116 #define SAVED_CLOCK_COMMAND STORAGEBASE+5       /* Present 7170 Command    */
117                                                /*   (UNSIGNED CHAR)       */
118 #define SAVED_CLOCK_INT_MASK STORAGEBASE+6      /* Present 7170 Int. Mask  */
119                                                /*   (UNSIGNED CHAR)       */
120
121 /***************************************************************************/
122 #define CONTROL_DATA STORAGEBASE+0x40   /* CONTROL DATA                    */
123 /***************************************************************************/
124
125 #define PRESS_WINDOW CONTROL_DATA               /*       (UNSIGNED INT)    */
126
127 #define PROGRAM_STATUS CONTROL_DATA+2   /* Byte used to show Gauge status  */
128         /* 0x0FF = Not Programmed               (UNSIGNED CHAR)            */
129         /* 0x0BF = Being Erased                                            */
130         /* 0x09F = Programmed, Not Started, Waiting for alarm              */
131         /* 0x07F = Programmed, Not Started, Wait for Countdown             */
132         /* 0x05F = Programmed, Not Started, Start on Next Power On         */
133         /* 0x03F = Programmed, Started, Memory not full                    */
134         /* 0x01F = Programmed, Started, Memory Full                        */
135
136 /* Time to start sampling when alarm is to be used (as opposed to starting  */
137 /*    the next time the tool is powered on).                                */
138 #define START_TIME_DATE CONTROL_DATA+0x03       /*     (UNSIGNED CHAR)     */
139 #define START_TIME_HOURS CONTROL_DATA+0x04      /*            "            */
140 #define START_TIME_MINUTES CONTROL_DATA+0x05    /*            "            */
141
142 #define SAMPLE_PERIOD_MINUTES CONTROL_DATA+6    /*     (UNSIGNED CHAR)     */
143 #define SAMPLE_PERIOD_SECONDS CONTROL_DATA+7    /*            "            */
144
145 /* The fastest record time at which data records can be recorded           */
146 #define FAST_RECORD_MINUTES CONTROL_DATA+8      /*     (UNSIGNED CHAR)     */
147 #define FAST_RECORD_SECONDS CONTROL_DATA+9      /*            "            */
148
149 /* The slowest record time at which data records can be recorded           */
150 #define SLOW_RECORD_MINUTES CONTROL_DATA+0x0A   /*     (UNSIGNED CHAR)     */
151 #define SLOW_RECORD_SECONDS CONTROL_DATA+0x0B   /*            "            */
152
```

```
153 /* The duration time of the test                                         */
154 #define TEST_DURATION_DAYS CONTROL_DATA+0x0C  /*      (UNSIGNED CHAR)     */
155 #define TEST_DURATION_HOURS CONTROL_DATA+0x0D /*          "               */
156
157 /*************************************************************************/
158 #define CAL_DATA_BASE STORAGEBASE+0x100  /* CALIBRATION DATA               */
159 /*************************************************************************/
160
161 /* All Calibration coefficients below are single precision floating point */
162 #define CAL_DATA_P0 CAL_DATA_BASE       /* Start address of P0 Calib. Coeff. */
163 #define CAL_DATA_T0 CAL_DATA_BASE+0x64  /*    "       "    " T0    "    "  */
164 #define CAL_DATA_P1 CAL_DATA_BASE+0x78  /*    "       "    " P1    "    "  */
165 #define CAL_DATA_T1 CAL_DATA_BASE+0xDC  /*    "       "    " T1    "    "  */
166
167 /* All Calibration coefficients below are double precision floating point */
168 #define CAL_DATA_BASE_DP CAL_DATA_BASE+0x0F0 /* These are double prec. coeff.*/
169 #define CAL_DATA_P0_DP CAL_DATA_BASE_DP      /* Start addr. of P0 Cal. Coeff.*/
170 #define CAL_DATA_T0_DP CAL_DATA_BASE_DP+0x0C8/*    "    "    " T0    "    " */
171 #define CAL_DATA_P1_DP CAL_DATA_BASE_DP+0x0F0/*    "    "    " P1    "    " */
172 #define CAL_DATA_T1_DP CAL_DATA_BASE_DP+0x1B8/*    "    "    " T1    "    " */
173
174 /*      All the CAL_OFFSETs below are defined as UNSIGNED INT              */
175 #define CAL_OFFSET_P0 CAL_DATA_BASE_DP+0x1E0 /*      P0 Freq. Offset        */
176 #define CAL_OFFSET_T0 CAL_DATA_BASE_DP+0x1E2 /*      T0   "      "          */
177 #define CAL_OFFSET_P1 CAL_DATA_BASE_DP+0x1E4 /*      P1   "      "          */
178 #define CAL_OFFSET_T1 CAL_DATA_BASE_DP+0x1E6 /*      T1   "      "          */
179
180 #define GAUGE_SERIAL_NUM   CAL_DATA_BASE_DP+0x1E8/* (STRING - 8 UNSIGNED CHAR)*/
181 #define XDCR_0_SERIAL_NUM  CAL_DATA_BASE_DP+0x1F0/*            "              */
182 #define XDCR_1_SERIAL_NUM  CAL_DATA_BASE_DP+0x1F8/*            "              */
183 #define XDCR_0_CALIB_YEAR  CAL_DATA_BASE_DP+0x200/*      (UNSIGNED CHAR)      */
184 #define XDCR_0_CALIB_MONTH CAL_DATA_BASE_DP+0x201/*            "              */
185 #define XDCR_0_CALIB_DATE  CAL_DATA_BASE_DP+0x202/*            "              */
186 #define XDCR_1_CALIB_YEAR  CAL_DATA_BASE_DP+0x203/*            "              */
187 #define XDCR_1_CALIB_MONTH CAL_DATA_BASE_DP+0x204/*            "              */
188 #define XDCR_1_CALIB_DATE  CAL_DATA_BASE_DP+0x205/*            "              */
189
190
191
192 /*************************************************************************/
193 /*                                                                       */
194 /*                      Fixed Variable Definitions                       */
195 /*                                                                       */
196 /*************************************************************************/
197 #define Max_Record_Length 14
198 #define Max_Record_Index  Max_Record_Length-1
199 #define Max_Time_Bytes 6
200 #define Max_Count_Bytes 2
201 #define Max_Bank 4
202 #define Max_Bank_Index Max_Bank-1
203 #define MaxBuf 63
204 #define Start_of_Memory 0x500      /* Will give 9270 Data Records       */
205 #define End_of_Memory 0x1FFF3
206 #define F1   (512 * (11059200 / 12))
207 #define TRUE      1      /* Boolean flag                                */
208 #define FALSE     0      /* Boolean flag                                */
209 #define WAKE_UP   '#'
210 #define START     'S'
211 #define OK        '*'
212 #define RESEND    '-'
213 #define Time_Out_Time 17 /* Time(hundreths of a second) for signal to be */
214                          /*   given up for lost.                        */
215
216
217
CRC-32 DATA   0xB01F22F0
```

$ pw (79)

```
;-------------------------------------------------------------------------
;   STARTUP.A51:  This code is executed after processor reset.
;
;   To translate this file use A51 with the following invocation:
;
;       A51 STARTUP.A51
;
;   To link the modified STARTUP.OBJ file to your application use the following
;   L51 invocation:
;
;       L51 <your object file list>,STARTUP.OBJ <controls>
;
;
;   ⋮
;
;
;   Compiler:  Franklin 8051 C-Compiler V2.51, SN# 50102134
;   Assembler: Franklin 8051 Assembler V4.4
;
;   Other Source Files Needed:  MQPT.C
;                               MQPT.H
;                               MQPT_CVT.C
;                               MQPT_CMD.C
;
;-------------------------------------------------------------------------
;
;   User-defined Power-On Initialization of Memory
;
;   With the following EQU statements the initialization of memory
;   at processor reset can be defined:
;
;                   ; the absolute start-address of IDATA memory is always 0
;   IDATALEN        EQU     80H         ; the length of IDATA memory in bytes.
;                                       ; set to 100H for 8052 and like CPU's
;
;   XDATASTART      EQU     2000H       ; the absolute start-address of XDATA memory
;   XDATALEN        EQU     8192        ; the length of XDATA memory in bytes.
;
;   PDATASTART      EQU     0H          ; the absolute start-address of PDATA memory
;   PDATALEN        EQU     32768       ; the length of PDATA memory in bytes.
;
;   Notes:  The IDATA space overlaps physically the DATA and BIT areas of the
;           8051 CPU. At minimum the memory space occupied from the C-51
;           run-time routines must be set to zero.
;-------------------------------------------------------------------------

NAME    ?C_STARTUP

?C_C51STARTUP   SEGMENT CODE
?STACK          SEGMENT IDATA

RSEG    ?STACK
STACK:  DS      1

EXTRN CODE (?C_START)
                PUBLIC  ?C_STARTUP

CSEG    AT      0
?C_STARTUP:     LJMP    STARTUP1

RSEG    ?C_C51STARTUP

STARTUP1:

IF IDATALEN <> 0
                MOV     R0,#IDATALEN - 1
                CLR     A
```

```
IDATALOOP:      MOV     @R0,A
                DJNZ    R0,IDATALOOP
ENDIF

IF XDATALEN <> 0
                MOV     DPTR,#XDATASTART
                MOV     R7,#LOW (XDATALEN)
    IF (LOW (XDATALEN)) <> 0
                MOV     R6,#(HIGH XDATALEN) +1
    ELSE
                MOV     R6,#HIGH (XDATALEN)
    ENDIF
                CLR     A
XDATALOOP:      MOVX    @DPTR,A
                INC     DPTR
                DJNZ    R7,XDATALOOP
                DJNZ    R6,XDATALOOP
ENDIF

IF PDATALEN <> 0
                MOV     R0,#PDATASTART
                MOV     R7,LOW (PDATALEN)
                CLR     A
PDATALOOP:      MOVX    @R0,A
                INC     R0
                DJNZ    R7,PDATALOOP
ENDIF
                MOV     SP,#LOW (STACK-1)
                LJMP    ?C_START

END
```

What is claimed is:

1. A multiple channel pressure recorder, comprising:
a portable housing constructed and arranged to be used at the surface of an oil or gas well;
a first quartz pressure transducer disposed in said housing;
a second quartz pressure transducer disposed in said housing;
a microcomputer disposed in said housing;
first circuit means, disposed in said housing and connected to said first quartz pressure transducer and said microcomputer, for communicating to said microcomputer a signal responsive to a pressure sensed by said first quartz pressure transducer;
second circuit means, disposed in said housing and connected to said second quartz pressure transducer and said microcomputer, for communicating to said microcomputer a signal responsive to a pressure sensed by said second quartz pressure transducer; and
wherein said microcomputer includes a memory programmed with a data base including predetermined calibration factors for converting the signals responsive to the sensed pressures into corrected signals representing the magnitudes of the sensed pressures.

2. A pressure recorder as defined in claim 1, wherein:
said first and second quartz pressure transducers are disposed in respective liquid containing compartments; and
said pressure recorder further comprises:
first coupling means, connected to said housing and said first quartz pressure transducer, for retaining a liquid in communication with the liquid in which said first quartz pressure transducer is disposed and for coupling at the surface of the oil or gas well with a first pressure source so that pressure from the first pressure source is communicated to said first quartz pressure transducer through the liquid in said first coupling means; and
second coupling means, connected to said housing and said second quartz pressure transducer, for retaining a liquid in communication with the liquid in which said second quartz pressure transducer is disposed and for coupling at the surface of the oil or gas well with a second pressure source so that pressure from the second pressure source is communicated to said second quartz pressure transducer through the liquid in said second coupling means.

3. A pressure recorder as defined in claim 2, further comprising one and only one electrical communication coupling means, connected to said housing, for providing electrical conductors through which all external electrical communications with said pressure recorder are made.

4. A pressure recorder as defined in claim 3, further comprising display means, connected to said housing and said microcomputer, for displaying magnitudes of pressure in response to said corrected signals from said microcomputer.

5. A pressure recorder as defined in claim 4, further comprising a rechargeable battery disposed in said housing and connected to said microcomputer and said first and second circuit means.

6. A pressure recorder as defined in claim 5, further comprising first and second temperature sensing circuits disposed in said housing adjacent said first and second pressure circuit means and connected to said microcomputer.

7. A pressure recorder as defined in claim 6, further comprising data transmission means, connected to said microcomputer, for transmitting real-time data through said one and only one electrical communication coupling means in response to said corrected signals.

8. A multiple channel pressure recorder, comprising:
a portable housing, said housing sealed against contamination by the environment at the surface of an oil or gas well;
a first quartz pressure transducer gauge assembly disposed in said housing;
a second quartz pressure transducer gauge assembly disposed in said housing;
a first pressure transducer circuit connected to said first quartz pressure transducer gauge assembly and disposed in said housing adjacent said gauge assemblies;
a second pressure transducer circuit connected to said second quartz pressure transducer gauge assembly and disposed in said housing adjacent said gauge assemblies;
a first temperature sensing circuit disposed in said housing adjacent said first pressure transducer circuit;
a second temperature sensing circuit disposed in said housing adjacent said second pressure transducer circuit; and
a microcomputer disposed in said housing and connected for receiving signals from said first and second pressure transducer circuits and said first and second temperature sensing circuits, said microcomputer including means for automatically computing corrected pressure magnitude signals in response to said signals from said first and second pressure transducer circuits, said first and second temperature sensing circuits and predetermined calibration factors entered in said microcomputer.

9. A pressure recorder as defined in claim 8, further comprising a serial data transmission circuit for transmitting out of said pressure recorder real-time serial output signals responsive to said corrected pressure magnitude signals.

10. A pressure recorder as defined in claim 8, further comprising a rechargeable battery disposed in said housing adjacent said gauge assemblies for energizing said recorder.

11. A pressure recorder as defined in claim 8, wherein:
said recorder further comprises a removable support plate mounted in said housing adjacent said gauge assemblies; and
each of said first and second pressure transducer circuits and said first and second temperature sensing circuits is mounted on a respective printed circuit board connected to said support plate.

12. A pressure recorder as defined in claim 8, further comprising:
a multiplexer having inputs connected to said first and second pressure transducer circuits and said first and second temperature sensing circuits; and
a counter connected to an output of said multiplexer and an input of said microcomputer.

13. A pressure recorder as defined in claim 8, further comprising one and only one electrical communication coupling means, connected to said housing, for providing electrical conductors through which all external electrical communications with said pressure recorder are made.

14. A pressure recorder as defined in claim 8, further comprising display means, connected to said housing and said microcomputer, for displaying magnitudes of pressure in response to said corrected pressure magnitude signals from said microcomputer.

15. A pressure recorder as defined in claim 8, wherein said pressure recorder further comprises:
first coupling means, connected to said housing and said first quartz pressure transducer gauge assembly, for coupling at the surface of the oil or gas well with a first pressure source so that pressure from the first pressure source is communicated to said first quartz pressure transducer gauge assembly through said first coupling means; and
second coupling means, connected to said housing and said second quartz pressure transducer gauge assembly, for coupling at the surface of the oil or gas well with a second pressure source so that pressure from the second pressure source is communicated to said second quartz pressure transducer gauge assembly through said second coupling means.

16. A pressure recorder as defined in claim 8, wherein said microcomputer includes means for selectably recording in response to a preset real time alarm value or a preset countdown value.

17. A pressure recorder as defined in claim 8, wherein said microcomputer includes memory means for storing data in response to sensed pressures and temperatures and further including means for testing said memory means.

18. A pressure recorder as defined in claim 8, wherein said microcomputer includes means for testing said first and second quartz pressure transducers.

19. A surface two channel oil or gas well pressure recorder, comprising:
a compact housing constructed and arranged to be hand-carried at the surface of an oil or gas well and used thereat outside a downhole environment of the well;
a first pressure transducer assembly disposed inside said housing so that said first pressure transducer assembly is intrinsically transportable with said housing and remains inside said housing when sensing pressure;
a second pressure transducer assembly disposed inside said housing so that said second pressure transducer assembly is intrinsically transportable with said housing and remains inside said housing when sensing pressure;
a first pressure transducer circuit disposed inside said housing and connected to said first pressure transducer assembly;
a second pressure transducer circuit disposed inside said housing and connected to said second pressure transducer assembly; and
a microcomputer disposed inside said housing and connected to said first pressure transducer circuit and said second pressure transducer circuit, said microcomputer programmed to automatically compute inside said housing corrected pressure magnitude signals in response to signals received by said microcomputer from said first and second pressure transducer circuits.

20. A surface two channel oil or gas well pressure recorder as defined in claim 19, wherein:

said housing includes releasably connected sealed first and second housing bodies, said first housing body having a bulkhead extending perpendicularly from a back wall of said first housing body, said bulkhead having two lateral holes defined therein for receiving from one side of said bulkhead only respective ends of said first and second pressure transducer assemblies disposed parallel to each other, said bulkhead defining in said first housing body a battery receiving cavity opposite the side of said bulkhead receiving said first and second pressure transducer assemblies; and said pressure recorder further comprises:

a first clamp disposed adjacent the back wall of said first housing body, said first clamp receiving respective circumferential portions of said parallel first and second pressure transducer assemblies;

a second clamp spaced parallel to and connected with said first clamp, said second clamp receiving respective circumferential portions of said parallel first and second pressure transducer assemblies; and a support plate connected inside said first housing body and having said first and second pressure transducer circuits co-planarly mounted thereon parallel to said first and second pressure transducer assemblies.

* * * * *